United States Patent
Pei et al.

(10) Patent No.: US 11,837,877 B2
(45) Date of Patent: Dec. 5, 2023

(54) COIL MODULE, WIRELESS CHARGING TRANSMITTING APPARATUS, RECEIVING APPARATUS, SYSTEM, AND TERMINAL

(71) Applicant: HUAWEI TECHNOLOGIES CO., LTD., Guangdong (CN)

(72) Inventors: Changsheng Pei, Dongguan (CN); Yongfa Zhu, Dongguan (CN); Zhiqiang Zeng, Dongguan (CN); Xiaowei Chen, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 663 days.

(21) Appl. No.: 17/032,158

(22) Filed: Sep. 25, 2020

(65) Prior Publication Data

US 2021/0012959 A1    Jan. 14, 2021

Related U.S. Application Data

(63) Continuation of application No. PCT/CN2019/070613, filed on Jan. 7, 2019.

(30) Foreign Application Priority Data

Mar. 28, 2018  (CN) .......................... 201810266633.5
Apr. 3, 2018   (CN) .......................... 201810295828.2

(51) Int. Cl.
  *H02J 50/12*  (2016.01)
  *H01F 27/28*  (2006.01)
  (Continued)

(52) U.S. Cl.
  CPC .......... *H02J 50/12* (2016.02); *H01F 27/2871* (2013.01); *H01F 27/323* (2013.01);
  (Continued)

(58) Field of Classification Search
  CPC .... H02J 50/10; H02J 50/12; H02J 7/04; H02J 2207/20; H01F 38/14; H01F 27/2871
  (Continued)

(56) References Cited

U.S. PATENT DOCUMENTS 6,404,317 B1 *  6/2002  Mizoguchi .......... H01F 17/0006
                                                336/200
9,165,708 B2    10/2015  Lim et al.
(Continued)

FOREIGN PATENT DOCUMENTS

CN   103038089 A   4/2013
CN   103779320 A   5/2014
(Continued)

OTHER PUBLICATIONS

Jin-Hyoung Kim et al. New Structure for High Q-Factor Printed Antenna in Wireless Power Transmission, IEEE Eurocon 2017, Jul. 6-8, 2017, Ohrid, R. Macedonia , pp. 474-478.

*Primary Examiner* — Edward Tso
*Assistant Examiner* — Aaron Piggush
(74) *Attorney, Agent, or Firm* — WOMBLE BOND DICKINSON (US) LLP

(57) ABSTRACT

This application discloses a coil module, which includes: an insulation layer, a first planar coil winding, and a second planar coil winding, one turn of coil of the first planar coil winding includes a first portion, a second portion, and a first connection part, and one turn of coil of the second planar coil winding includes a third portion, a fourth portion, and a second connection part. The first connection portion connects an outer side part of the first portion and an inner side part of the second portion, the second connection portion connects an inner side part of the third portion and an outer side part of the fourth portion, and there is an overlap between a projection of the first connection portion on a
(Continued)

plane of the insulation layer and a projection of the second connection portion on the plane of the insulation layer.

20 Claims, 37 Drawing Sheets

(51) Int. Cl.
| | | |
|---|---|---|
| H01F 27/32 | (2006.01) | |
| H01F 38/14 | (2006.01) | |
| H02J 7/04 | (2006.01) | |
| H02J 50/10 | (2016.01) | |

(52) U.S. Cl.
CPC ............... *H01F 38/14* (2013.01); *H02J 7/04* (2013.01); *H02J 50/10* (2016.02); *H02J 2207/20* (2020.01)

(58) Field of Classification Search
USPC .......................................... 320/107, 108, 114
See application file for complete search history.

(56) References Cited

U.S. PATENT DOCUMENTS

| | | | | |
|---|---|---|---|---|
| 2003/0030532 | A1* | 2/2003 | Iida | ........................ H01L 27/08 336/200 |
| 2013/0154383 | A1 | 6/2013 | Kasturi et al. | |
| 2013/0308256 | A1 | 11/2013 | Lehr et al. | |
| 2015/0145635 | A1* | 5/2015 | Kurz | .................... H04B 5/0037 336/232 |
| 2016/0204656 | A1 | 7/2016 | Yang et al. | |
| 2017/0278619 | A1* | 9/2017 | Lee | ..................... H01F 27/2804 |
| 2021/0142942 | A1* | 5/2021 | Pei | ........................ H02J 50/005 |

FOREIGN PATENT DOCUMENTS

| | | |
|---|---|---|
| CN | 103999373 A | 8/2014 |
| CN | 104578222 A | 4/2015 |
| CN | 205355897 U | 6/2016 |
| CN | 103366931 B | 11/2016 |
| CN | 107045933 A | 8/2017 |
| CN | 107046333 A | 8/2017 |
| CN | 107230547 A | 10/2017 |
| CN | 108321914 A | 7/2018 |
| CN | 108565102 A | 9/2018 |
| JP | 2015531998 A | 11/2015 |
| KR | 20140102301 A | 8/2014 |
| KR | 20160009632 A | 1/2016 |
| KR | 101760233 B1 | 7/2017 |
| TW | 200609961 A | 3/2006 |
| WO | 2006008878 A1 | 1/2006 |
| WO | 2013080468 A1 | 6/2013 |

\* cited by examiner

COIL MODULE, WIRELESS CHARGING TRANSMITTING APPARATUS, RECEIVING APPARATUS, SYSTEM, AND TERMINAL

CROSS-REFERENCE TO RELATED APPLICATIONS

This application is a continuation application of international patent application number PCT/CN2019/070613, filed on Jan. 7, 2019, which claims priority to Chinese Patent Application No. 201810266633.5, filed on Mar. 28, 2018 and to Chinese Patent Application No. 201810295828.2 filed on Apr. 3, 2018, The disclosures of the aforementioned applications are hereby incorporated by reference in their entireties.

TECHNICAL FIELD

This application relates to the field of wireless charging technologies, and in particular, to a coil module, a wireless charging transmitting apparatus, a receiving apparatus, a system, and a terminal.

BACKGROUND

Currently, charging an electronic device by using a wireless charging technology becomes increasingly popular. A device that implements the wireless charging technology is referred to as a wireless charger. During specific implementation, the wireless charger is provided with a transmitter coil, the electronic device is provided with a receiver coil, alternating current carried by the transmitter coil in the wireless charger generates a magnetic field, and the receiver coil in the electronic device generates a voltage through magnetic coupling, so as to charge the electronic device.

Because wireless charging is to transmit energy through magnetic coupling between the transmitter coil and the receiver coil, the magnetic field between the transmitter coil and the receiver coil is very strong. In this case, if a coil winding of a wireless charging coil is relatively wide, a relatively large eddy current loss is generated in the coil winding when the magnetic field passes through the coil winding. To resolve this problem, as shown in FIG. 1, an existing wireless charging coil includes a coil winding and a cutting groove, and the cutting groove segments the coil winding into two small windings with relatively small widths. Because a width of each small winding is less than that of the coil winding that is not segmented, an eddy current loss of the coil winding can be reduced.

However, after the cutting groove segments the coil winding into the two small windings with relatively small widths, as shown in FIG. 2, when a current I flows through the coil winding, a current $I_1$ and a current $I_2$ that are in a same direction respectively flow through the two small windings. In this case, if a magnetic field passes through the cutting groove, induced currents $I_E$ that are in different directions are respectively generated in the two small windings on two sides of the cutting groove due to electromagnetic induction. Consequently, a circulating current loss is generated in the coil winding, and wireless charging efficiency is decreased.

SUMMARY

This application provides a coil module, where there is a projection cross structure in the coil module, and a circulating current loss in the coil module is reduced by using the projection cross structure. Correspondingly, this application further provides a wireless charging transmitting apparatus, a wireless charging receiving apparatus, a wireless charging system, and a mobile terminal in which the coil module is used. Because a circulating current loss of the coil module is reduced, charging efficiency of the wireless charging transmitting apparatus, the wireless charging receiving apparatus, the wireless charging system, and the mobile terminal in which the coil module is used is improved.

According to a first aspect, this application provides a coil module. The coil module includes an insulation layer, a first planar coil winding, and a second planar coil winding. The first planar coil winding is on one side of the insulation layer, the second planar coil winding is on the other side of the insulation layer, and the first planar coil winding and the second planar coil winding each include a plurality of turns of coils.

It should be noted that, at least one turn of coil of the first planar coil winding includes a first portion, a second portion, and a first connection part. The first portion is provided with a first cutting opening that extends along a coil extending direction, and the first portion includes a first outer side part and a first inner side part that are separated by the first cutting opening. The second portion is provided with a second cutting opening that extends along the coil extending direction, and the second portion includes a second outer side part and a second inner side part that are separated by the second cutting opening. The first connection part is disposed between the first outer side part and the second inner side part.

It should be further noted that, at least one turn of coil of the second planar coil winding includes a third portion, a fourth portion, and a second connection part. The third portion is provided with a third cutting opening that extends along the coil extending direction, and the third portion includes a third outer side part and a third inner side part that are separated by the third cutting opening. The fourth portion is provided with a fourth cutting opening that extends along the coil extending direction, and the fourth portion includes a fourth outer side part and a fourth inner side part that are separated by the fourth cutting opening. The second connection part is disposed between the third inner side part and the fourth outer side part.

There is an overlap between a projection of the first connection part on a plane of the insulation layer and a projection of the second connection part on the plane of the insulation layer. Further, the first outer side part and the third outer side part are connected in parallel, the first inner side part and the third inner side part are connected in parallel, the second outer side part and the fourth outer side part are connected in parallel, and the second inner side part and the fourth inner side part are connected in parallel.

It can be learned from the foregoing description that, when an alternating current flux passes through the first cutting opening in the coil module, induced currents in opposite directions are generated in the first outer side part and the first inner side part of the first portion due to electromagnetic induction. Similarly, induced currents in opposite directions are also generated in the second outer side part and the second inner side part, the third outer side part and the third inner side part, and the fourth outer side part and the fourth inner side part. It should be noted that in this embodiment, induced currents generated in the first outer side part, the second outer side part, the third outer side part, and the fourth outer side part are in a same direction, and induced current generated in the first inner side part, the second inner side part, the third inner side part, and the fourth inner side part are in a same direction. Further, the first outer side part and the third outer side part are connected in parallel, the first inner side part and the third inner side part are connected in parallel, the second outer side part and the fourth outer side part are connected in parallel, and the second inner side part and the fourth inner side part are connected in parallel. It is assumed that a sum of induced currents generated in the first outer side part and the third outer side part is $I_1$, a sum of induced currents generated in the first inner side part and the third inner side part is $I_2$, a sum of induced currents generated in the second outer side part and the fourth outer side part is $I_3$, and a sum of induced currents generated in the second inner side part and the fourth inner side part is $I_4$. $I_1$, $I_2$, $I_3$, and $I_4$ are at least partially canceled out by using the first connection part and the second connection part provided in this embodiment. Because the induced currents in the coil module are at least partially canceled out, a circulating current loss inside the coil module is reduced.

In one embodiment, a width of at least one turn of coil of the plurality of turns of coils in the first planar coil winding or the second planar coil winding may be different from widths of other turns of coils.

When a current passes through the coil module, magnetic fields of different magnitudes are generated around coils at different positions of the coil module. A magnetic field around a coil is not only related to a magnitude of a current that passes through the coil, but also related to a width of the coil. Therefore, the magnetic field generated around the coil can be adjusted by adjusting the width of the coil.

In one embodiment, widths of the plurality of turns of coils included in the first planar coil winding or the second planar coil winding are in ascending order from an innermost turn of coil to an outermost turn of coil.

Alternatively, widths of the plurality of turns of coils included in the first planar coil winding or the second planar coil winding are first in ascending order and then in descending order from an innermost turn of coil to an outermost turn of coil.

In one embodiment, a projection of the first planar coil winding on the plane of the insulation layer overlaps or substantially overlaps a projection of the second planar coil winding on the plane of the insulation layer.

In one embodiment, a quantity of turns of coils included in the first planar coil winding is equal to that of turns of coils included in the second planar coil winding, and in a sequence from an innermost turn to an outermost turn, a width of a $P^{th}$ turn of coil in the first planar coil winding is equal to that of a $P^{th}$ turn of coil in the second planar coil winding.

In one embodiment, the projection of the first connection part on the plane of the insulation layer and the projection of the second connection part on the plane of the insulation layer cross or join. In one embodiment, a cross is in an X shape.

In one embodiment, one end of the first connection part is in contact with one end of the first outer side part close to the second outer side part, and the other end of the first connection part is in contact with one end of the second inner side part close to the first inner side part; and one end of the second connection part is in contact with one end of the third inner side part close to the fourth inner side part, and the other end of the second connection part is in contact with one end of the fourth outer side part close to the third outer side part. Therefore, the projection of the first connection part on the plane of the insulation layer and the projection of the second connection part on the plane of the insulation layer can cross or join.

In one embodiment, a first end of the first outer side part is separated from a first end of the first inner side part, and a second end of the first outer side part away from its first end communicates with a second end of the first inner side part away from its first end, where the first end of the first outer side part is the end of the first outer side part close to the second outer side part, and the first end of the first inner side part is an end of the first inner side part close to the second inner side part.

A first end of the second outer side part is separated from a first end of the second inner side part, and a second end of the second outer side part away from its first end communicates with a second end of the second inner side part away from its first end, where the first end of the second outer side part is an end of the second outer side part close to the first outer side part, and the first end of the second inner side part is the end of the second inner side part close to the first inner side part.

A first end of the third outer side part is separated from a first end of the third inner side part, and a second end of the third outer side part away from its first end communicates with a second end of the third inner side part away from its first end, where the first end of the third outer side part is an end of the third outer side part close to the fourth outer side part, and the first end of the third inner side part is the end of the third inner side part close to the fourth inner side part.

A first end of the fourth outer side part is separated from a first end of the fourth inner side part, and a second end of the fourth outer side part away from its first end communicates with a second end of the fourth inner side part away from its first end, where the first end of the fourth outer side part is the end of the fourth outer side part close to the third outer side part, and the first end of the fourth inner side part is the end of the fourth inner side part close to the third inner side part.

Therefore, after the first outer side part and the third outer side part are connected in parallel, the first inner side part and the third inner side part are connected in parallel, the second outer side part and the fourth outer side part are connected in parallel, and the second inner side part and the fourth inner side part are connected in parallel, a path can be formed by using the first connection part and the second connection part.

In one embodiment, the first outer side part and the third outer side part are connected in parallel by using at least two vias; the first inner side part and the third inner side part are connected in parallel by using at least two vias; the second outer side part and the fourth outer side part are connected in parallel by using at least two vias; and the second inner side part and the fourth inner side part are connected in parallel by using at least two vias. Because a technique of vias is relatively mature, technique implementation is easy and costs are low if a parallel connection is implemented by using the vias.

It should be noted that, because an inner wall of the via is plated with metal, two structures that are connected in parallel can be connected in parallel by using at least two vias.

In one embodiment, a penetrating first via is provided at the first end of the first outer side part and the first end of the third outer side part, another penetrating first via is provided at the second end of the first outer side part and the second end of the third outer side part, and the first outer side part and the third outer side part are connected in parallel by using the first vias.

A penetrating second via is provided at the first end of the first inner side part and the first end of the third inner side part, another penetrating second via is provided at the second end of the first inner side part and the second end of the third inner side part, and the first inner side part and the third inner side part are connected in parallel by using the second vias.

A penetrating third via is provided at the first end of the second outer side part and the first end of the fourth outer side part, another penetrating third via is provided at the second end of the second outer side part and the second end of the fourth outer side part, and the second outer side part and the fourth outer side part are connected in parallel by using the third vias.

A penetrating fourth via is provided at the first end of the second inner side part and the first end of the fourth inner side part, another penetrating fourth via is provided at the second end of the second inner side part and the second end of the fourth inner side part, and the second inner side part and the fourth inner side part are connected in parallel by using the fourth vias.

It should be noted that, refer to explanation in the foregoing implementation for the first end and the second end of the first outer side part, the first end and the second end of the first inner side part, the first end and the second end of the second outer side part, the first end and the second end of the second inner side part, the first end and the second end of the third outer side part, the first end and the second end of the third inner side part, the first end and the second end of the fourth outer side part, and the first end and the second end of the fourth inner side part. Details are not described herein again.

In one embodiment, when the second end of the first outer side part communicates with the second end of the first inner side part, and the second end of the third outer side part communicates with the second end of the third inner side part, the first via that penetrates the second end of the first outer side part and the second end of the third outer side part is also the second via that penetrates the second end of the first inner side part and the second end of the third inner side part. This design can be used to reduce a quantity of vias, and decrease technique implementation complexity.

In one embodiment, when the second end of the second outer side part communicates with the second end of the second inner side part, and the second end of the fourth outer side part communicates with the second end of the fourth inner side part, the third via that penetrates the second end of the second outer side part and the second end of the fourth outer side part is also the fourth via that penetrates the second end of the second inner side part and the second end of the fourth inner side part. This design can be used to reduce a quantity of vias, and decrease technique implementation complexity.

In one embodiment, a sum of an opening area of the first cutting opening and an opening area of the third cutting opening is equal to or close to a sum of an opening area of the second cutting opening and an opening area of the fourth cutting opening. It should be learned that, limiting a relationship between opening areas herein is to better cancel out induced currents generated in the first to the fourth outer side parts and the first to the fourth inner side parts. In an ideal state, the sum of the opening area of the first cutting opening and the opening area of the third cutting opening is equal to the sum of the opening area of the second cutting opening and the opening area of the fourth cutting opening, so that the induced currents generated in the first to the fourth outer side parts and the first to the fourth inner side parts can be totally canceled out. The so called "close to" means that getting close to the ideal state is better. It is known that, being exactly equal is impossible due to a technique implementation error. Therefore, the "close to" limited herein means a best state that can be achieved with reference to actual technique implementation. In other words, the "close to" should be understood from a perspective of a person skilled in the art.

In one embodiment, assuming that the sum of the opening area of the first cutting opening and the opening area of the third cutting opening is A1, and that the sum of the opening area of the second cutting opening and the opening area of the fourth cutting opening is A2, a value of A1/A2 is from 70% to 130%.

In one embodiment, the coil module further includes a first wire and a second wire. One end of the first wire coincides with an end part of an outermost turn of coil of the first planar coil winding, and the other end of the first wire is a first end of the module. One end of the second wire is an end part of an innermost turn of coil of the second planar coil winding, and the other end of the second wire is a second end of the module. It should be noted that, when the first end of the module is a lead-in end, the second end of the module is a lead-out end, and when the first end of the module is a lead-out end, the second end of the module is a lead-in end.

In one embodiment, the first wire includes a first branch and a second branch that are partially separated or completely separated from each other, and both the first branch and the second branch extend along an extending direction of the first wire. This embodiment provides two different designs for the first wire, so that design flexibility of the first wire is enhanced.

In one embodiment, when the first branch and the second branch are completely separated, one end of each of the first branch and the second branch coincides with or is connected to the end part of the outermost turn of coil of the first planar coil winding, and the other end of the first branch and the other end of the second branch are joined by a terminal to form the first end of the module.

In one embodiment, when the first branch and the second branch are partially separated, the first wire further includes a first common part, one end of each of the first branch and the second branch coincides with the first common part, and the other end of the first branch and the other end of the second branch are joined by a terminal to form the first end of the module.

In one embodiment, the second wire includes a third branch and a fourth branch that are partially separated or completely separated from each other, and both the third branch and the fourth branch extend along an extending direction of the second wire. This embodiment provides two different designs for the second wire, so that design flexibility of the second wire is enhanced. In one embodiment, when the third branch and the fourth branch are completely separated, one end of each of the third branch and the fourth branch coincides with or is connected to an end part of the innermost turn of coil of the second planar coil winding, and the other end of the first branch and the other end of the second branch are joined by a terminal to form the second end of the module.

In one embodiment, when the third branch and the fourth branch are partially separated, the second wire further includes a second common part, one end of each of the third branch and the fourth branch coincides with the second common part, and the other end of the first branch and the other end of the second branch are joined by a terminal to form the second end of the module.

In one embodiment, the second wire includes a fifth portion and a sixth portion. One end of the fifth portion is the end part of the innermost turn of coil of the second planar coil winding, and the other end of the fifth portion is in an $M^{th}$ turn of coil of the second planar coil winding, where the $M^{th}$ turn of coil is any turn of coil in the second planar coil winding other than the innermost turn of coil and an outermost turn of coil. One end of the sixth portion is in an $N^{th}$ turn of coil of the first planar coil winding, and the other end of the sixth portion is the second end of the module, where the $N^{th}$ turn of coil is any turn of coil in the first planar coil winding other than an innermost turn of coil and the outermost turn of coil.

It should be noted that, along a thickness direction of the insulation layer, there is an overlap between a projection of the $N^{th}$ turn of coil on the plane of the insulation layer and a projection of the $M^{th}$ turn of coil on the plane of the insulation layer, where the overlap is connected by using a via. This embodiment provides a design manner for the second wire. In this embodiment, the second wire includes two portions, and the portions are electrically connected by using a through hole.

In one embodiment, the second wire further includes a fifth portion and a sixth portion. One end of the fifth portion is an end part of an innermost turn of coil of the first planar coil winding, and one end of the sixth portion is the end part of the innermost turn of coil of the second planar coil winding. The other end of the fifth portion and the other end of the sixth portion are joined to form the second end of the module.

Along a thickness direction of the insulation layer, there is a cross between a projection of the fifth portion on the plane of the insulation layer and a projection of the sixth portion on the plane of the insulation layer, and the cross is in a region of projections of the first planar coil winding and the second planar coil winding on the plane of the insulation layer. It can be learned that, this embodiment provides another design manner for the second wire. In this embodiment, the second wire also includes two portions, but a difference from the foregoing embodiment lies in that, the other ends of the two portions communicate with each other.

In one embodiment, the module further includes a magnetic conduction piece. The first planar coil winding or the second planar coil winding is on the magnetic conduction piece, and is insulated from the magnetic conduction piece.

According to a second aspect, the present invention provides another coil module. The coil module includes a first planar coil winding disposed on one side of an insulation layer and a second planar coil winding disposed on the other side of the insulation layer. The first planar coil winding and the second planar coil winding each include a plurality of turns of coils.

At least one turn of coil of the first planar coil winding includes a plurality of portions, and a first connection part is disposed between two adjacent portions of the plurality of portions. Each portion is provided with a first cutting opening that extends along a coil extending direction, and includes a first outer side part and a first inner side part that are separated by the first cutting opening. The first connection part connects a first inner side part of one of the two adjacent portions and a first outer side part of the other of the two adjacent portions.

At least one turn of coil of the second planar coil winding includes a plurality of portions, and a second connection part is disposed between two adjacent portions of the plurality of portions. Each portion is provided with a second cutting opening that extends along the coil extending direction, and includes a second outer side part and a second inner side part that are separated by the second cutting opening. The second connection part connects a second inner side part of one of the two adjacent portions and a second outer side part of the other of the two adjacent portions.

It should be noted that, there is an overlap between a projection of the first connection part on a plane of the insulation layer and a projection of the second connection part on the plane of the insulation layer, the first outer side part and the second outer side part are connected in parallel, and the first inner side part and the second inner side part are connected in parallel.

For beneficial effects of this implementation, refer to the foregoing description on beneficial effects of the first aspect, and the beneficial effects of this implementation are similar to the beneficial effects of the first aspect. In other words, induced currents generated in the first outer side part, the first inner side part, the second outer side part, and the second inner side part can be partially canceled out by disposing the first connection part and the second connection part, so that a circulating current loss of the coil module is reduced.

In one embodiment, the projection of the first connection part on the plane of the insulation layer and the projection of the second connection part on the plane of the insulation layer cross or join.

In one embodiment, the at least one turn of coil of the first planar coil winding is a $K^{th}$ turn of coil, and the at least one turn of coil of the second planar coil winding is an $L^{th}$ turn of coil. Along a thickness direction of the insulation layer, a projection of the $K^{th}$ turn of coil on the plane of the insulation layer at least partially overlaps a projection of the $L^{th}$ turn of coil on the plane of the insulation layer. The $K^{th}$ turn of coil and the $L^{th}$ turn of coil each include R portions, where R is an integer greater than or equal to two.

A sum of opening areas of cutting openings in even numbered portions of the $K^{th}$ turn of coil is S1. A sum of opening areas of cutting openings in odd numbered portions of the $K^{th}$ turn of coil is S2. A sum of opening areas of cutting openings in even numbered portions of the $L^{th}$ turn of coil is S3. A sum of opening areas of cutting openings in odd numbered portions of the $L^{th}$ turn of coil is S4. A sum of S1 and S3 is equal to or close to a sum of S2 and S4.

It should be noted that, the even numbered portions are portions that are at even numbered positions of the R portions after the R portions are sorted in a connection order of the R portions, and the odd numbered portions are portions that are at odd-number positions of the R portions after the R portions are sorted in the connection order of the R portions.

After an alternating current flux passes through a cutting opening, induced currents are generated in parts on two sides of the cutting opening. Further, magnitudes of the induced currents generated in the parts on the two sides of the cutting opening are related to a size of an opening area of the cutting opening. Therefore, when the sum of S1 and S3 is equal to or close to the sum of S2 and S4, induced currents generated in the first outer side part, the third outer side part, the second inner side part, and the fourth inner side part on two sides of the four cutting openings are totally or partially canceled out, and induced currents generated in the first inner side part, the third inner side part, the second outer side part, and the fourth outer side part on two sides of the four cutting openings are completely or partially canceled out.

In one embodiment, assuming that the sum of S1 and S3 is B1, and that the sum of S2 and S4 is B2, a value of B1/B2 is from 70% to 130%.

According to a third aspect, this application provides a wireless charging transmitting apparatus. The apparatus includes a direct current/alternating current conversion circuit, a control unit, and the coil module in any one of the implementations of the first aspect or any one of the implementations of the second aspect. An input end of the direct current/alternating current conversion circuit is connected to a direct current power source. Under the control of the control unit, the direct current/alternating current conversion circuit converts a direct current signal input by the direct current power source into an alternating current signal, and transmits the alternating current signal to the coil module, so that the coil module transmits the alternating current signal.

It can be learned based on the foregoing description on the coil module that, the circulating current loss of the coil module provided in this application is relatively small. Therefore, efficiency of transmitting an electrical signal by the wireless charging transmitting apparatus in which the coil module is used is relatively high.

In one embodiment, an output end of the direct current/alternating current conversion circuit is connected to the coil module, and a control end of the control unit is connected to a controlled end of the direct current/alternating current conversion circuit.

In one embodiment, a first voltage detection end of the control unit is connected to the direct current power source, a second voltage detection end of the control unit is connected to the coil module, a first current detection end of the control unit is connected to the direct current power source, and a second current detection end of the control unit is connected to the coil module. According to this embodiment, a problem can be discovered in a timely manner by detecting the direct current power source and the coil module, so as to prevent the wireless charging transmitting apparatus from abnormality due to a defect of the direct current power source or the coil module. In other words, according to this embodiment, working reliability of the wireless charging transmitting apparatus can be improved.

In one embodiment, the apparatus further includes a matching circuit. The matching circuit is connected between the direct current/alternating current conversion circuit and the coil module, and is configured to generate resonance oscillation with the coil module, so that the alternating current signal output by the direct current/alternating current conversion circuit can be efficiently transmitted to the coil module. It can be learned that according to this embodiment, efficiency of transmitting an electrical signal by the wireless charging transmitting apparatus can be improved.

In one embodiment, a control end of the control unit is connected to a controlled end of the matching circuit.

According to a fourth aspect, the present invention provides a wireless charging receiving apparatus. The apparatus includes an alternating current/direct current conversion circuit, a control unit, a load, and the coil module in any one of the implementations of the first aspect or any one of the implementations of the second aspect. The coil module is connected to an input end of the alternating current/direct current conversion circuit. The coil module receives an alternating current signal, and transmits the alternating current signal to the alternating current/direct current conversion circuit. Under the control of the control unit, the alternating current/direct current conversion circuit converts the alternating current signal into a direct current signal, and outputs the direct current signal to the load, to supply power to the load.

It can be learned based on the foregoing description on the coil module that, the circulating current loss of the coil module provided in this application is relatively small. Therefore, efficiency of receiving an electrical signal by the wireless charging receiving apparatus in which the coil module is used is relatively high.

In one embodiment, an output end of the alternating current/direct current conversion circuit is connected to the load, and a control end of the control unit is connected to a controlled end of the alternating current/direct current conversion circuit.

In one embodiment, a first voltage detection end of the control unit is connected to the coil module, a second voltage detection end of the control unit is connected to the load, a first current detection end of the control unit is connected to the coil module, and a second current detection end of the control unit is connected to the load. According to this solution, working reliability of the wireless charging receiving apparatus can be improved.

In one embodiment, the apparatus further includes a matching circuit.

The matching circuit is connected between the coil module and the alternating current/direct current conversion circuit, and is configured to generate resonance oscillation with the coil module, so that the alternating current signal output by the coil module can be efficiently transmitted to the alternating current/direct current conversion circuit. According to this solution, efficiency of receiving an electrical signal by the wireless charging receiving apparatus can be improved.

In one embodiment, a control end of the control unit is connected to a controlled end of the matching circuit.

According to a fifth aspect, this application provides a wireless charging system. The system includes the wireless charging transmitting apparatus in any implementation of the third aspect and the wireless charging receiving apparatus in any implementation of the fourth aspect. The wireless charging transmitting apparatus is configured to wirelessly charge the wireless charging receiving apparatus.

It should be noted that, an alternating current signal transmitted by a coil module in the wireless charging transmitting apparatus generates a magnetic field, and a coil module in the wireless charging receiving apparatus can generate a voltage through magnetic coupling, so that the wireless charging transmitting apparatus can wirelessly charge a load in the wireless charging receiving apparatus.

In this embodiment, because a circulating current loss of the coil module is relatively small, the wireless charging transmitting apparatus and the wireless charging receiving apparatus in which the coil module is used may have relatively high working efficiency. Therefore, the wireless charging system in which the wireless charging transmitting apparatus and the wireless charging receiving apparatus are used may have relatively high charging efficiency.

According to a sixth aspect, this application further provides a mobile terminal. The mobile terminal includes a workload circuit, an alternating current/direct current conversion circuit, a charging control unit, and the coil module in any one of the embodiments of the first aspect and the embodiments of the second aspect. The coil module is connected to an input end of the alternating current/direct current conversion circuit. The coil module receives an alternating current signal, and transmits the alternating current signal to the alternating current/direct current conversion circuit. Under the control of the charging control unit, the alternating current/direct current conversion circuit converts the alternating current signal into a direct current signal, and outputs the direct current signal to the workload circuit.

In this embodiment of this application, the mobile terminal includes the coil module in the foregoing embodiments. Because the coil module has a relatively low circulating current loss, the mobile terminal in which the coil module is used can obtain relatively high charging efficiency.

Figure 1:
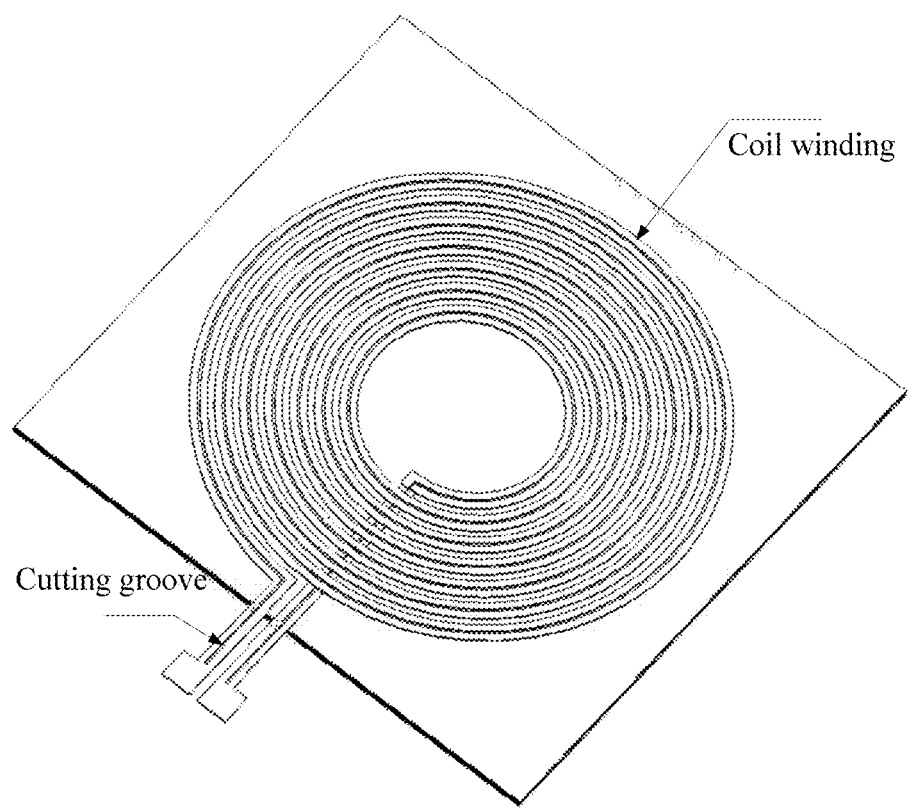
FIG. 1 is a schematic structural diagram of a wireless charging coil in the prior art.
Figure 2:
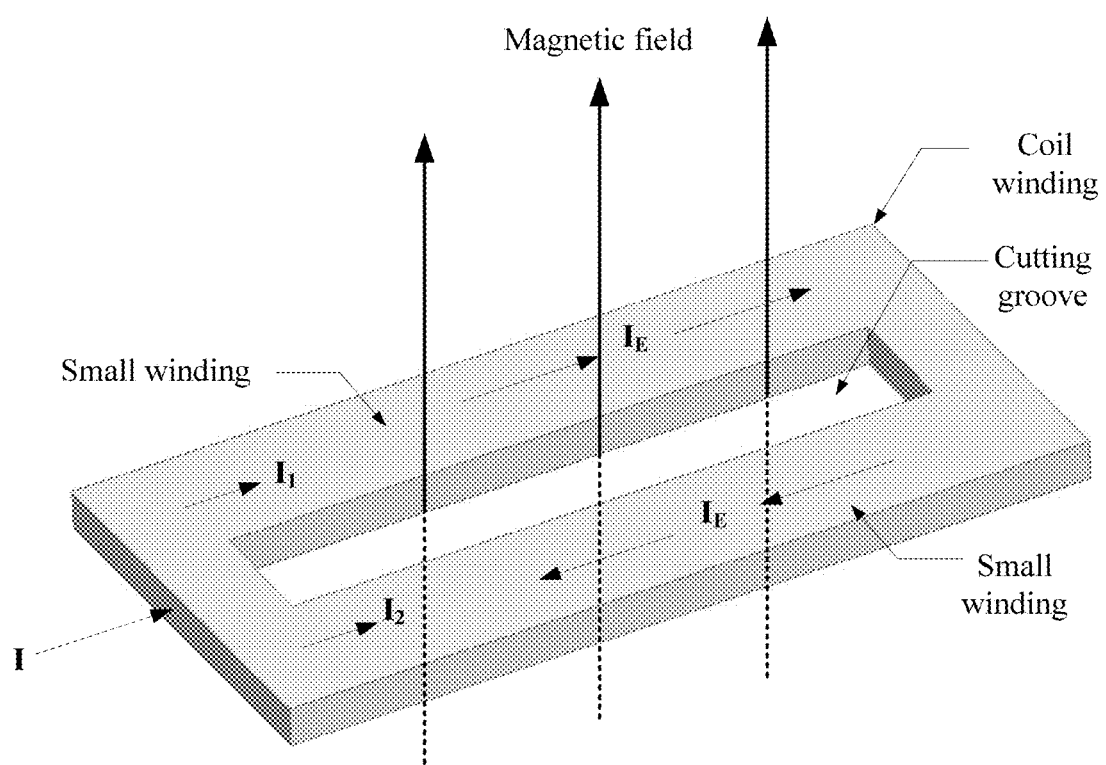
FIG. 2 is a schematic diagram of an induced current in a small winding in the prior art.

Reference numerals in the drawings are as follows:

10: Insulation layer;

11: First planar coil winding, 111: first portion, 112: second portion, 113: first connection part, 211: first outer side part, 212: first inner side part, 213: first cutting opening, 221: second outer side part, 222: second inner side part, 223: second cutting opening, 114: seventh portion, 115: eighth portion, 116: third connection part, 251: fifth outer side part, 252: fifth inner side part, 253: fifth cutting opening, 261: sixth outer side part, 262: sixth inner side part, 263: sixth cutting opening;

12: Second planar coil winding, 121: third portion, 122: fourth portion, 123: second connection part, 231: third outer side part, 232: third inner side part, 233: third cutting opening, 241: fourth outer side part, 242: fourth inner side part, 243: fourth cutting opening, 124: ninth portion, 125: tenth portion, 126: fourth connection part, 271: seventh outer side part, 272: seventh inner side part, 273: seventh cutting opening, 281: eighth outer side part, 282: eighth inner side part, 283: eighth cutting opening;

D1: First wire, d11: first branch, d12: second branch, D2: second wire, d21: third branch, d22: fourth branch, d31: fifth portion, d32: sixth portion, D3: third wire, D4: fourth wire;

13: Magnetic conduction piece;

91: Direct current power source, 92: direct current/alternating current conversion circuit, 93: control unit, 94: coil module, 95: matching circuit;

101: Direct current/alternating current conversion circuit, 102: control unit, 103: load, 104: coil module, 105: matching circuit;

1101: Wireless charging transmitting apparatus, 1102: wireless charging receiving apparatus;

1201: Workload circuit, 1202: alternating current/direct current conversion circuit, 1203: charging control unit, 1204: coil module.

DESCRIPTION OF EMBODIMENTS

To make the objectives, technical solutions, and advantages of this application clearer, the following further describes the implementations of this application in detail with reference to the accompanying drawings.

Figure 3A:
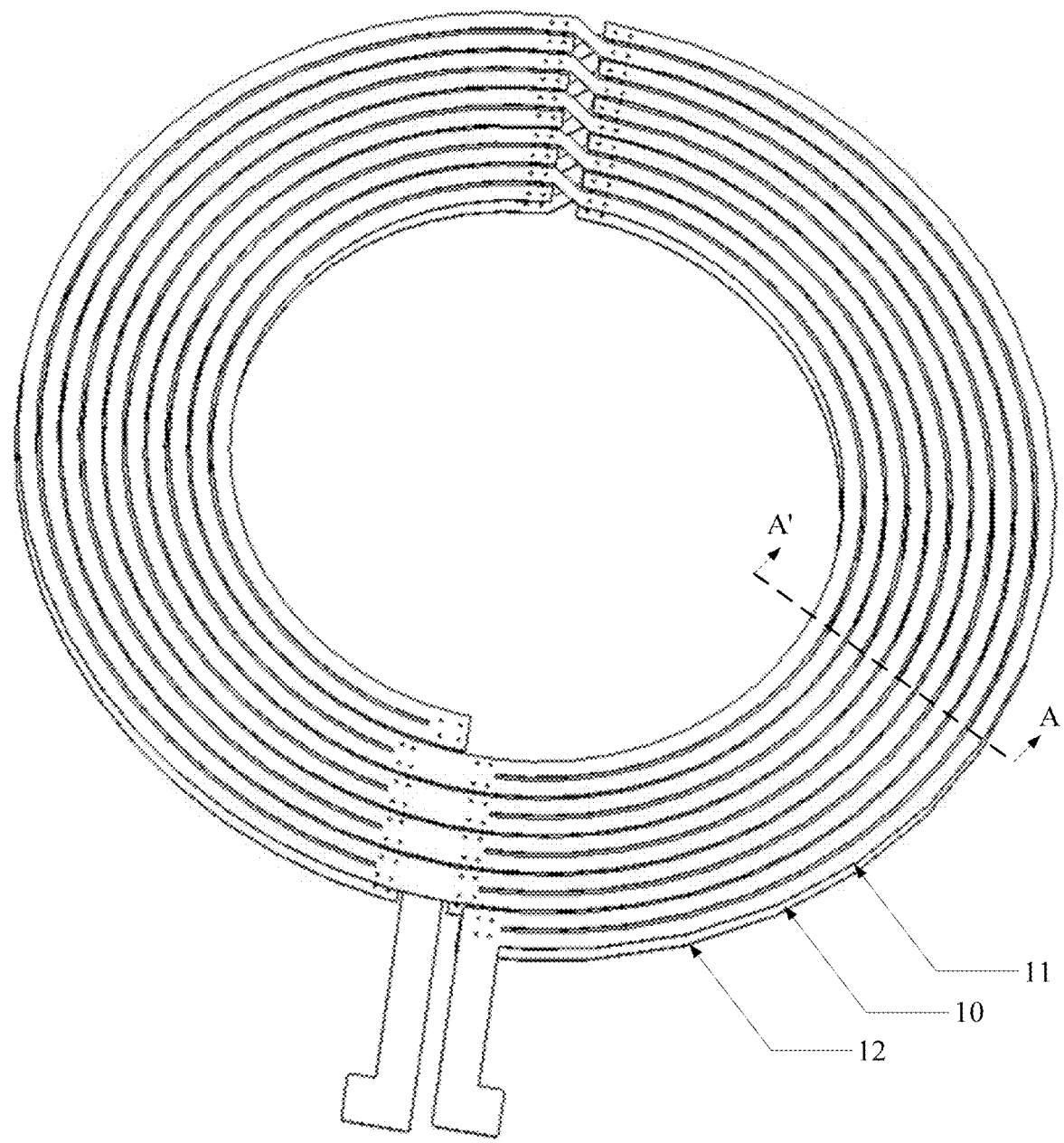
FIG. 3A is a first schematic structural diagram of a coil module according to an embodiment of this application.
Figure 3B:
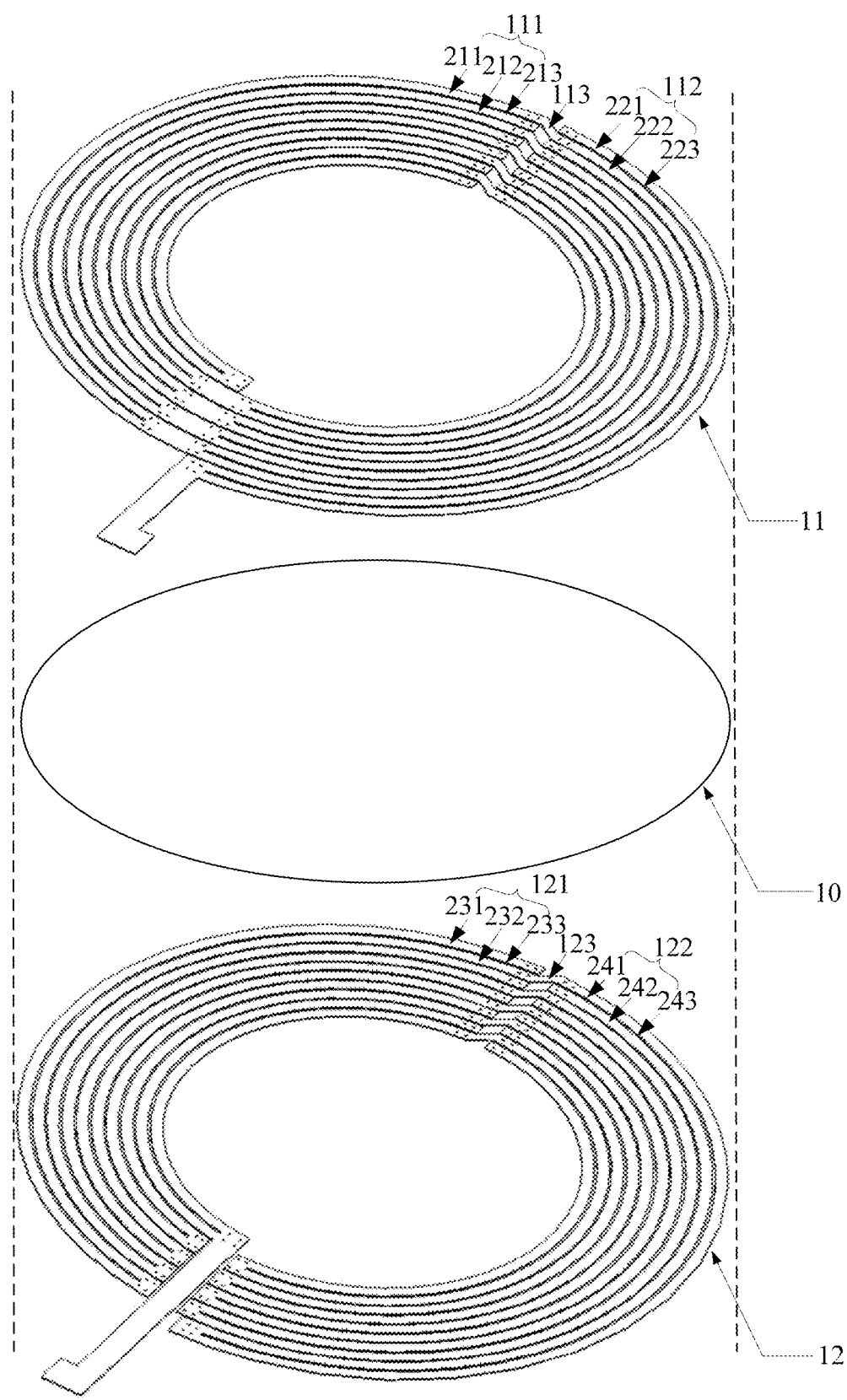
FIG. 3B is a second schematic structural diagram of a coil module according to an embodiment of this application.

FIG. 3A is a schematic structural diagram of a coil module according to an embodiment of this application. Referring to FIG. 3A, the coil module includes an insulation layer 10, a first planar coil winding 11, and a second planar coil winding 12. Referring to FIG. 3A and FIG. 3B, the first planar coil winding 11 is on one side of the insulation layer 10, the second planar coil winding 12 is on the other side of the insulation layer 10, and the first planar coil winding 11 and the second planar coil winding 12 each include a plurality of turns of coils.

It should be noted that, at least one turn of coil of the first planar coil winding 11 includes a first portion 111, a second portion 112, and a first connection part 113. The first portion 111 is provided with a first cutting opening 213 that extends along a coil extending direction, and the first portion 111 includes a first outer side part 211 and a first inner side part 212 that are separated by the first cutting opening 213. The second portion 112 is provided with a second cutting opening 223 that extends along a coil extending direction, and the second portion 112 includes a second outer side part 221 and a second inner side part 222 that are separated by the second cutting opening 223. The first connection part 113 is disposed between the first outer side part 211 and the second inner side part 222.

At least one turn of coil of the second planar coil winding 12 includes a third portion 121, a fourth portion 122, and a second connection part 123. The third portion 121 is provided with a third cutting opening 233 that extends along a coil extending direction, and the third portion 121 includes a third outer side part 231 and a third inner side part 232 that are separated by the third cutting opening 233. The fourth portion 122 is provided with a fourth cutting opening 243 that extends along a coil extending direction, and the fourth portion 122 includes a fourth outer side part 241 and a fourth inner side part 242 that are separated by the fourth cutting opening 243. The second connection part 123 is disposed between the third inner side part 232 and the fourth outer side part 241.

There is an overlap between a projection of the first connection part 113 on a plane of the insulation layer 10 and a projection of the second connection part 123 on the plane of the insulation layer 10. The first outer side part 211 and the third outer side part 231 are connected in parallel, the first inner side part 212 and the third inner side part 232 are connected in parallel, the second outer side part 221 and the fourth outer side part 241 are connected in parallel, and the second inner side part 222 and the fourth inner side part 242 are connected in parallel.

It should be noted that, the insulation layer 10 is an insulation material layer between the first planar coil winding 11 and the second planar coil winding 12, and is configured to isolate the first planar coil winding 11 from the second planar coil winding 12, so that portions of the first planar coil winding 11 and the second planar coil winding 12 other than connected portions remain insulated.

In addition, the first planar coil winding 11 and the second planar coil winding 12 each are a conductive pattern wound by a conductor. The conductive pattern may be ring-shaped, elliptical, and the like. A width of at least one turn of coil of the plurality of turns of coils in the first planar coil winding 11 or the second planar coil winding 12 may be different from widths of other turns of coils. For example, widths of coils of the plurality of turns of coils may gradually increase or may first increase and then decrease from an innermost turn of coil to an outermost turn of coil.

It should be noted that, a cutting opening provided in each portion of the first planar coil winding 11 or the second planar coil winding 12 penetrates the portion along a thickness direction of the insulation layer 10. To be specific, the first cutting opening 213 provided in the first portion 111 penetrates the first portion 111 along the thickness direction of the insulation layer 10, to divide the first portion 111 into the first outer side part 211 and the first inner side part 212 that are isolated from each other. The second cutting opening 223 provided in the second portion 112 penetrates the second portion 112 along the thickness direction of the insulation layer 10, to divide the second portion 112 into the second outer side part 221 and the second inner side part 222 that are isolated from each other. The third cutting opening 233 provided in the third portion 121 penetrates the third portion 121 along the thickness direction of the insulation layer 10, to divide the third portion 121 into the third outer side part 231 and the third inner side part 232 that are isolated from each other. The fourth cutting opening 243 provided in the fourth portion 122 penetrates the fourth portion 122 along the thickness direction of the insulation layer 10, to divide the fourth portion 122 into the fourth outer side part 241 and the fourth inner side part 242 that are isolated from each other.

In addition, one end that is of an outer side part included in each portion of the first planar coil winding 11 or the second planar coil winding 12 and that is close to the other adjacent portion is separated from one end that is of an inner side part included in the portion of the first planar coil winding 11 or the second planar coil winding 12 and that is close to the other adjacent portion. To be specific, a first end of the first outer side part 211 included in the first portion 111 is separated from a first end of the first inner side part 212 included in the first portion 111, where the first end of the first outer side part 211 is an end of the first outer side part 211 close to the second portion 112, and the first end of the first inner side part 212 is an end of the first inner side part 212 close to the second portion 112. A first end of the second outer side part 221 included in the second portion 112 is separated from a first end of the second inner side part 222 included in the second portion 112, where the first end of the second outer side part 221 is an end of the second outer side part 221 close to the first portion 111, and the first end of the second inner side part 222 is an end of the second inner side part 222 close to the first portion 111. A first end of the third outer side part 231 included in the third portion 121 is separated from a first end of the third inner side part 232 included in the third portion 121, where the first end of the third outer side part 231 is an end of the third outer side part 231 close to the fourth portion 122, and the first end of the third inner side part 232 is an end of the third inner side part 232 close to the fourth portion 122. A first end of the fourth outer side part 241 included in the fourth portion 122 is separated from a first end of the fourth inner side part 242 included in the fourth portion 122, where the first end of the fourth outer side part 241 is an end of the fourth outer side part 241 close to the third portion 121, and the first end of the fourth inner side part 242 is an end of the fourth inner side part 242 close to the third portion 121.

Further, one end that is of an outer side part included in each portion of the first planar coil winding 11 or the second planar coil winding 12 and that is away from the other adjacent portion is connected to one end that is of an inner side part included in the portion of the first planar coil winding 11 or the second planar coil winding 12 and that is away from the other adjacent portion, and connection positions may be at an end part of an innermost turn of coil, an end part of an outermost turn of coil, a portion that is in each turn of coil and that has no cutting opening, a connection terminal between the coil module and an external circuit, and the like. To be specific, a second end of the first outer side part 211 included in the first portion 111 is connected to a second end of the first inner side part 212 included in the first portion 111, where the second end of the first outer side part 211 is an end of the first outer side part 211 away from the second portion 112, and the second end of the first inner side part 212 is an end of the first inner side part 212 away from the second portion 112. A second end of the second outer side part 221 included in the second portion 112 is connected to a second end of the second inner side part 222 included in the second portion 112, where the second end of the second outer side part 221 is an end of the second outer side part 221 away from the first portion 111, and the second end of the second inner side part 222 is an end of the second inner side part 222 away from the first portion 111. A second end of the third outer side part 231 included in the third portion 121 is connected to a second end of the third inner side part 232 included in the third portion 121, where the second end of the third outer side part 231 is an end of the third outer side part 231 away from the fourth portion 122, and the second end of the third inner side part 232 is an end of the third inner side part 232 away from the fourth portion 122. A second end of the fourth outer side part 241 included in the fourth portion 122 is connected to a second end of the fourth inner side part 242 included in the fourth portion 122, where the second end of the fourth outer side part 241 is an end of the fourth outer side part 241 away from the third portion 121, and the second end of the fourth inner side part 242 is an end of the fourth inner side part 242 away from the third portion 121.

Figure 3C:
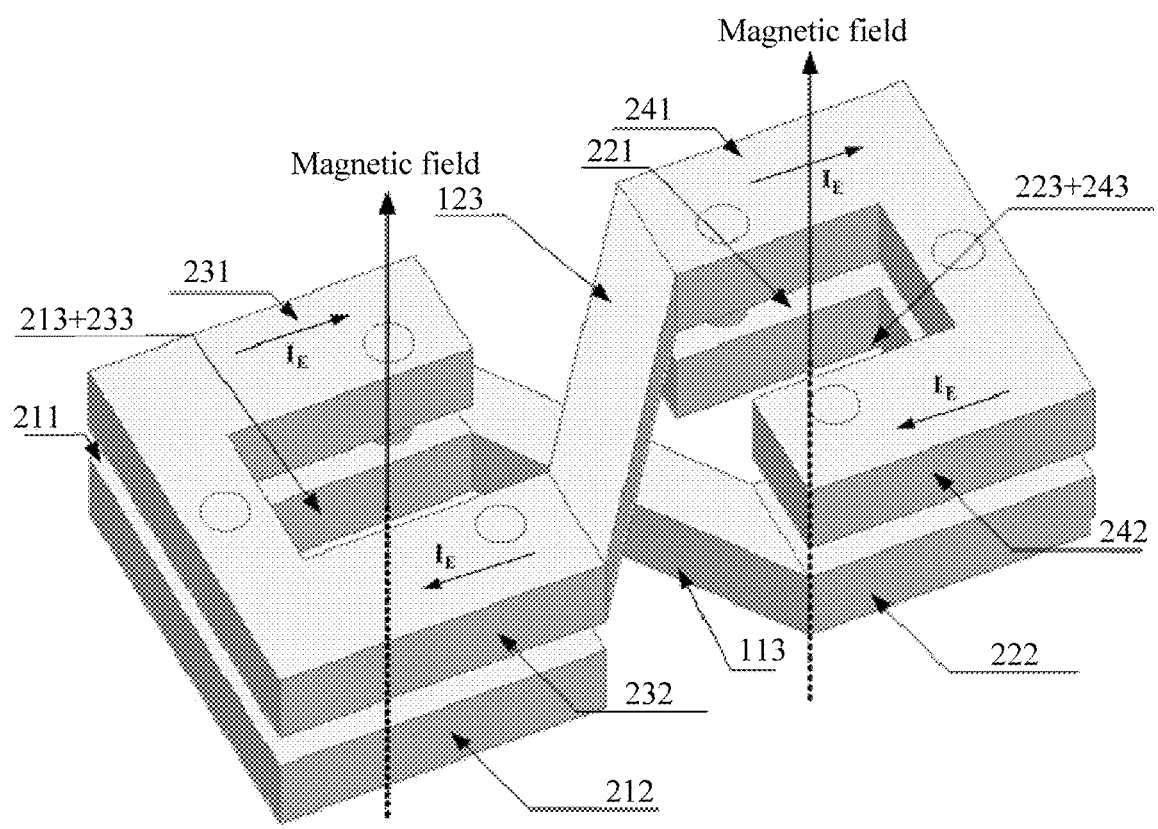
FIG. 3C is a schematic diagram of a cross-connection between an outer side part and an inner side part according to an embodiment of this application.

It should be noted that referring to FIG. 3C, the first outer side part 211, the third outer side part 231, the second inner side part 222, and the fourth inner side part 242 form a first target wire; the first inner side part 212, the third inner side part 232, the second outer side part 221, and the fourth outer side part 241 form a second target wire; and the first target wire the second target wire cross without an electric connection by using the first connection part 113 and the second connection part 123. In this case, induced currents $I_E$ generated in the first target wire and the second target wire when a magnetic field passes through the first cutting opening 213, the second cutting opening 223, the third cutting opening 233, and the fourth cutting opening 243 cancel each other out, so that a circulating current loss in the first planar coil winding 11 and a circulating current loss in the second planar coil winding 12 can be effectively reduced.

When there is the overlap between the projection of the first connection part 113 on the plane of the insulation layer 10 and the projection of the second connection part 123 on the plane of the insulation layer 10, the projection of the first connection part 113 on the plane of the insulation layer 10 and the projection of the second connection part 123 on the plane of the insulation layer 10 may cross or join, where a junction or a joint is the overlap.

When the first connection part 113 is disposed between the first outer side part 211 and the second inner side part 222, one end of the first connection part 113 is in contact with one end of the first outer side part 211 close to the second outer side part 221, and the other end of the first connection part 113 is in contact with one end of the second inner side part 222 close to the first inner side part 212.

When the second connection part 123 is disposed between the third inner side part 232 and the fourth outer side part 241, one end of the second connection part 123 is in contact with one end of the third inner side part 232 close to the fourth inner side part 242, and the other end of the second connection part 123 is in contact with one end of the fourth outer side part 241 close to the third outer side part 231.

Parallel connections between outer side parts and inner side parts included in the portions of the first planar coil winding 11 and outer side parts and inner side parts included in the portions of the second planar coil winding 12 may be implemented by using vias. To be specific, the first outer side part 211 and the third outer side part 231 may be connected in parallel by using at least two vias, the first inner side part 212 and the third inner side part 232 may be connected in parallel by using at least two vias, the second outer side part 221 and the fourth outer side part 241 may be connected in parallel by using at least two vias, and the second inner side part 222 and the fourth inner side part 242 may be connected in parallel by using at least two vias.

Specifically, a penetrating first via is provided at the first end of the first outer side part 211 and the first end of the third outer side part 231, another penetrating first via is provided at the second end of the first outer side part 211 away from its first end and the second end of the third outer side part 231 away from its first end, and the first outer side part 211 and the third outer side part 232 are connected in parallel by using the first vias; a penetrating second via is provided at the first end of the first inner side part 212 and the first end of the third inner side part 232, another penetrating second via is provided at the second end of the first inner side part 212 away from its first end and the second end of the third inner side part 232 away from its first end, and the first inner side part 212 and the third inner side part 232 are connected in parallel by using the second vias; a penetrating third via is provided at the first end of the second outer side part 221 and the first end of the fourth outer side part 241, another penetrating third via is provided at the second end of the second outer side part 221 away from its first end and the second end of the fourth outer side part 241 away from its first end, and the second outer side part 221 and the fourth outer side part 241 are connected in parallel by using the third vias; a penetrating fourth via is provided at the first end of the second inner side part 222 and the first end of the fourth inner side part 242, another penetrating fourth via is provided at the second end of the second inner side part 222 away from its first end and the second end of the fourth inner side part 242 away from its first end, and the second inner side part 222 and the fourth inner side part 242 are connected in parallel by using the fourth vias.

It should be noted that, when the second end of the first outer side part 211 communicates with the second end of the first inner side part 212, and the second end of the third outer side part 231 communicates with the second end of the third inner side part 232, the first via that penetrates the second end of the first outer side part 211 and the second end of the third outer side part 231 is also the second via that penetrates the second end of the first inner side part 212 and the second end of the third inner side part 232.

It should be noted that, when the second end of the second outer side part 221 communicates with the second end of the second inner side part 222, and the second end of the fourth outer side part 241 communicates with the second end of the fourth inner side part 242, the third via that penetrates the second end of the second outer side part 221 and the second end of the fourth outer side part 241 is also the fourth via that penetrates the second end of the second inner side part 222 and the second end of the fourth inner side part 242.

Based on the foregoing structure, wireless charging efficiency may be further improved by using the following detailed structures. Certainly, wireless charging efficiency may alternatively be further improved by using other detailed structures. This is not limited in this embodiment of this application.

Figure 3D:
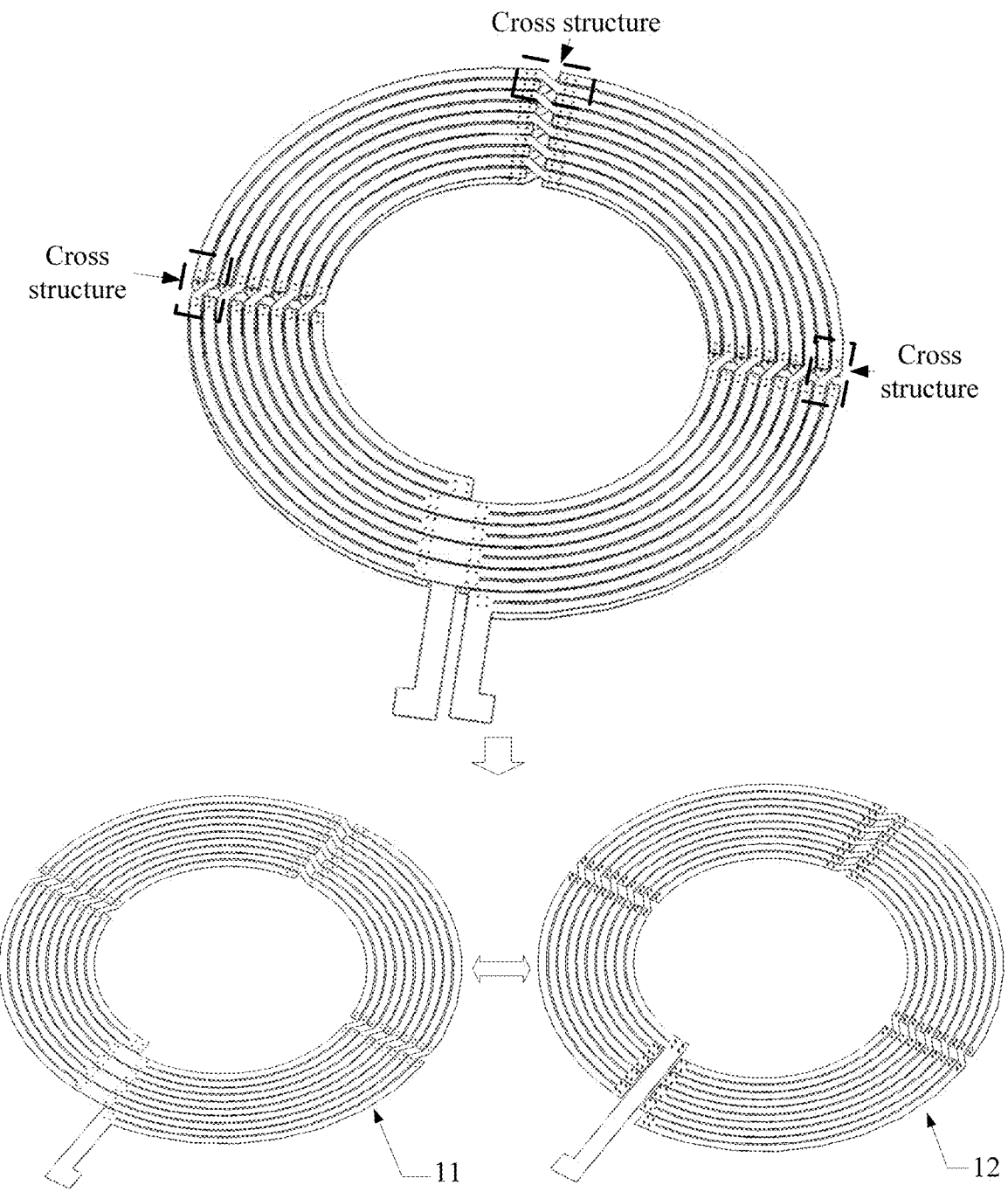
FIG. 3D is a third schematic structural diagram of a coil module according to an embodiment of this application.
Figure 3E:
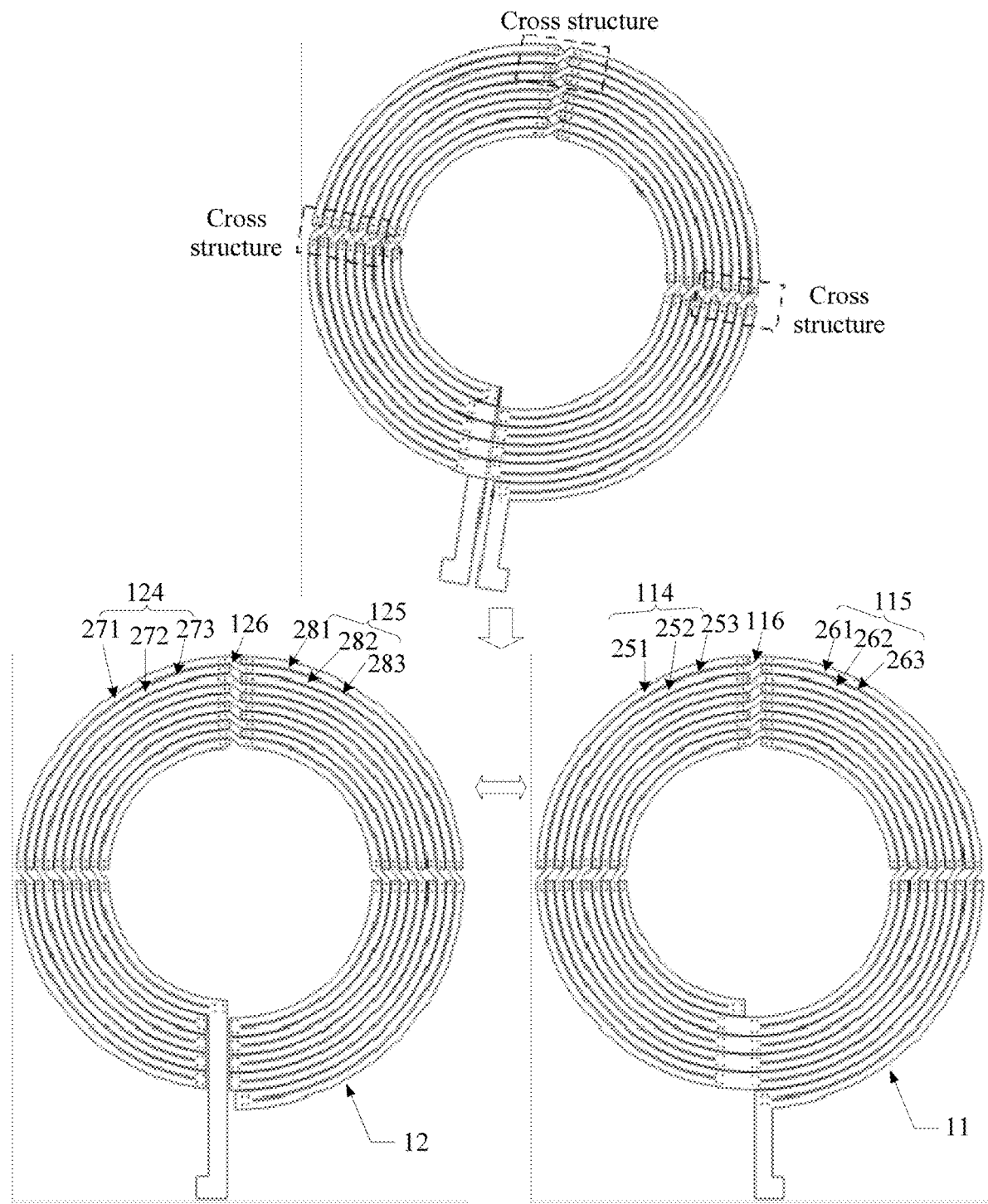
FIG. 3E is a fourth schematic structural diagram of a coil module according to an embodiment of this application.

In a first detailed structure: referring to FIG. 3D or FIG. 3E, at least one turn of coil of the first planar coil winding 11 and at least one turn of coil of the second planar coil winding 12 may form at least two cross structures.

It should be noted that referring to FIG. 3D, each of the at least two cross structures may include a first portion 111, a second portion 112, a first connection part 113, a third portion 121, a fourth portion 122, and a second connection part 123.

Alternatively, referring to FIG. 3E, at least one of the at least two cross structures includes a first portion 111, a second portion 112, a first connection part 113, a third portion 121, a fourth portion 122, and a second connection part 123; and each remaining cross structure may include a seventh portion 114, an eighth portion 115, and a third connection part 116 that are included in the at least one turn of coil of the first planar coil winding 11, and a ninth portion 124, a tenth portion 125, and a fourth connection part 126 that are included in the at least one turn of coil of the second planar coil winding 12. The seventh portion 114 is provided with a fifth cutting opening 253 that extends along a coil extending direction. The seventh portion 114 includes a fifth outer side part 251 and a fifth inner side part 252 that are separated by the fifth cutting opening 253. The eighth portion 115 is provided with a sixth cutting opening 263 that extends along the coil extending direction. The eighth portion 115 includes a sixth outer side part 261 and a sixth inner side part 262 that are separated by the sixth cutting opening 263. The third connection part 116 is disposed between the fifth inner side part 252 and the sixth outer side part 261.

The ninth portion 124 is provided with a seventh cutting opening 273 that extends along the coil extending direction. The ninth portion 124 includes a seventh outer side part 271 and a seventh inner side part 272 that are separated by the seventh cutting opening 273. The tenth portion 125 is provided with an eighth cutting opening 283 that extends along the coil extending direction. The tenth portion 125 includes an eighth outer side part 281 and an eighth inner side part 282 that are separated by the eighth cutting opening 283. The fourth connection part 126 is disposed between the seventh outer side part 271 and the eighth inner side part 282.

There is an overlap between a projection of the third connection part 116 on the plane of the insulation layer 10 and a projection of the fourth connection part 126 on the plane of the insulation layer 10, the fifth outer side part 251 and the seventh outer side part 271 are connected in parallel, the fifth inner side part 252 and the seventh inner side part 272 are connected in parallel, the sixth outer side part 261 and the eighth outer side part 281 are connected in parallel, and the sixth inner side part 262 and the eighth inner side part 282 are connected in parallel.

Figure 3F:
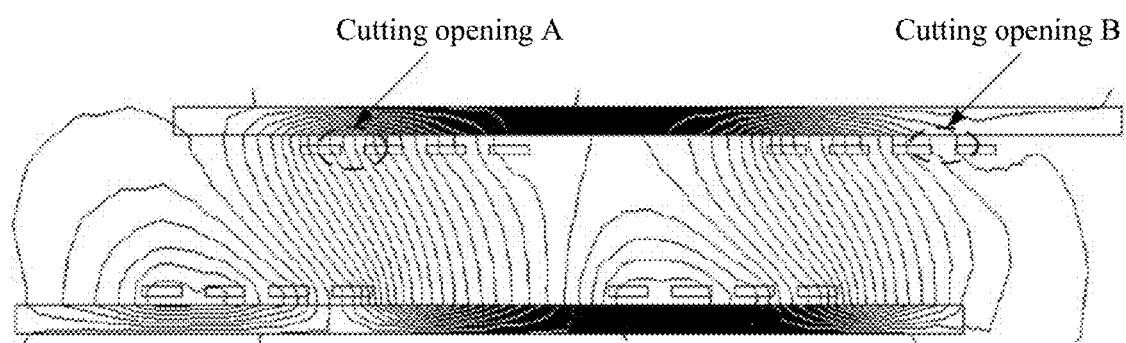
FIG. 3F is a schematic diagram of magnetic field distribution according to an embodiment of this application.

It should be noted that as shown in FIG. 3F, in one embodiment, a transmitter coil module and a receiver coil module do not necessarily completely align, and may deviate from each other to some extent. As a result, a magnetic field between the transmitter coil module and the receiver coil module is unevenly distributed. In this case, magnetic fluxes that flow through a cutting opening A and a cutting opening B in a same turn of coil are different. Consequently, magnitudes of induced currents in a coil on two sides of the cutting opening A are different from those in a coil on two sides of the cutting opening B. In this case, if the at least one turn of coil of the first planar coil winding 11 and the at least one turn of coil of the second planar coil winding 12 form only one cross structure, the induced currents may fail to be totally canceled out because magnitudes of induced currents on two sides of the cross structure are different. Therefore, the at least one turn of coil of the first planar coil winding 11 and the at least one turn of coil of the second planar coil winding 12 may form at least two cross structures. In this case, magnitudes of induced currents on two sides of each of the at least two cross structures are relatively close, so that an effect of canceling out the induced currents can be effectively improved, thereby effectively improving wireless charging efficiency.

In a second detailed structure: a sum of an opening area of the first cutting opening 213 and an opening area of the third cutting opening 233 is equal to or close to a sum of an opening area of the second cutting opening 223 and an opening area of the fourth cutting opening 243.

To be specific, a sum of induced currents generated after a magnetic field passes through the first cutting opening 213 and induced currents generated after the magnetic field passes through the third cutting opening 233 is equal to or close to a sum of induced currents generated after the magnetic field passes through the second cutting opening 223 and induced currents generated after the magnetic field passes through the fourth cutting opening 243.

It should be noted that, that the sum of the opening area of the first cutting opening 213 and the opening area of the third cutting opening 233 is close to the sum of the opening area of the second cutting opening 223 and the opening area of the fourth cutting opening 243 means that, a difference between the sum of the opening area of the first cutting opening 213 and the opening area of the third cutting opening 233 and the sum of the opening area of the second cutting opening 223 and the opening area of the fourth cutting opening 243 is less than or equal to a first preset value. The first preset value may be preset, and the first preset value may be set to a relatively small value. For example, the first preset value may be set to 30% of the sum of the opening area of the first cutting opening 213 and the opening area of the third cutting opening 233, or may be set to 30% of the sum of the opening area of the second cutting opening 223 and the opening area of the fourth cutting opening 243. Certainly, the first preset value may alternatively be set to another value. This is not limited in this embodiment of this application.

In addition, that the sum of the induced currents generated after the magnetic field passes through the first cutting opening 213 and the induced currents generated after the magnetic field passes through the third cutting opening 233 is close to the sum of the induced currents generated after the magnetic field passes through the second cutting opening 223 and the induced currents generated after the magnetic field passes through the fourth cutting opening 243 means that, a difference between the sum of the induced currents generated after the magnetic field passes through the first cutting opening 213 and the induced currents generated after the magnetic field passes through the third cutting opening 233 and the sum of the induced currents generated after the magnetic field passes through the second cutting opening 223 and the induced currents generated after the magnetic field passes through the fourth cutting opening 243 is less than or equal to a second preset value. The second preset value may be preset, and the second preset value may be set to a relatively small value. For example, the second preset value may be 30% of the sum of the induced currents generated after the magnetic field passes through the first cutting opening 213 and the induced currents generated after the magnetic field passes through the third cutting opening 233, or may be 30% of the sum of the induced currents generated after the magnetic field passes through the second cutting opening 223 and the induced currents generated after the magnetic field passes through the fourth cutting opening 243. Certainly, the second preset value may alternatively be set to another value. This is not limited in this embodiment of this application.

Figure 3G:
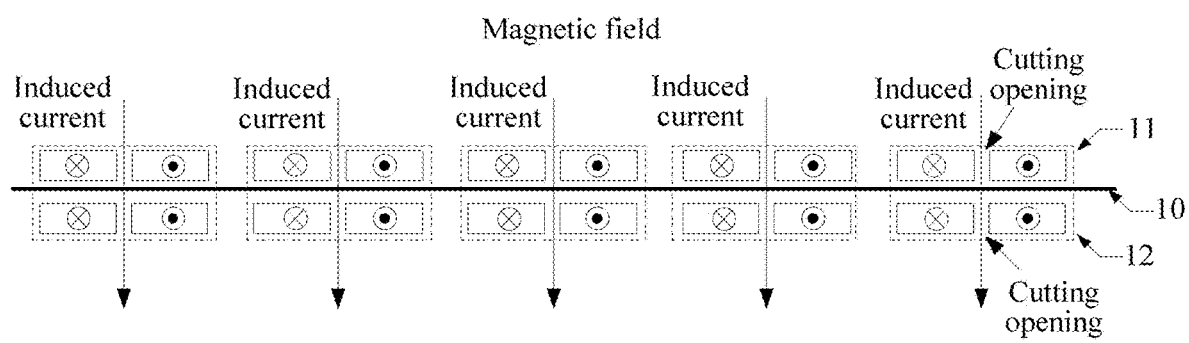
FIG. 3G is a schematic diagram of an induced current in a coil according to an embodiment of this application.

It should be noted that, FIG. 3G is a cross sectional view of FIG. 3A along A-A'. As shown in FIG. 3G, when the magnetic field passes through a cutting opening in each portion, induced currents that are of almost equal magnitudes and in opposite directions are generated in a coil on two sides of the cutting opening. Therefore, when the sum of the opening area of the first cutting opening 213 and the opening area of the third cutting opening 233 is equal to or close to the sum of the opening area of the second cutting opening 223 and the opening area of the fourth cutting opening 243, the sum of the induced currents generated after the magnetic field passes through the first cutting opening 213 and the induced currents generated after the magnetic field passes through the third cutting opening 233 is equal to or close to the sum of the induced currents generated after the magnetic field passes through the second cutting opening 223 and the induced currents generated after the magnetic field passes through the fourth cutting opening 243, so that an effect of canceling out the induced currents can be effectively improved, thereby effectively improving wireless charging efficiency.

Figure 3H:
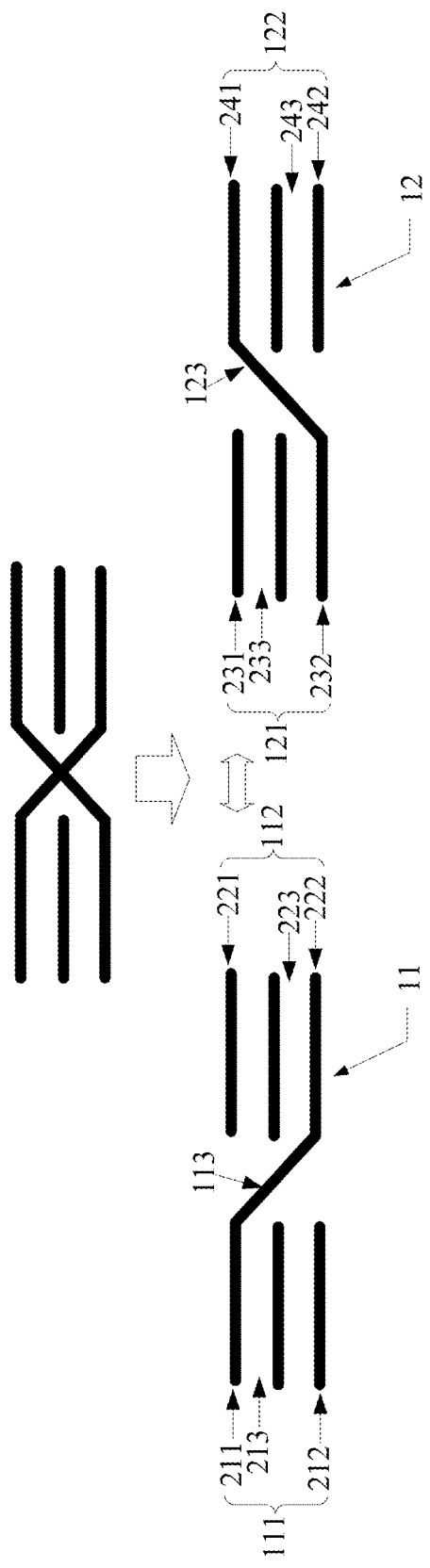
FIG. 3H is a first schematic diagram of a cross between an outer side part and an inner side part according to an embodiment of this application.

In a third detailed structure: referring to FIG. 3H, in addition to the first cutting opening 213, another cutting opening and another part may exist between the first outer side part 211 and the first inner side part 212; in addition to the second cutting opening 223, another cutting opening and another part may exist between the second outer side part 221 and the second inner side part 222; in addition to the third cutting opening 233, another cutting opening and another part may exist between the third outer side part 231 and the third inner side part 232; and in addition to the fourth cutting opening 243, another cutting opening and another part may exist between the fourth outer side part 241 and the fourth inner side part 242.

To be specific, the first portion 111 includes at least two cutting openings, the first portion 111 is divided into at least three parts by the at least two cutting openings, the at least two cutting openings include the first cutting opening 213, and the at least three parts include the first outer side part 211 and the first inner side part 212. The second portion 112 includes at least two cutting openings, the second portion 112 is divided into at least three parts by the at least two cutting openings, the at least two cutting openings include the second cutting opening 223, and the at least three parts include the second outer side part 221 and the second inner side part 222. The third portion 121 includes at least two cutting openings, the third portion 121 is divided into at least three parts by the at least two cutting openings, the at least two cutting openings include the third cutting opening 233, and the at least three parts include the third outer side part 231 and the third inner side part 232. The fourth portion 122 includes at least two cutting openings, the fourth portion 122 is divided into at least three parts by the at least two cutting openings, the at least two cutting openings include the fourth cutting opening 243, and the at least three parts include the fourth outer side part 241 and the fourth inner side part 242.

In this case, parts obtained by dividing the first portion 111 and the third portion 121 and parts obtained by dividing the second portion 112 and the fourth portion 122 may be cross-connected by using connection parts, so that an effect of canceling out induced currents in parts included in the portions can be effectively improved. Therefore, widths of the first portion 111, the third portion 121, the second portion 112, and the fourth portion 122 are reduced, an eddy current loss is reduced; and further, a circulating current loss in the first portion 111, the third portion 121, the second portion 112, and the fourth portion 122 may be reduced, thereby effectively improving wireless charging efficiency.

Figure 3I:
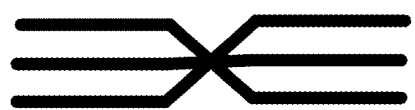
FIG. 3I is a second schematic diagram of a cross between an outer side part and an inner side part according to an embodiment of this application.
Figure 3J:
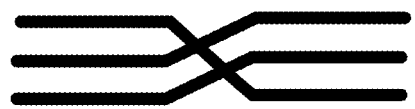
FIG. 3J is a third schematic diagram of a cross between an outer side part and an inner side part according to an embodiment of this application.

For example, when each of the first portion 111, the second portion 112, the third portion 121, and the fourth portion 122 is divided into three parts, the parts may be cross-connected as shown in FIG. 3I or FIG. 3J. A cross structure in FIG. 3I is implemented by using three connection parts. In this case, to ensure that there is no electric connection between the connection parts, the coil module may include three planar coil windings, where the three planar coil windings each include a connection part. In this case, any two of the three planar coil windings may be the first planar coil winding 11 and the second planar coil winding 12, so that the cross structure can be formed in the coil module. A cross structure in FIG. 3J is implemented by using three connection parts. In this case, to ensure that there is no electric connection between the connection parts, the coil module may include two or three planar coil windings. When the coil module includes two planar coil windings, one of the two planar coil windings may include two parallel connection parts, and the other planar coil winding may include the remaining connection part. In this case, the two planar coil windings may be the first planar coil winding 11 and the second planar coil winding 12, so that the cross structure can be formed in the coil module. When the coil module includes three planar coil windings, the three planar coil windings each include a connection part. In this case, any two of the three planar coil windings may be the first planar coil winding 11 and the second planar coil winding 12, so that the cross structure can be formed in the coil module.

Figure 3K:
FIG. 3K is a fourth schematic diagram of a cross between an outer side part and an inner side part according to an embodiment of this application.
Figure 3L:
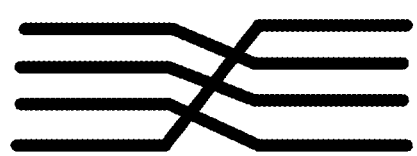
FIG. 3L is a fifth schematic diagram of a cross between an outer side part and an inner side part according to an embodiment of this application.
Figure 3M:
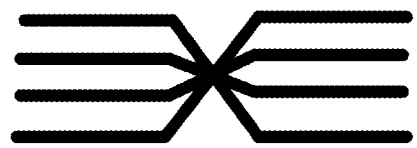
FIG. 3M is a sixth schematic diagram of a cross between an outer side part and an inner side part according to an embodiment of this application.

For another example, when each of the first portion 111, the second portion 112, the third portion 121, and the fourth portion 122 is divided into four parts, the parts may be cross-connected as shown in FIG. 3K, FIG. 3L, or FIG. 3M. Similarly, a cross structure in FIG. 3K may be implemented by using at least two planar coil windings included in the coil module, where any two of the at least two planar coil windings may be the first planar coil winding 11 and the second planar coil winding 12; a cross structure in FIG. 3L may be implemented by using at least two planar coil windings included in the coil module, where any two of the at least two planar coil windings may be the first planar coil winding 11 and the second planar coil winding 12; and a cross structure in FIG. 3M may be implemented by using at least four planar coil windings included in the coil module, where any two of the at least four planar coil windings may be the first planar coil winding 11 and the second planar coil winding 12.

The following describes a structure of the plurality of turns of coils in the first planar coil winding 11 and the second planar coil winding 12.

A part between an end part of an innermost turn of coil of the first planar coil winding 11 and an end part of an outermost turn of coil of the first planar coil winding 11 is a first coil part, and a part of at least one turn of coil in the first coil part other than a connection part includes a plurality of portions. Each portion is provided with a cutting opening that extends along a coil extending direction. A total length of cutting openings in the plurality of portions is less than or equal to a total length of the part of the at least one turn of coil other than the connection part.

Figure 4A:
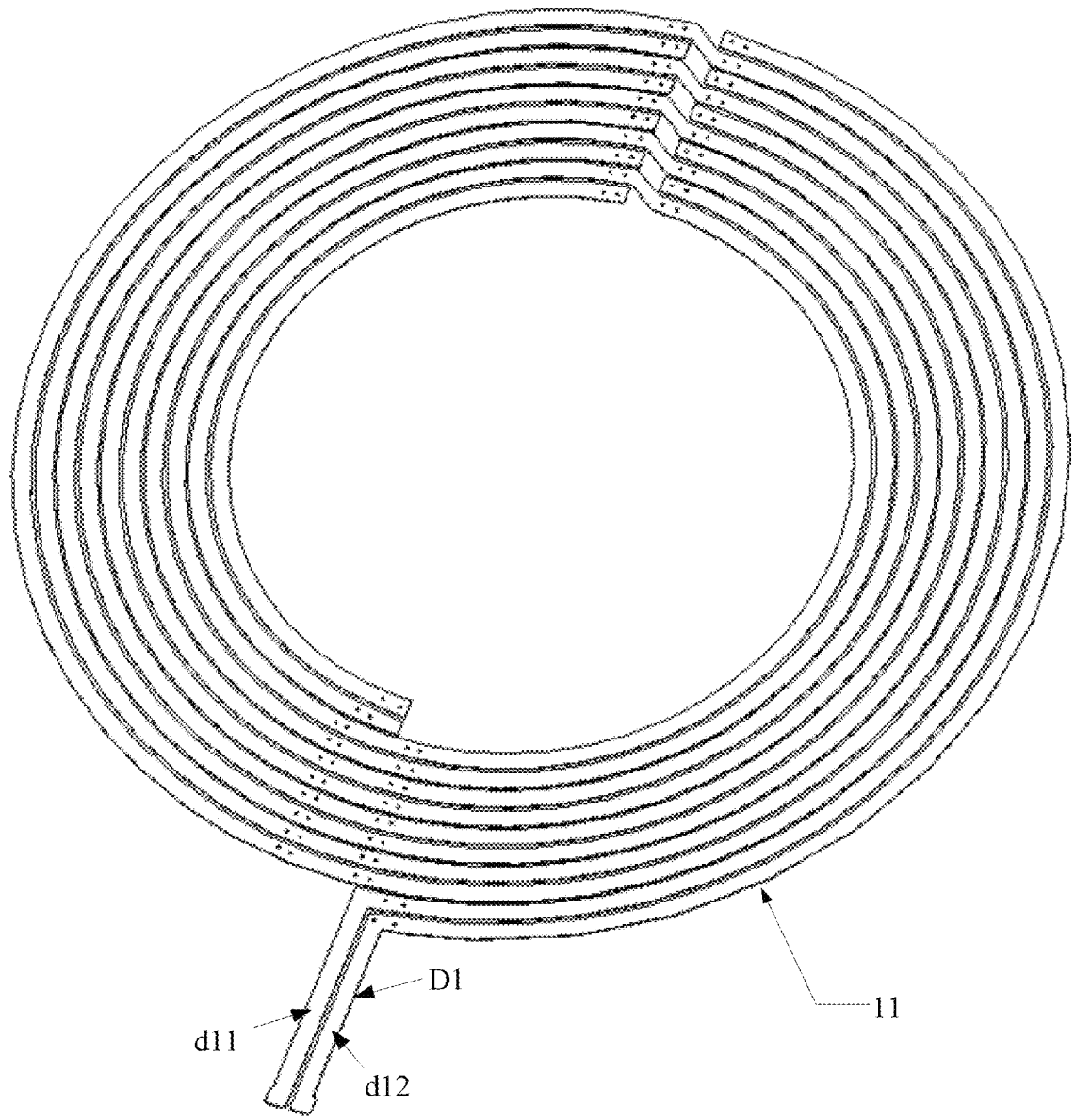
FIG. 4A is a schematic structural diagram of a first planar coil winding according to an embodiment of this application.
Figure 4B:
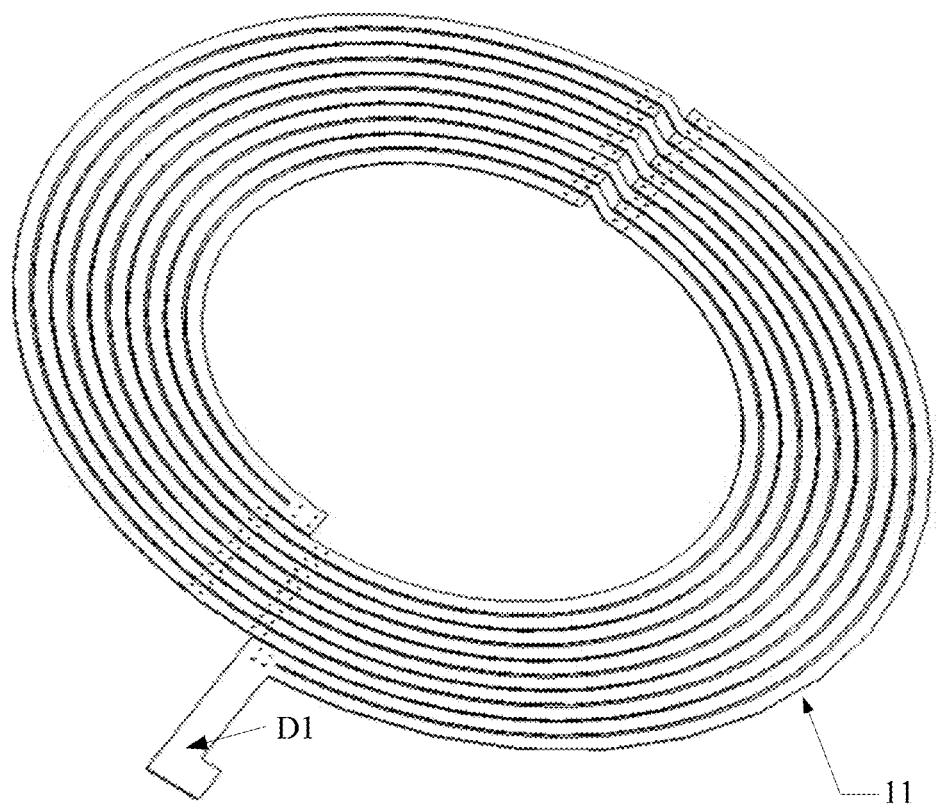
FIG. 4B is another schematic structural diagram of a first planar coil winding according to an embodiment of this application.
Figure 4C:
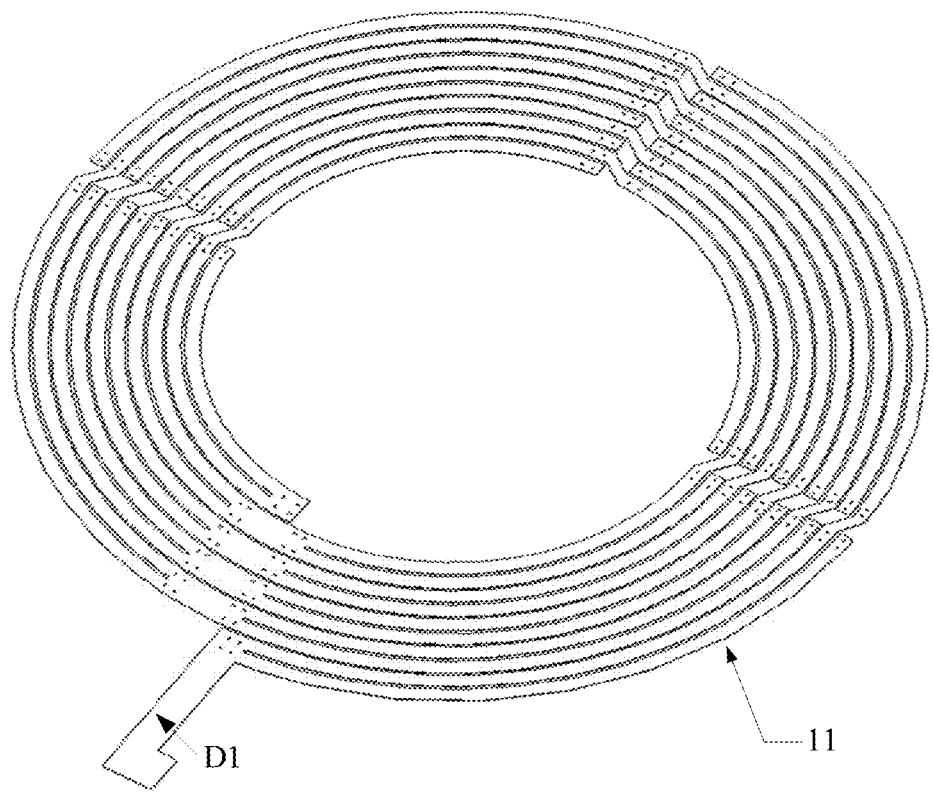
FIG. 4C is still another schematic structural diagram of a first planar coil winding according to an embodiment of this application.
Figure 4D:
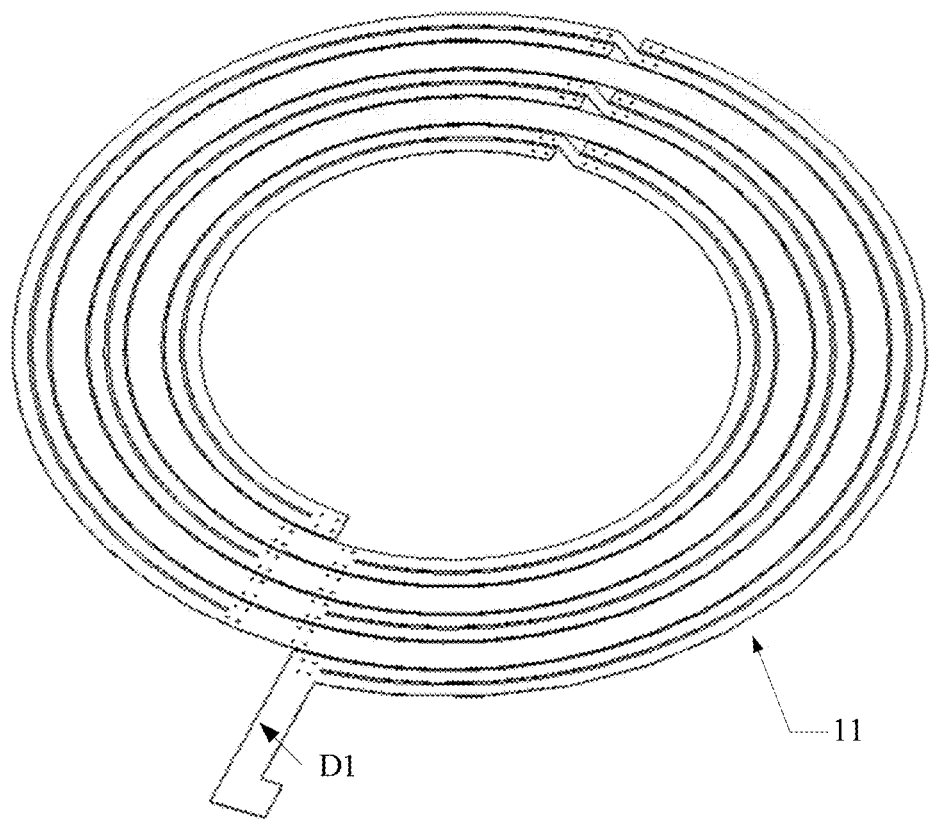
FIG. 4D is yet another schematic structural diagram of a first planar coil winding according to an embodiment of this application.

To be specific, as shown in FIG. 4A or FIG. 4B, when the at least one turn of coil is all turns of coils in the first coil part, and when the total length of the cutting openings in the plurality of portions is equal to the total length of the part of the at least one turn of coil other than the connection part, the first coil part is an all-cut structure. As shown in FIG. 4C, when the at least one turn of coil is all turns of coils in the first coil part, and the total length of the cutting openings in the plurality of portions is less than the total length of the part of the at least one turn of coil other than the connection part, the first coil part is a partially-cut structure. In this case, all turns of coils in the first coil part are cut. For example, some turns of coils are all cut, and some turns of coils are partially cut, or all turns of coils are partially cut. As shown in FIG. 4D, when the at least one turn of coil is some turns of coils in the first coil part, and when the total length of the cutting openings in the plurality of portions is equal to the total length of the part of the at least one turn of coil other than the connection part, the first coil part is a partially-cut structure. In this case, some turns of coils in the first coil part are all cut, and the remaining turns of coils are not cut. When the at least one turn of coil is some turns of coils in the first coil part, and the total length of the cutting openings in the plurality of portions is less than the total length of the part of the at least one turn of coil other than the connection part, the first coil part is a partially-cut structure. In this case, some turns of coils in the first coil part are not cut, and some of the remaining turns of coils are all cut, and some turns of coils are partially cut, or all of the remaining turns of coils are partially cut.

A part between an end part of an innermost turn of coil of the second planar coil winding 12 and an end part of an outermost turn of coil of the second planar coil winding 12 is a second coil part, and a part of at least one turn of coil in the second coil part other than a connection part includes a plurality of portions. Each portion is provided with a cutting opening that extends along the coil extending direction. A total length of cutting openings in the plurality of portions is less than or equal to a total length of the part of the at least one turn of coil other than the connection part.

Figure 4E:
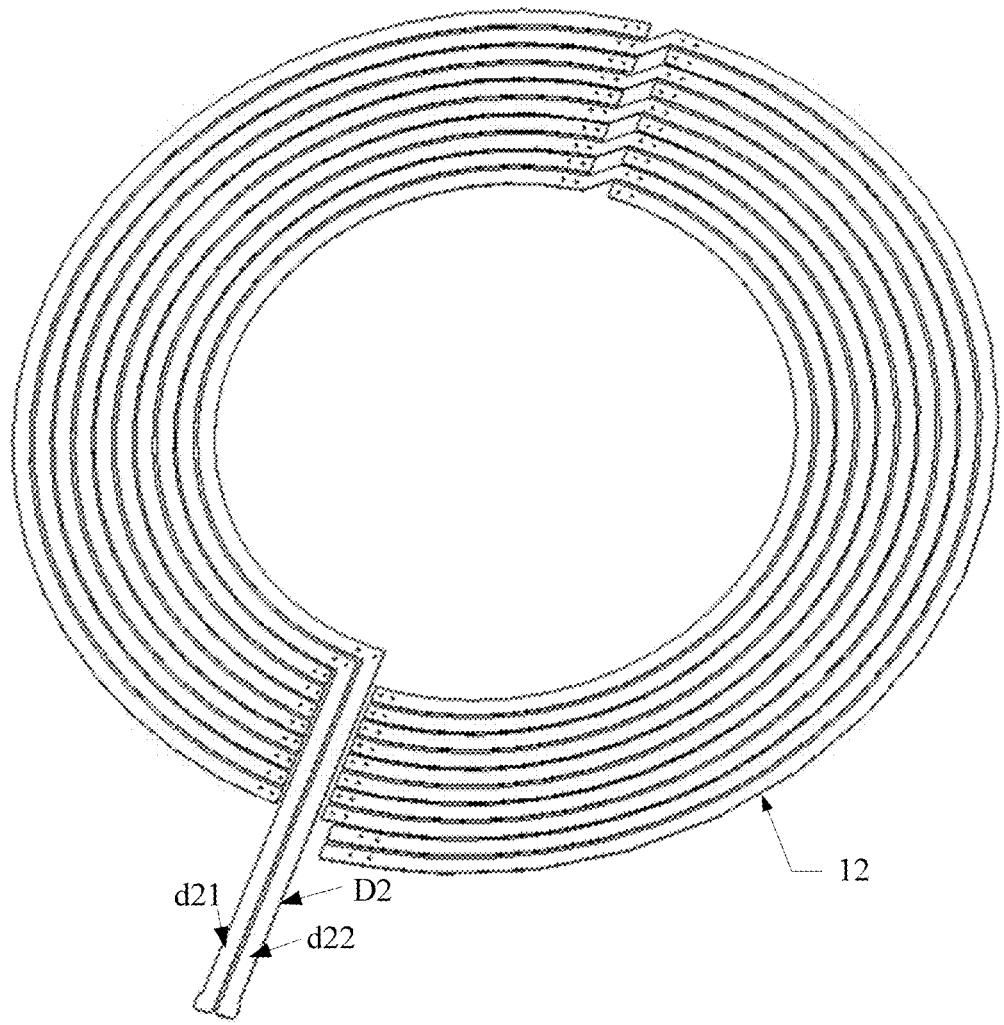
FIG. 4E is a schematic structural diagram of a second planar coil winding according to an embodiment of this application.
Figure 4F:
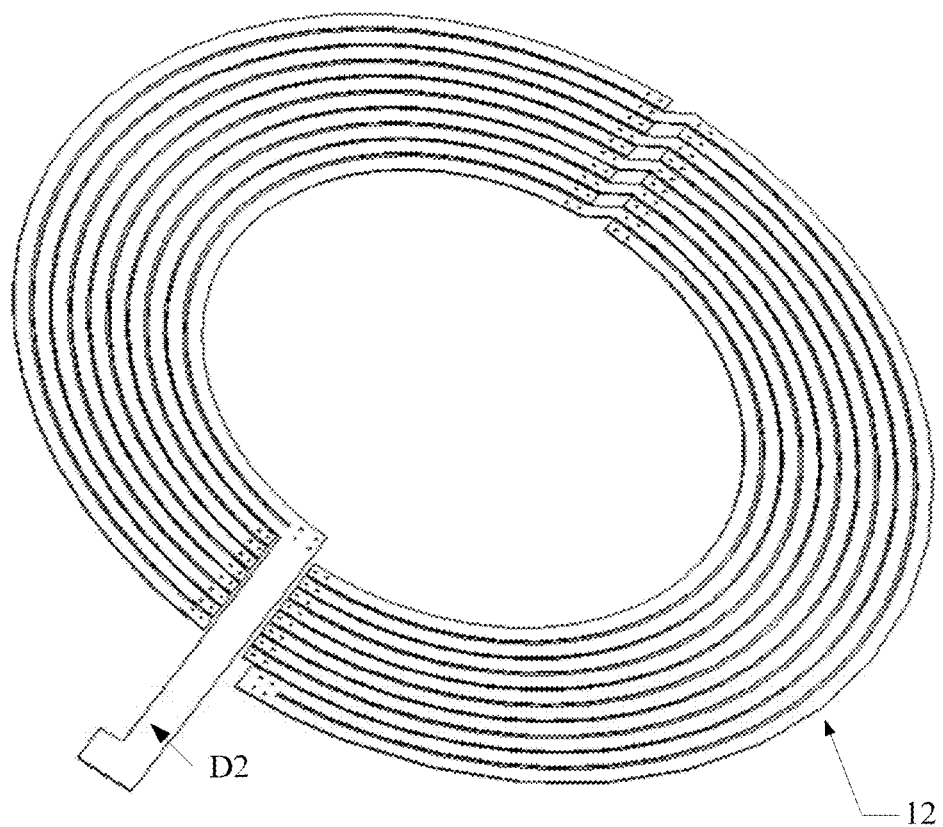
FIG. 4F is another schematic structural diagram of a second planar coil winding according to an embodiment of this application.
Figure 4G:
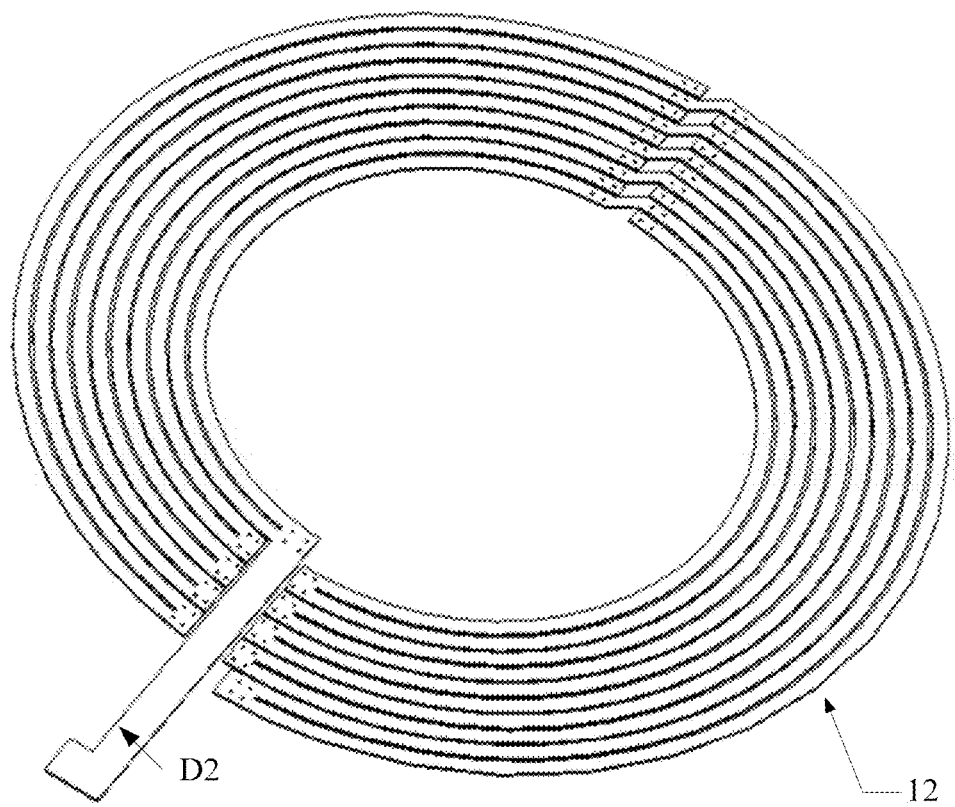
FIG. 4G is still another schematic structural diagram of a second planar coil winding according to an embodiment of this application.
Figure 4H:
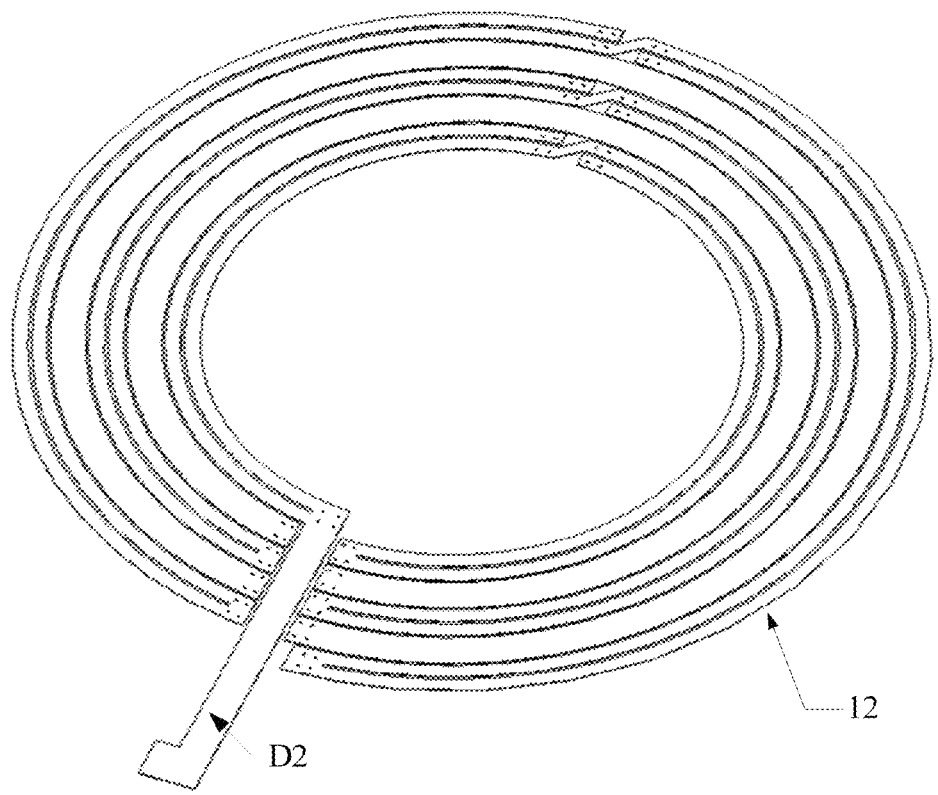
FIG. 4H is yet another schematic structural diagram of a second planar coil winding according to an embodiment of this application.

To be specific, as shown in FIG. 4E or FIG. 4F, when the at least one turn of coil is all turns of coils in the second coil part, and when the total length of the cutting openings in the plurality of portions is equal to the total length of the part of the at least one turn of coil other than the connection part, the second coil part is an all-cut structure. As shown in FIG. 4G, when the at least one turn of coil is all turns of coils in the second coil part, and the total length of the cutting openings in the plurality of portions is less than the total length of the part of the at least one turn of coil other than the connection part, the second coil part is a partially-cut structure. In this case, all turns of coils in the second coil part are cut. For example, some turns of coils are all cut, and some turns of coils are partially cut, or all turns of coils are partially cut. As shown in FIG. 4H, when the at least one turn of coil is some turns of coils in the second coil part, and when the total length of the cutting openings in the plurality of portions is equal to the total length of the part of the at least one turn of coil other than the connection part, the second coil part is a partially-cut structure. In this case, some turns of coils in the second coil part are all cut, and the remaining turns of coils are not cut. When the at least one turn of coil is some turns of coils in the second coil part, and the total length of the cutting openings in the plurality of portions is less than the total length of the part of the at least one turn of coil other than the connection part, the second coil part is a partially-cut structure. In this case, some turns of coils in the second coil part are not cut, and some of the remaining turns of coils are all cut, and some turns of coils are partially cut, or all of the remaining turns of coils are partially cut.

Figure 5:
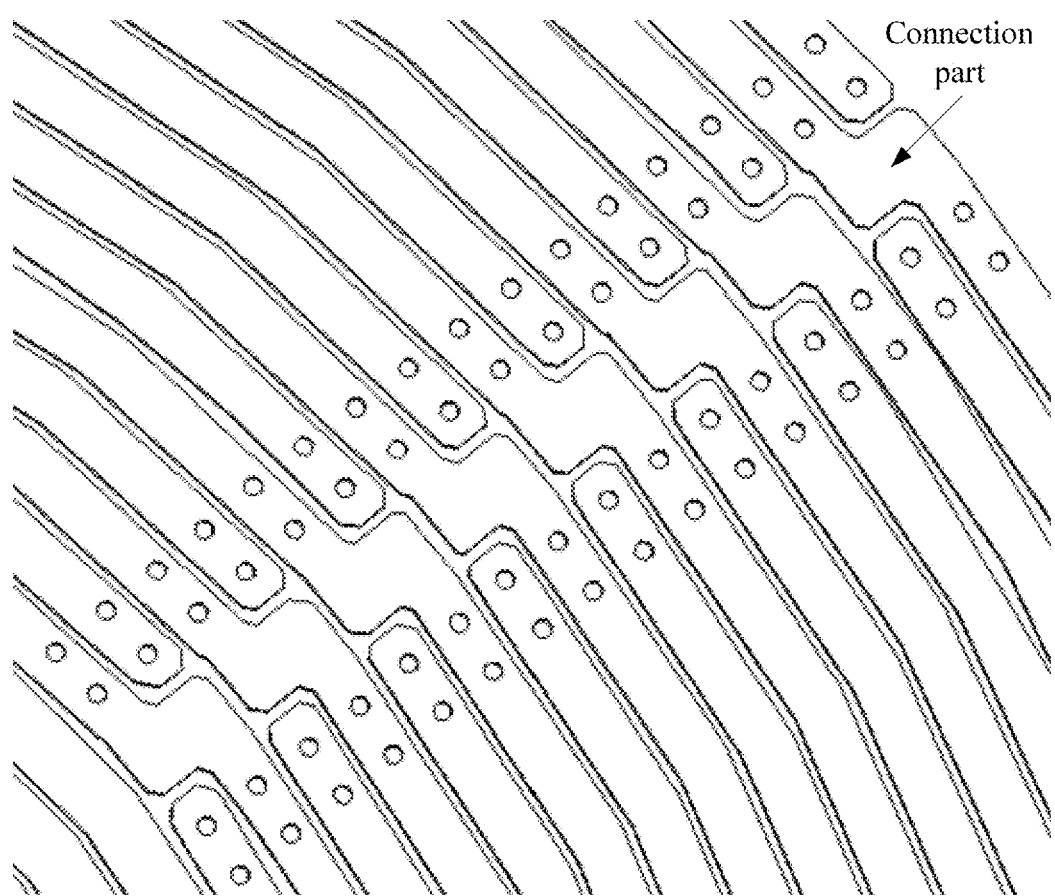
FIG. 5 is a schematic structural diagram of a connection part according to an embodiment of this application.

It should be noted that as shown in FIG. 5, in one embodiment, coil widths of the connection parts (such as the first connection part 113, the second connection part 123, the third connection part 116, and the fourth connection part 126) included in the first planar coil winding 11 and the second planar coil winding 12 may be increased appropriately, so as to reduce direct current resistance, and enhance a current conduction capability of the connection parts, thereby further improving wireless charging efficiency of the coil module.

Further, the coil module further includes a lead-in end and a lead-out end that connect the first planar coil winding 11 and the second planar coil winding 12 to an external circuit.

The external circuit may provide electric energy for the first planar coil winding 11 and the second planar coil winding 12 by using the lead-in end and the lead-out end, or the first planar coil winding 11 and the second planar coil winding 12 may output electric energy to the external circuit by using the lead-in end and the lead-out end. Specifically, the lead-in end and the lead-out end of the coil module may include the following two structures.

Figure 6A:
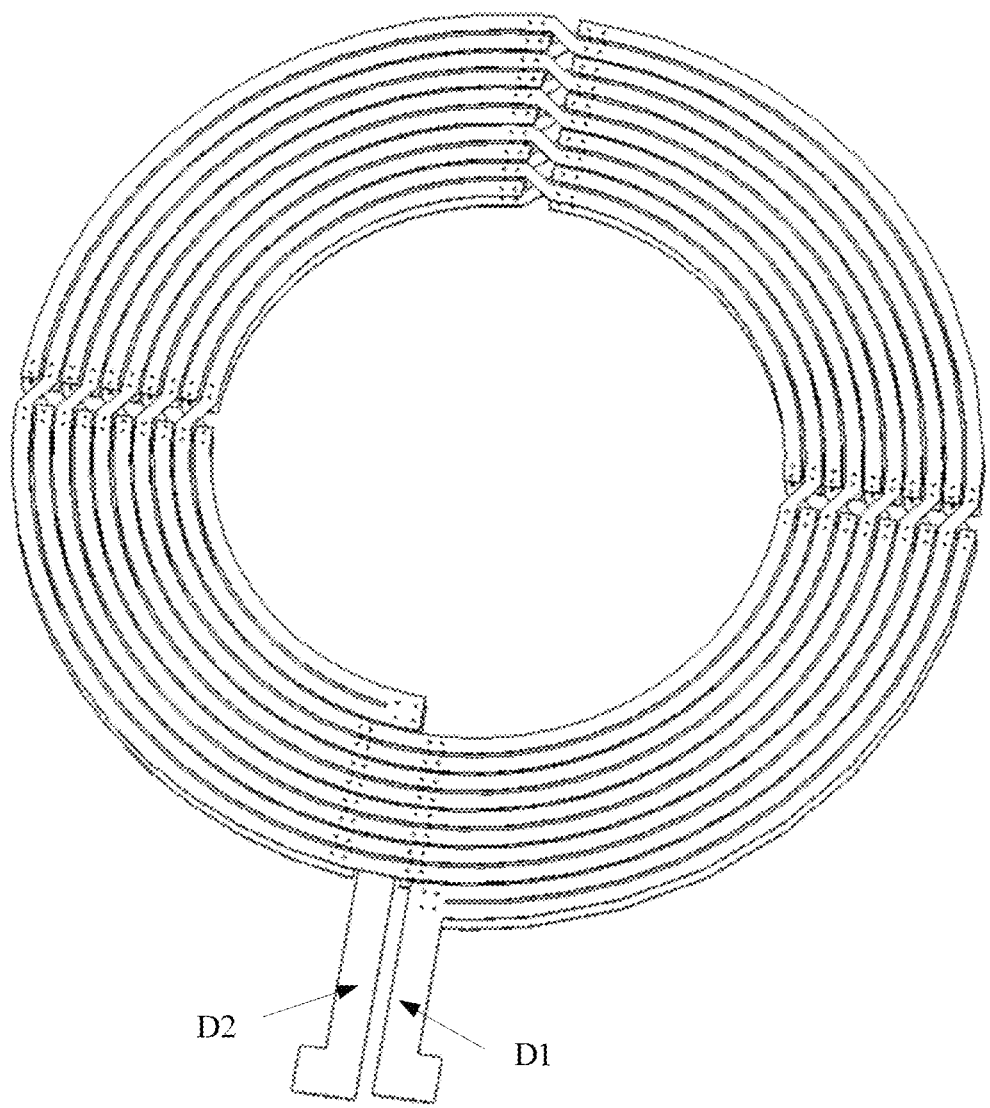
FIG. 6A is a fifth schematic structural diagram of a coil module according to an embodiment of this application.
Figure 6B:
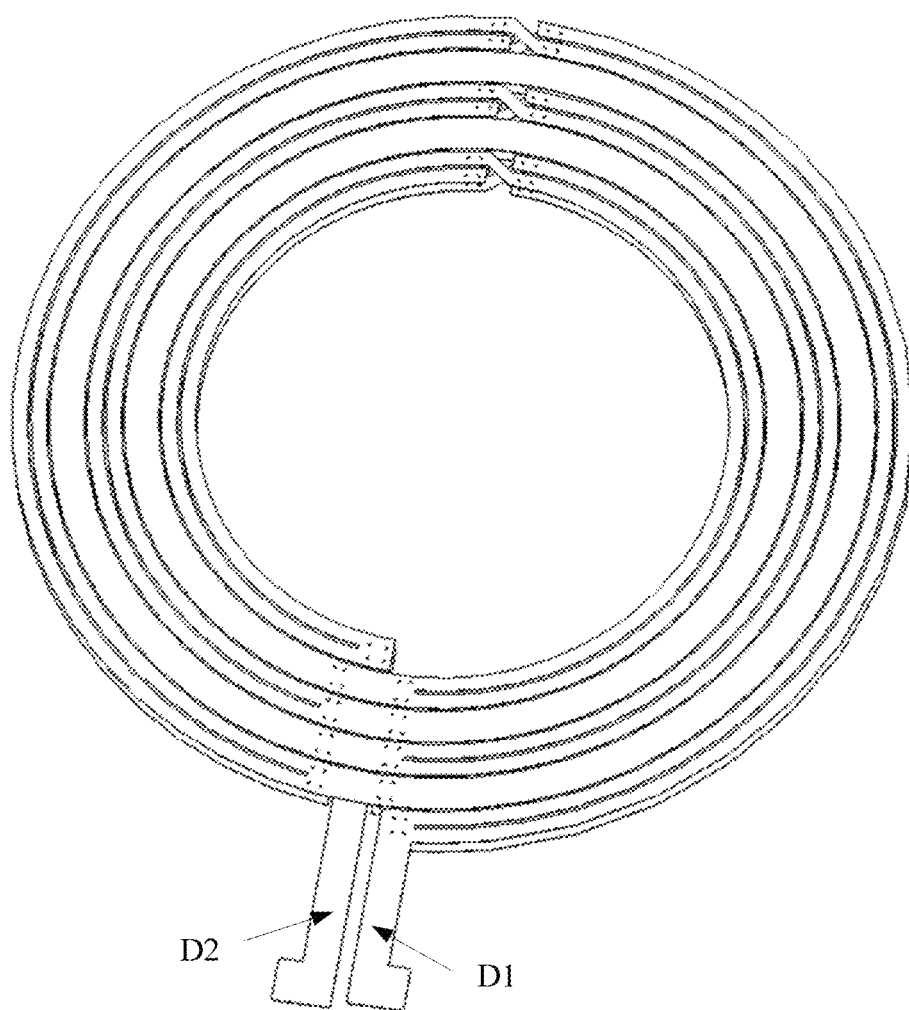
FIG. 6B is a sixth schematic structural diagram of a coil module according to an embodiment of this application.
Figure 6C:
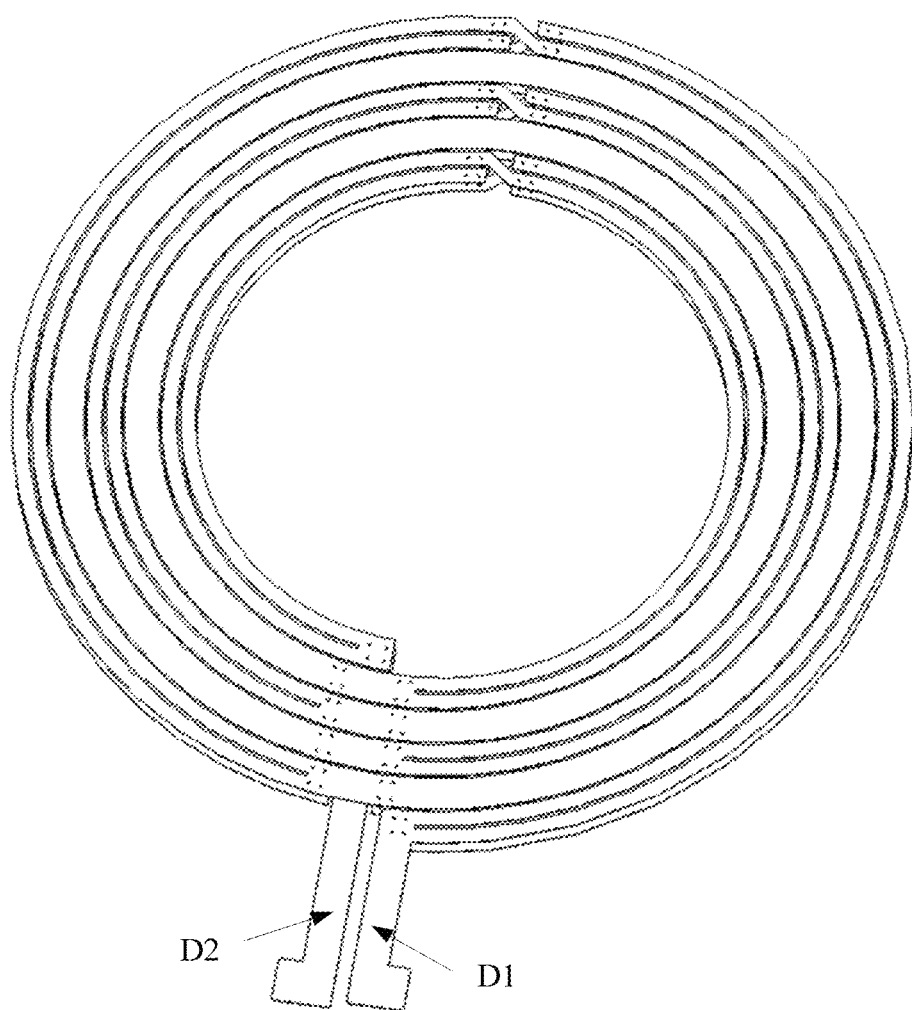
FIG. 6C is a seventh schematic structural diagram of a coil module according to an embodiment of this application.

In a first lead-in/lead-out structure: referring to FIG. 4B, FIG. 4F, and FIG. 6A, or referring to FIG. 4C, FIG. 4G, and FIG. 6B, or referring to FIG. 4D, FIG. 4H, and FIG. 6C, the coil module further includes a first wire D1 and a second wire D2; one end of the first wire D1 coincides with the end part of the outermost turn of coil of the first planar coil winding 11, and the other end of the first wire D1 is a first end of the coil module; one end of the second wire D2 is the end part of the innermost turn of coil of the second planar coil winding 12, and the other end of the second wire D2 is a second end of the coil module.

It should be noted that, when the first end of the coil module is a lead-in end, the second end of the coil module is a lead-out end, and when the first end of the coil module is a lead-out end, the second end of the coil module is a lead-in end.

In addition, one end of the first wire D1 may be further connected to the end part of the outermost turn of coil of the second planar coil winding 12 by using a via; and one end of the second wire D2 may be further connected to the end part of the innermost turn of coil of the first planar coil winding 11 by using a via.

Figure 6D:
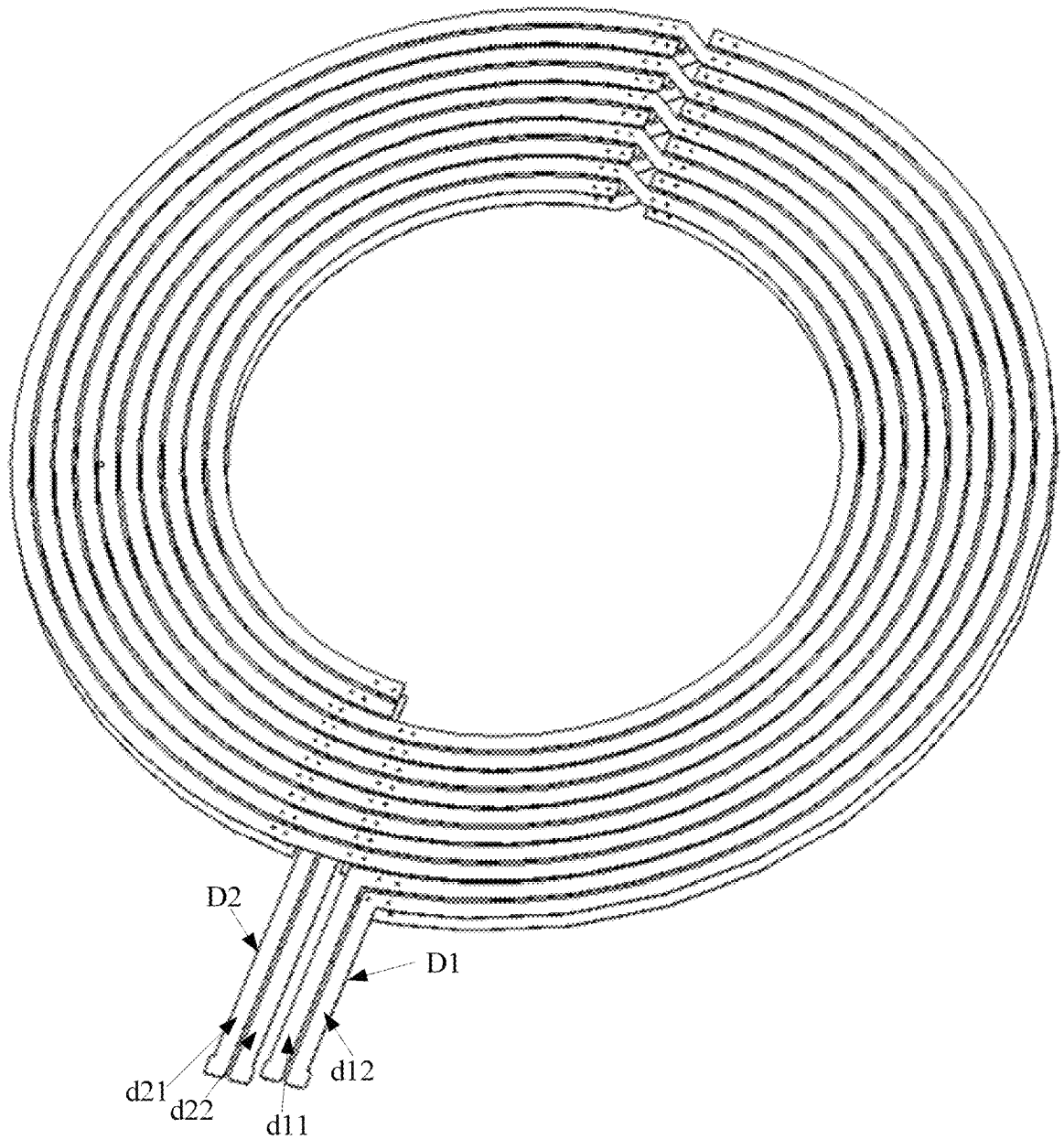
FIG. 6D is an eighth schematic structural diagram of a coil module according to an embodiment of this application.

Further, referring to FIG. 4A, FIG. 4E, and FIG. 6D, the first wire D1 includes a first branch d11 and a second branch d12 that are partially separated or completely separated, and both the first branch d11 and the second branch d12 extend along an extending direction of the first wire D1; and the second wire D2 includes a third branch d21 and a fourth branch d22 that are partially separated or completely separated, and both the third branch d21 and the fourth branch d22 extend along an extending direction of the second wire D2.

It should be noted that, when the first branch d11 and the second branch d12 are partially separated, the first wire D1 further includes a first common part, one end of each of the first branch d11 and the second branch d12 coincides with the first common part, and the other end of the first branch d11 and the other end of second branch d12 are joined by a terminal to form the first end of the coil module. When the first branch d11 and the second branch d12 are completely separated, one end of each of the first branch d11 and the second branch d12 coincides with or is connected to the end part of the outermost turn of coil of the first planar coil winding 11, and the other end of the first branch d11 and the other end of second branch d12 are joined by a terminal to form the first end of the coil module.

In addition, when the third branch d21 and the fourth branch d22 are partially separated, the second wire D2 further includes a second common part, one end of each of the third branch d21 and the fourth branch d22 coincides with the second common part, and the other end of the third branch d21 and the other end of the fourth branch d22 are joined by a terminal to form the second end of the coil module. When the third branch d21 and the fourth branch d22 are completely separated, one end of each of the third branch d21 and the fourth branch d22 coincides with or is connected to the end part of the innermost turn of coil of the second planar coil winding 12, and the other end of the third branch d21 and the other end of the fourth branch d22 are joined by a terminal to form the second end of the coil module.

It should be noted that, when the first branch d11 and the second branch d12 are completely separated, if the first coil part is an all-cut structure, the first planar coil winding 11 is an all-cut structure. When the third branch d21 and the fourth branch d22 are completely separated, if the second coil part is an all-cut structure, the second planar coil winding 12 is an all-cut structure.

Figure 6E:
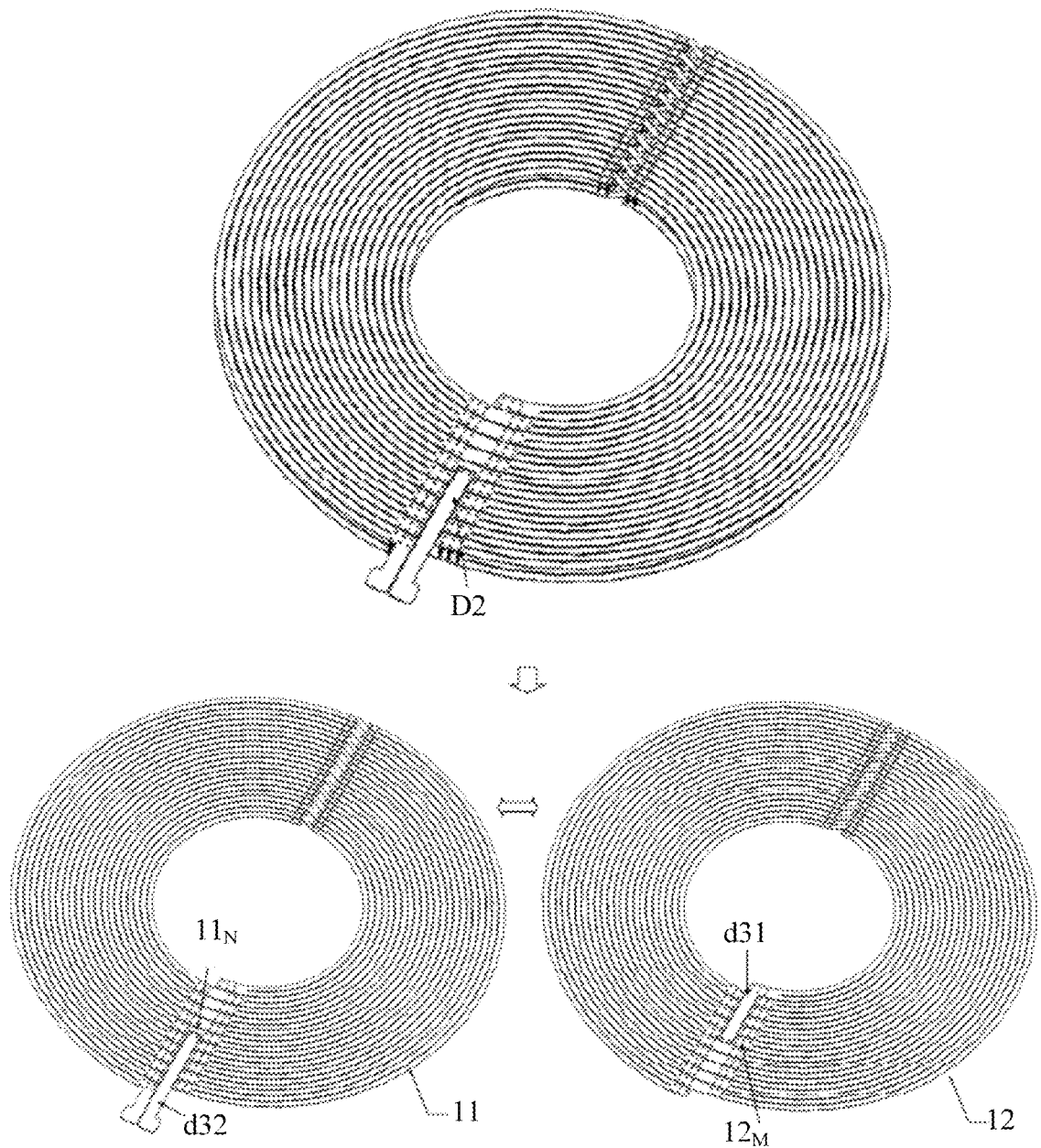
FIG. 6E is a ninth schematic structural diagram of a coil module according to an embodiment of this application.

Further, referring to FIG. 6E, the second wire D2 includes a fifth portion d31 and a sixth portion d32; one end of the fifth portion d31 is the end part of the innermost turn of coil of the second planar coil winding 12, and the other end of the fifth portion d31 is in an $M^{th}$ turn of coil 12m of the second planar coil winding 12, where the $M^{th}$ turn of coil 12m is any turn of coil in the second planar coil winding 12 other than the innermost turn of coil and the outermost turn of coil; one end of the sixth portion d32 is in an $N^{th}$ turn of coil $11_N$ of the first planar coil winding 11, and the other end of the sixth portion d32 is the second end of the coil module, where the $N^{th}$ turn of coil $11_N$ is any turn of coil in the first planar coil winding 11 other than the innermost turn of coil and the outermost turn of coil; and along the thickness direction of the insulation layer 10, there is an overlap between a projection of the $N^{th}$ turn of coil $11_N$ on the plane of the insulation layer 10 and a projection of the $M^{th}$ turn of coil 12m on the plane of the insulation layer 10, where the overlap is connected by using a via.

Figure 6F:
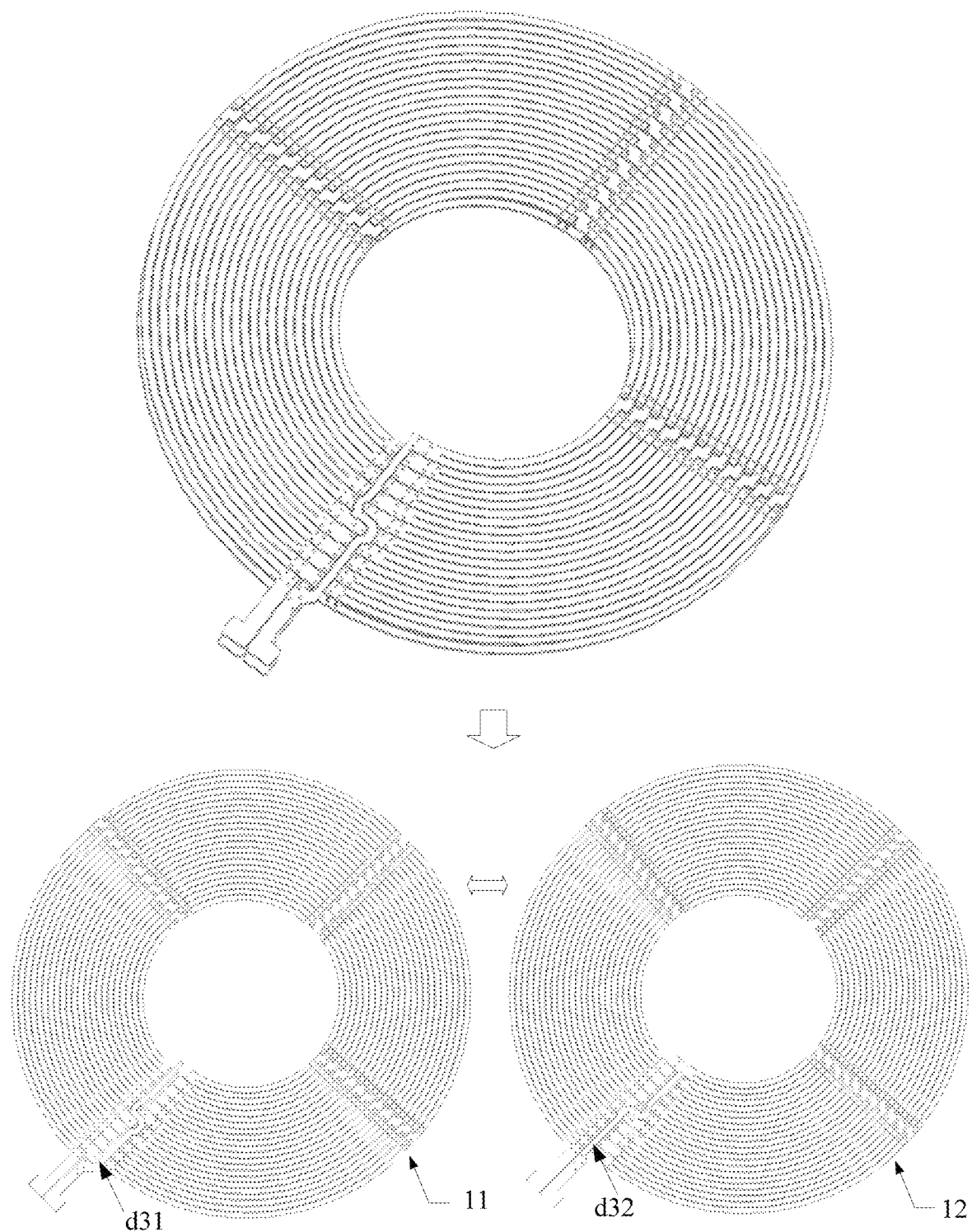
FIG. 6F is a tenth schematic structural diagram of a coil module according to an embodiment of this application.

In a second lead-in/lead-out structure: referring to FIG. 6F, the coil module further includes a fifth portion d31 and a sixth portion d32; one end of the fifth portion d31 is the end part of the innermost turn of coil of the first planar coil winding 11, one end of the sixth portion d32 is the end part of the innermost turn of coil of the second planar coil winding 12, the other end of the fifth portion d31 and the other end of the sixth portion d32 form the second end of the coil module; and along the thickness direction of the insulation layer 10, there is a cross between a projection of the fifth portion d31 on the plane of the insulation layer 10 and a projection of the sixth portion d32 on the plane of the insulation layer 10, and the cross is in a region of projections of the first planar coil winding 11 and the second planar coil winding 12 on the plane of the insulation layer 10.

It should be noted that, the second end of the coil module may be the lead-in end or the lead-out end of the coil module.

In addition, there is the cross between the projection of the fifth portion d31 on the plane of the insulation layer 10 and the projection of the sixth portion d32 on the plane of the insulation layer 10, and induced currents in the fifth portion d31 and the sixth portion d32 can cancel each other out, so that a circulating current loss in the fifth portion d31 and the sixth portion d32 can be reduced, thereby improving wireless charging efficiency.

Figure 6G:
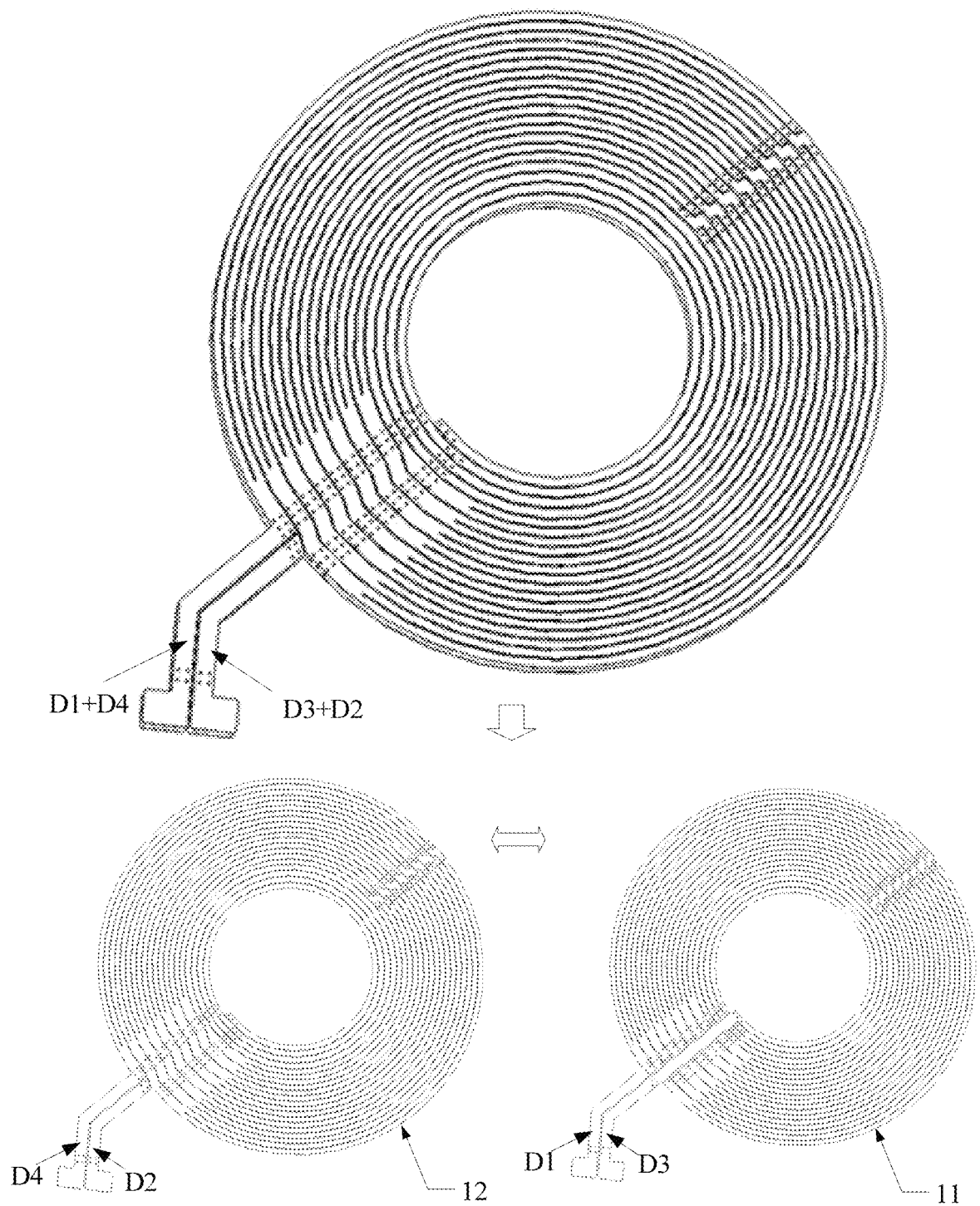
FIG. 6G is an eleventh schematic structural diagram of a coil module according to an embodiment of this application.

It should be noted that in this embodiment of this application, a structure of the lead-in end and the lead-out end is described by using only the foregoing two lead-in/lead-out structures as an example, and in some embodiments, the structure of the lead-in end and the lead-out end of the coil module may alternatively be a combination of the foregoing two lead-in/lead-out structures, or may be another structure than the two lead-in/lead-out structures, provided that the structure can implement electric energy transmission between the external circuit and the first planar coil module 11 and the second planar coil module 12. For example, one of the lead-in end and the lead-out end of the coil module may be the other end of the first wire D1 in the first lead-in/lead-out structure, and the other of the lead-in end and the lead-out end of the coil module may be an end formed by the other end of the fifth portion d31 and the other end of the sixth portion d32 in the second lead-in/lead-out structure. Alternatively, as shown in FIG. 6G, the coil module may further include a third wire D3 and a fourth wire D4. On the basis of the first lead-in/lead-out structure, one end of the third wire D3 coincides with the end part of the innermost turn of coil of the first planar coil winding 11, and the other end of the third wire D3 is the second end of the coil module, one end of the fourth wire D4 is the end part of the outermost turn of coil of the second planar coil winding 12, and the other end of the fourth wire D4 is the first end of the coil module. In this case, the first end of the coil module is formed by the other end of the first wire D1 and the other end of the fourth wire D4, and the second end of the coil module is formed by the other end of the second wire D2 and the other end of the third wire D3.

Figure 7:
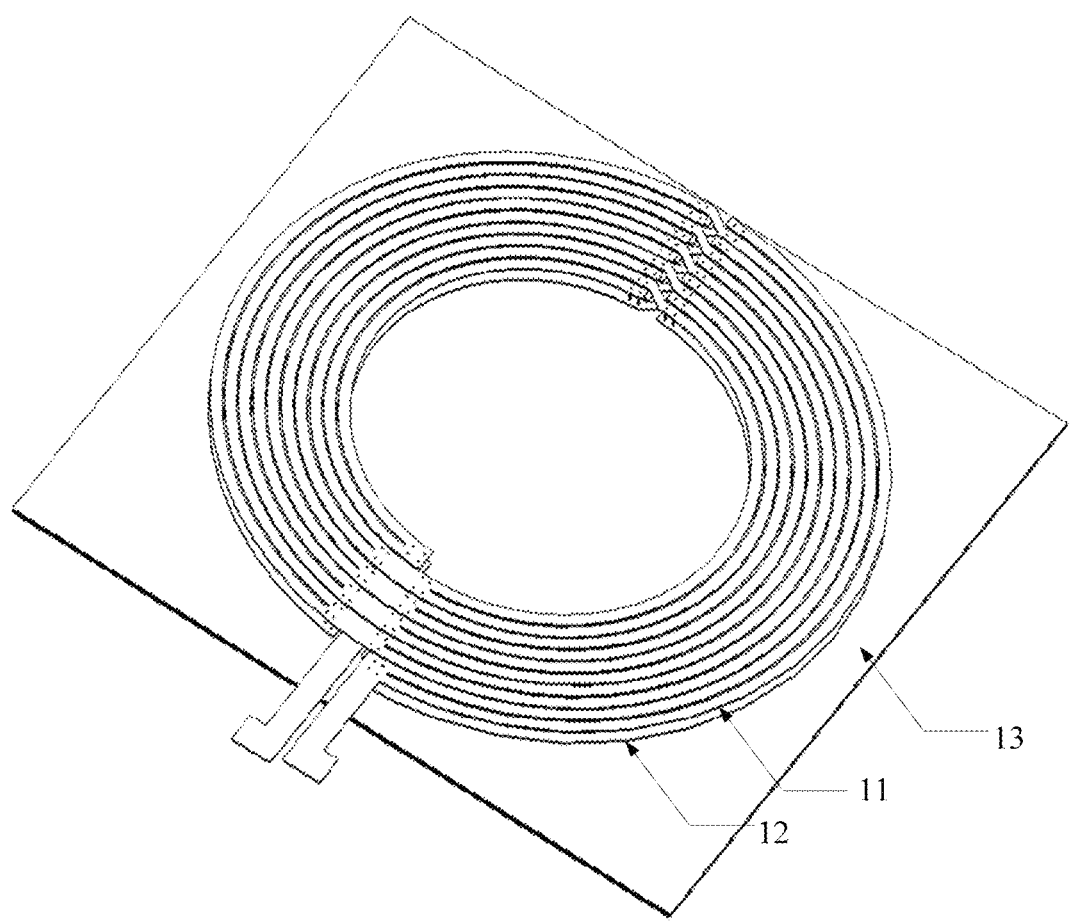
FIG. 7 is a twelfth schematic structural diagram of a coil module according to an embodiment of this application.

Further, referring to FIG. 7, the coil module further includes a magnetic conduction piece 13. The first planar coil winding 11 or the second planar coil winding 12 is on the magnetic conduction piece 13, and is insulated from the magnetic conduction piece 13.

It should be noted that, when the coil module is normally placed, one of the first planar coil winding 11 and the second planar coil winding 12 is on the other planar coil winding, and the magnetic conduction piece 13 may be under the other planar coil winding. The magnetic conduction piece 13 has a magnetic conduction function, and can improve an inductance value of the first planar coil winding 11 and an inductance value of the second planar coil winding 12, and prevent a magnetic field from leaking into space below the magnetic conduction piece 13, effectively shielding the space below the magnetic conduction piece 13. The magnetic conduction piece 13 may be made of at least one magnetic material such as ferrite, an amorphous material, and nanocrystalline. This is not limited in this embodiment of this application.

In this embodiment of this application, the coil module includes the insulation layer, the first planar coil winding, and the second planar coil winding, where the first planar coil winding is on one side of the insulation layer, the second planar coil winding is on the other side of the insulation layer, and the first planar coil winding and the second planar coil winding each include a plurality of turns of coils. At least one turn of coil of the first planar coil winding includes the first portion, the second portion, and the first connection part, and at least one turn of coil of the second planar coil winding includes the third portion, the fourth portion, and the second connection part. An outer side part of the first portion and an inner side part of the second portion and an outer side part of the third portion and an inner side part of the fourth portion are cross-connected by using the first connection part and the second connection part, so that when a magnetic field passes through cutting openings in the first portion, the second portion, the third portion, and the fourth portion, induced currents generated in outer side parts and inner side parts of the first portion, the second portion, the third portion, and the fourth portion can cancel each other out, thereby effectively reducing a circulating current loss in the first planar coil winding and a circulating current loss in the second planar coil winding, and improving wireless charging efficiency of the coil module.

Figure 8A:
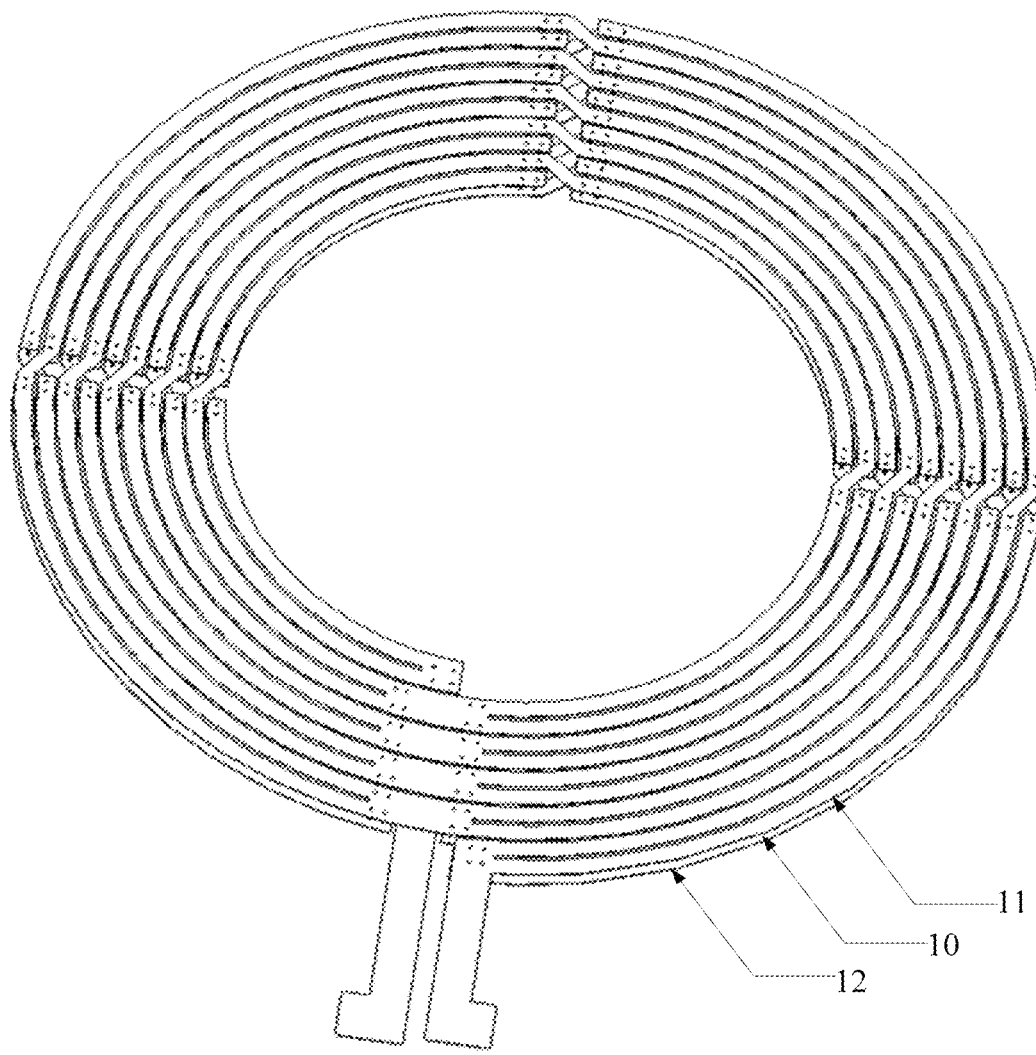
FIG. 8A is a thirteenth schematic structural diagram of a coil module according to an embodiment of this application.
Figure 8B:
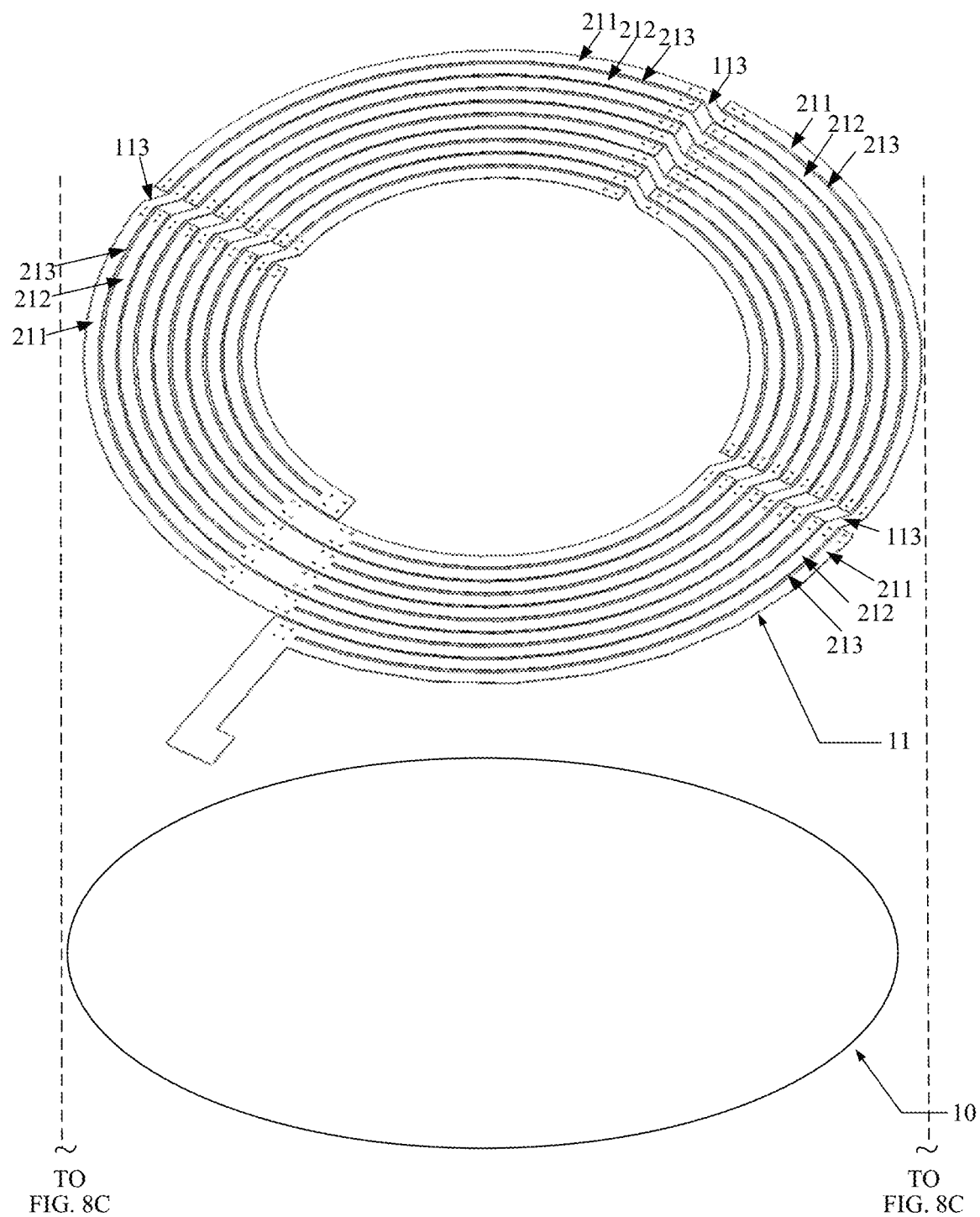
FIG. 8B and FIG. 8C are a fourteenth schematic structural diagram of a coil module according to an embodiment of this application.
Figure 8C:
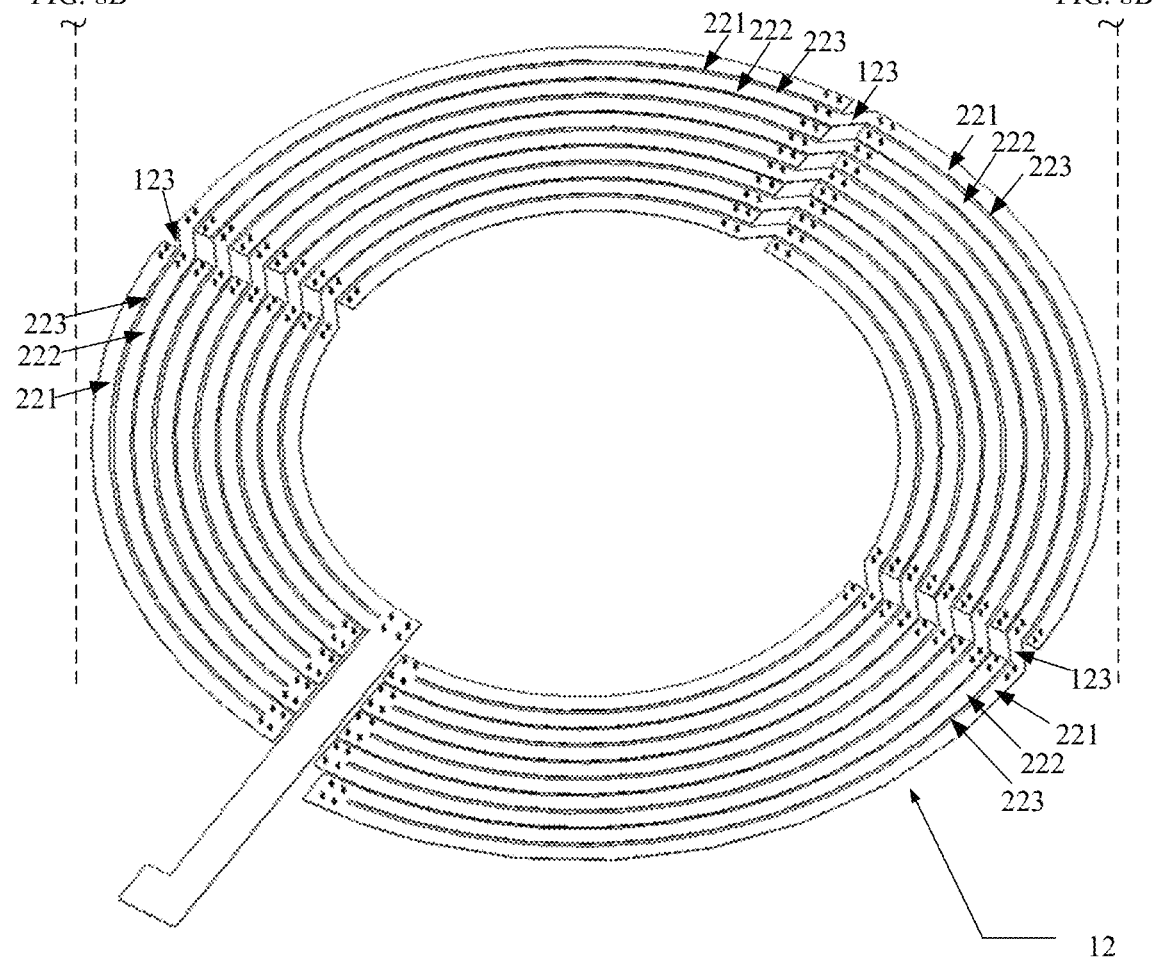

FIG. 8A is a schematic structural diagram of a coil module according to an embodiment of this application. Referring to FIG. 8A, the coil module includes a first planar coil winding 11 disposed on one side of an insulation layer 10 and a second planar coil winding 12 disposed on the other side of the insulation layer 10. Referring to FIG. 8A, FIG. 8B, and FIG. 8C, the first planar coil winding 11 and the second planar coil winding 12 each include a plurality of turns of coils.

At least one turn of coil of the first planar coil winding 11 includes a plurality of portions, and a first connection part 113 is disposed between two adjacent portions of the plurality of portions. Each portion is provided with a first cutting opening 213 that extends along a coil extending direction, and includes a first outer side part 211 and a first inner side part 212 that are separated by the first cutting opening 213. The first connection part 113 connects a first inner side part 212 of one of the two adjacent portions and a first outer side part 211 of the other of the two adjacent portions. At least one turn of coil of the second planar coil winding 12 includes a plurality of portions, and a second connection part 123 is disposed between two adjacent portions of the plurality of portions. Each portion is provided with a second cutting opening 223 that extends along the coil extending direction, and includes a second outer side part 221 and a second inner side part 222 that are separated by the second cutting opening 223. The second connection part 123 is connected to a second inner side part 222 of one of the two adjacent portions and a second outer side part 221 of the other of the two adjacent portions.

There is an overlap between a projection of the first connection part 113 on a plane of the insulation layer 10 and a projection of the second connection part 123 on the plane of the insulation layer 10. The first outer side part 211 and the second outer side part 221 are connected in parallel, and the first inner side part 212 and the second inner side part 222 are connected in parallel.

When there is the overlap between the projection of the first connection part 113 on the plane of the insulation layer 10 and the projection of the second connection part 123 on the plane of the insulation layer 10, the projection of the first connection part 113 on the plane of the insulation layer 10 and the projection of the second connection part 123 on the plane of the insulation layer 10 may cross or join, where a junction or a joint is the overlap.

It should be noted that, refer to description in the foregoing embodiments of FIG. 3A to FIG. 7 for a cross structure formed by any portion of the plurality of portions included in the at least one turn of coil of the first planar coil winding 11 and any portion of the plurality of portions included in the at least one turn of coil of the second planar coil winding 12 by using the first connection part 113 and the second connection part 123. Details are not described in this embodiment of this application again.

The at least one turn of coil of the first planar coil winding 11 is a $K^{th}$ turn of coil, and the at least one turn of coil of the second planar coil winding 12 is an $L^{th}$ turn of coil. Along a thickness direction of the insulation layer, a projection of the $K^{th}$ turn of coil on the plane of the insulation layer 10 at least partially overlaps a projection of the $L^{th}$ turn of coil on the plane of the insulation layer 10. The $K^{th}$ turn of coil and the $L^{th}$ turn of coil each include R portions, where R is an integer greater than or equal to two.

If a sum of opening areas of cutting openings in even numbered portions of the $K^{th}$ turn of coil is S1, a sum of opening areas of cutting openings in odd numbered portions of the $K^{th}$ turn of coil is S2, a sum of opening areas of cutting openings in even numbered portions of the $L^{th}$ turn of coil is S3, and a sum of opening areas of cutting openings in odd numbered portions of the $L^{th}$ turn of coil is S4, a sum of S1 and S3 is equal to or close to a sum of S2 and S4.

To be specific, a sum of induced currents generated after a magnetic field passes through the cutting openings in the even numbered portions of the $K^{th}$ turn of coil and induced currents generated after the magnetic field passes through the cutting openings in the even numbered portions of the $L^{th}$ turn of coil is equal to or close to a sum of induced currents generated after the magnetic field passes through the cutting openings in the odd numbered portions of the $K^{th}$ turn of coil and induced currents generated after the magnetic field passes through the cutting openings in the odd numbered portions of the $L^{th}$ turn of coil.

It should be noted that, the even numbered portions are portions that are at even numbered positions of the R portions after the R portions are sorted in a connection order of the R portions, and the odd numbered portions are portions that are at odd-number positions of the R portions after the R portions are sorted in the connection order of the R portions. For example, the R portions are respectively a portion 1, a portion 2, a portion 3, and a portion 4. It is assumed that after the R portions are sorted in the connection order of the R portions, a sequence of the R portions is: the portion 3-the portion 1-the portion 2-the portion 4. Therefore, the even numbered portions of the R portions are the portion 1 and the portion 4 that are at even numbered positions, and the odd numbered portions of the R portions are the portion 3 and the portion 2 that are at odd-number positions.

In addition, that the sum of S1 and S3 is close to the sum of S2 and S4 means that, a difference between the sum of S1 and S3 and the sum of S2 and S4 is less than or equal to a first preset value. The first preset value may be preset, and the first preset value may be set to a relatively small value. For example, the first preset value may be set to 30% of the sum of S1 and S3, or may be set to 30% of the sum of S2 and S4. Certainly, the first preset value may alternatively be set to another value. This is not limited in this embodiment of this application.

In addition, that the sum of the induced currents generated after the magnetic field passes through the cutting openings in the even numbered portions of the $K^{th}$ turn of coil and the induced currents generated after the magnetic field passes through the cutting openings in the even numbered portions of the $L^{th}$ turn of coil is close to the sum of the induced currents generated after the magnetic field passes through the cutting openings in the odd numbered portions of the $K^{th}$ turn of coil and the induced currents generated after the magnetic field passes through the cutting openings in the odd numbered portions of the $L^{th}$ turn of coil means that, a difference between the sum of the induced currents generated after the magnetic field passes through the cutting openings in the even numbered portions of the $K^{th}$ turn of coil and the induced currents generated after the magnetic field passes through the cutting openings in the even numbered portions of the $L^{th}$ turn of coil and the sum of the induced currents generated after the magnetic field passes through the cutting openings in the odd numbered portions of the $K^{th}$ turn of coil and the induced currents generated after the magnetic field passes through the cutting openings in the odd numbered portions of the $L^{th}$ turn of coil is less than or equal to a second preset value. The second preset value may be preset, and the second preset value may be set to a relatively small value. For example, the second preset value may be 30% of the sum of the induced currents generated after the magnetic field passes through the cutting openings in the even numbered portions of the $K^{th}$ turn of coil and the induced currents generated after the magnetic field passes through the cutting openings in the even numbered portions of the $L^{th}$ turn of coil, or may be 30% of the sum of the induced currents generated after the magnetic field passes through the cutting openings in the odd numbered portions of the $K^{th}$ turn of coil and the induced currents generated after the magnetic field passes through the cutting openings in the odd numbered portions of the $L^{th}$ turn of coil. Certainly, the second preset value may alternatively be set to another value. This is not limited in this embodiment of this application.

Figure 8D:
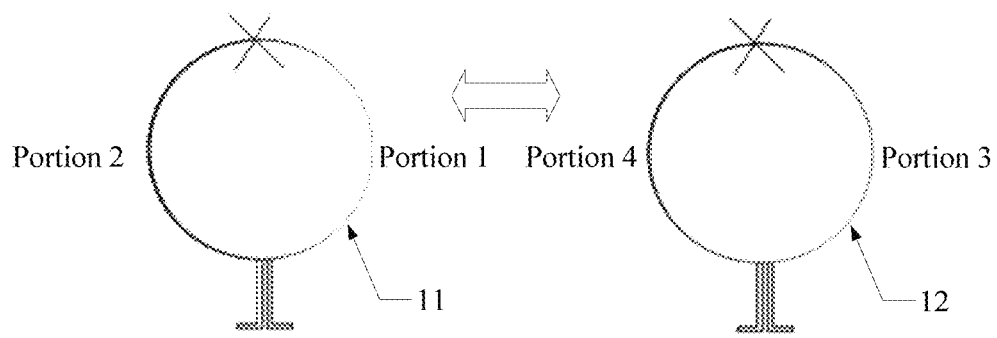
FIG. 8D is a first schematic diagram of R portions according to an embodiment of this application.

For example, as shown in FIG. 8D, R is 2. An even numbered portion of R portions of the $K^{th}$ turn of coil $11_K$ of the first planar coil winding 11 is a portion 1, and an odd numbered portion is a portion 2. An opening area of a cutting opening in the portion 1 is S1, and an opening area of a cutting opening in the portion 2 is S2. An even numbered portion of R portions of the $L^{th}$ turn of coil $12_L$ of the second planar coil winding 12 is a portion 3, and an odd numbered portion is a portion 4. An opening area of a cutting opening in the portion 3 is S3, and an opening area of a cutting opening in the portion 4 is S4. Therefore, a sum of S1 and S3 is equal to or close to a sum of S2 and S4.

Figure 8E:
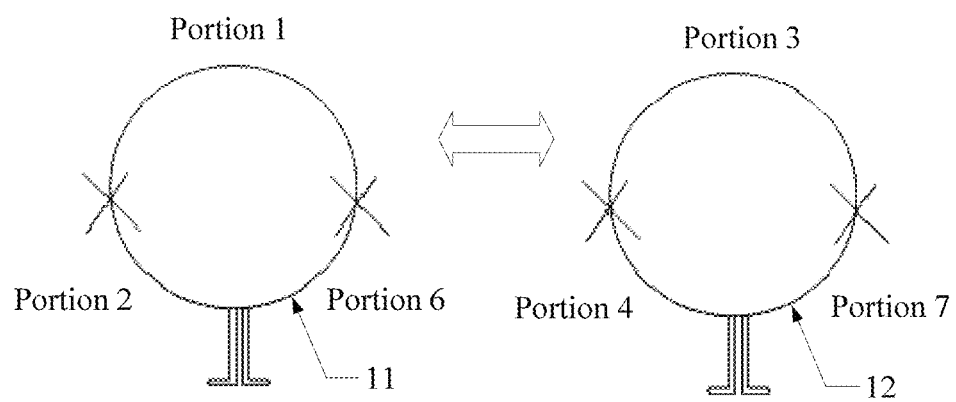
FIG. 8E is a second schematic diagram of R portions according to an embodiment of this application.

For another example, as shown in FIG. 8E, R is 3. An even numbered portion of R portions of the $K^{th}$ turn of coil $11_K$ of the first planar coil winding 11 is a portion 1, and odd numbered portions are a portion 2 and a portion 6. An opening area of a cutting opening in the portion 1 is S1, and a sum of opening areas of cutting openings in the portion 2 and the portion 6 is S2. An even numbered portion of R portions of the $L^{th}$ turn of coil $12_L$ of the second planar coil winding 12 is a portion 3, and odd numbered portions are a portion 4 and a portion 7. An opening area of a cutting opening in the portion 3 is S3, and a sum of opening areas of cutting openings in the portion 4 and the portion 7 is S4. Therefore, a sum of S1 and S3 is equal to or close to a sum of S2 and S4.

Figure 8F:
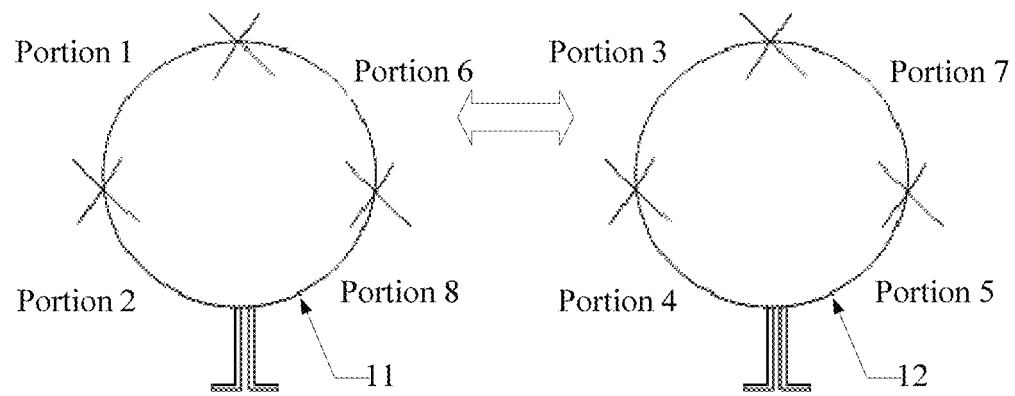
FIG. 8F is a third schematic diagram of R portions according to an embodiment of this application.

For still another example, as shown in FIG. 8F, R is 4. Even numbered portions of R portions of the $K^{th}$ turn of coil $11_K$ of the first planar coil winding 11 are a portion 1 and a portion 8, and odd numbered portions are a portion 2 and a portion 6. A sum of opening areas of cutting openings in the portion 1 and the portion 8 is S1, and a sum of opening areas of cutting openings in the portion 2 and the portion 6 is S2. Even numbered portions of R portions of the $L^{th}$ turn of coil $12_L$ of the second planar coil winding 12 are a portion 3 and a portion 5, and odd numbered portions are a portion 4 and a portion 7. A sum of opening areas of cutting openings in the portion 3 and the portion 5 is S3, and a sum of opening areas of cutting openings in the portion 4 and the portion 7 is S4. Therefore, a sum of S1 and S3 is equal to or close to a sum of S2 and S4.

Figure 8G:
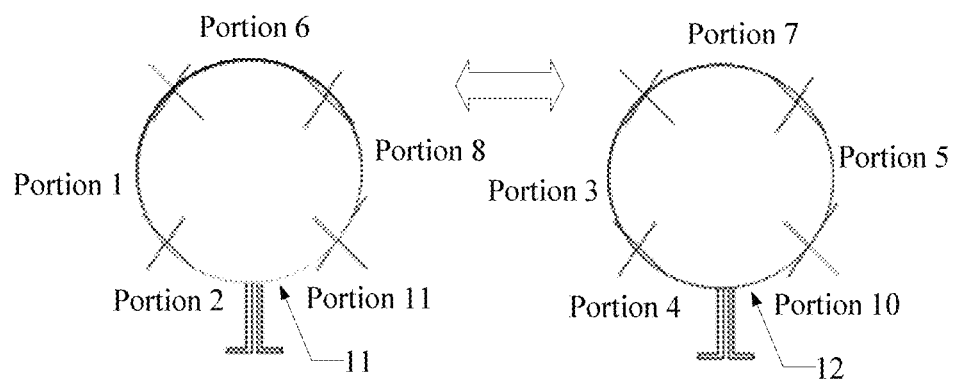
FIG. 8G is a fourth schematic diagram of R portions according to an embodiment of this application.

For yet another example, as shown in FIG. 8G, R is 5. Even numbered portions of R portions of the $K^{th}$ turn of coil $11_K$ of the first planar coil winding 11 are a portion 1 and a portion 8, and odd numbered portions are a portion 2, a portion 6, and a portion 11. A sum of opening areas of cutting openings in the portion 1 and the portion 8 is S1, and a sum of opening areas of cutting openings in the portion 2, the portion 6, and the portion 11 is S2. Even numbered portions of R portions of the $L^{th}$ turn of coil $12_L$ of the second planar coil winding 12 are a portion 3 and a portion 5, and odd numbered portions are a portion 4, a portion 7, and a portion 10. A sum of opening areas of cutting openings in the portion 3 and the portion 5 is S3, and a sum of opening areas of cutting openings in the portion 4, the portion 7, and the portion 10 is S4. Therefore, a sum of S1 and S3 is equal to or close to a sum of S2 and S4.

It should be noted that, when the magnetic field passes through a cutting opening in each portion, induced currents that are of almost equal magnitudes and in opposite directions are generated in a coil on two sides of the cutting opening. Therefore, when the sum of S1 and S3 is equal to or close to the sum of S2 and S4, and when the magnetic field passes through cutting openings in the portions included in the $K^{th}$ turn of coil and the $L^{th}$ turn of coil, a sum of induced currents generated in the even numbered portions included in the $K^{th}$ turn of coil and the $L^{th}$ turn of coil are very close to a sum of induced currents generated in the odd numbered portions included in the $K^{th}$ turn of coil and the $L^{th}$ turn of coil, so that an effect of canceling out the induced currents can be effectively improved, thereby effectively improving wireless charging efficiency.

In this embodiment of this application, the coil module includes the first planar coil winding disposed on one side of the insulation layer and the second planar coil winding disposed on the other side of the insulation layer, and the first planar coil winding and the second planar coil winding each include a plurality of turns of coils. At least one turn of coil of the first planar coil winding includes the plurality of portions and the first connection part, and at least one turn of coil of the second planar coil winding includes the plurality of portions and the second connection part. An outer side part and an inner side part of the plurality of portions included in the first planar coil winding and an outer side part and an inner side part of the plurality of portions included in the second planar coil winding are cross-connected by using the first connection part and the second connection part, so that when a magnetic field passes through cutting openings in the plurality of portions included in the first planar coil winding and the second planar coil winding, induced currents generated in outer side parts and inner side parts of the plurality of portions can cancel each other out, thereby effectively reducing a circulating current loss in the first planar coil winding and a circulating current loss in the second planar coil winding, and improving wireless charging efficiency of the coil module.

Figure 9A:
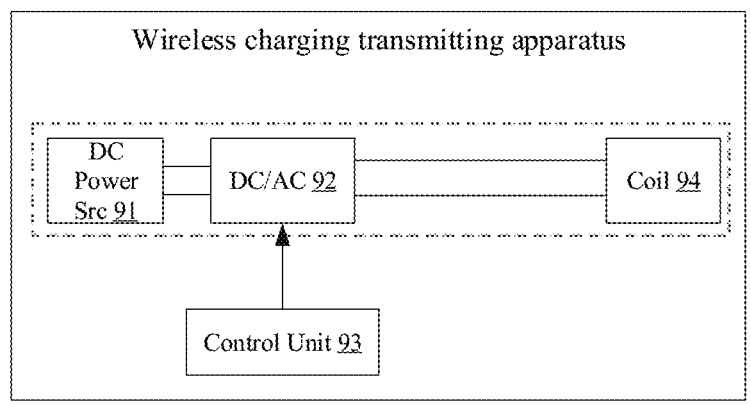
FIG. 9A is a first schematic structural diagram of a wireless charging transmitting apparatus according to an embodiment of this application.

FIG. 9A is a schematic structural diagram of a wireless charging transmitting apparatus according to an embodiment of this application. Referring to FIG. 9A, the wireless charging transmitting apparatus includes a direct current/alternating current conversion circuit 92, a control unit 93, and a coil module 94 shown in any one of FIG. 3A to FIG. 8G.

An input end of the direct current/alternating current conversion circuit 92 is connected to a direct current power source 91. Under the control of the control unit 93, the direct current/alternating current conversion circuit 92 converts a direct current signal input by the direct current power source 91 into an alternating current signal, and transmits the alternating current signal to the coil module 94, so that the coil module 94 transmits the alternating current signal.

An output end of the direct current/alternating current conversion circuit 92 is connected to the coil module 94, and a control end of the control unit 93 is connected to a controlled end of the direct current/alternating current conversion circuit 92.

It should be noted that, the wireless charging transmitting apparatus may wirelessly charge a wireless charging receiving apparatus. For example, the wireless charging transmitting apparatus may be a wireless charger.

When the wireless charging transmitting apparatus needs to wirelessly charge the wireless charging receiving apparatus, the control unit 93 may control a switch of the direct current/alternating current conversion circuit 92 to be switched on, so that the direct current/alternating current conversion circuit 92 starts to work, and converts the direct current signal input by the direct current power source 91 into the alternating current signal.

Figure 9B:
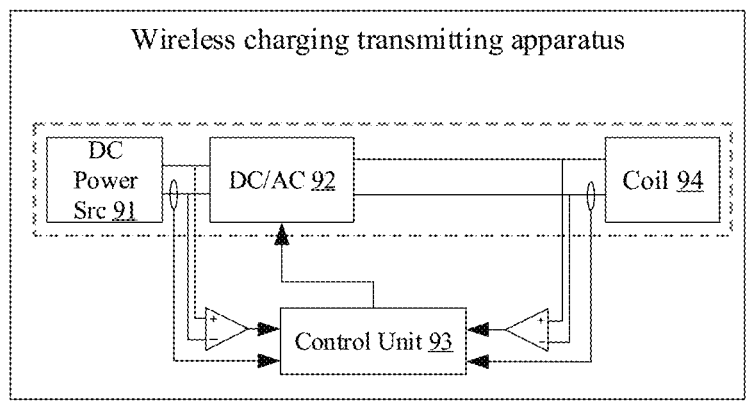
FIG. 9B is a second schematic structural diagram of a wireless charging transmitting apparatus according to an embodiment of this application.

Further, referring to FIG. 9B, a first voltage detection end of the control unit 93 is connected to the direct current power source 91, a second voltage detection end of the control unit 93 is connected to the coil module 94, a first current detection end of the control unit 93 is connected to the direct current power source 91, and a second current detection end of the control unit 93 is connected to the coil module 94.

In this case, the control unit 93 may detect a voltage and a current of the direct current power source 91, and detect a voltage and a current of the coil module 94, and then control the direct current/alternating current conversion circuit 92 based on the detected voltages and currents.

Figure 9C:
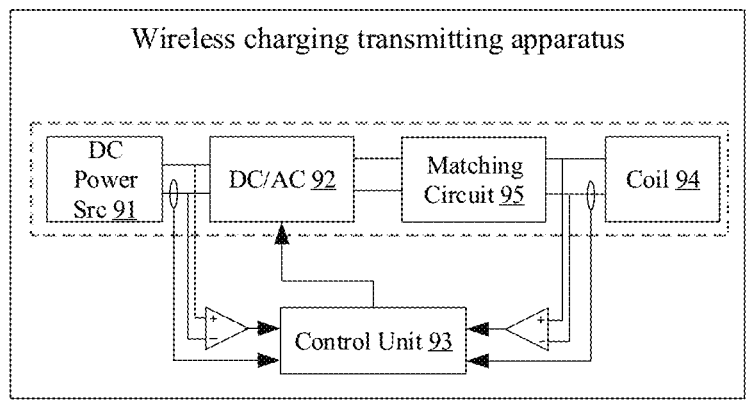
FIG. 9C is a third schematic structural diagram of a wireless charging transmitting apparatus according to an embodiment of this application.

Further, referring to FIG. 9C, the wireless charging transmitting apparatus further includes a matching circuit 95. The matching circuit 95 is connected between the direct current/alternating current conversion circuit 92 and the coil module 94, and is configured to generate resonance oscillation with the coil module 94, so that the alternating current signal output by the direct current/alternating current conversion circuit 92 can be efficiently transmitted to the coil module 94.

Figure 9D:
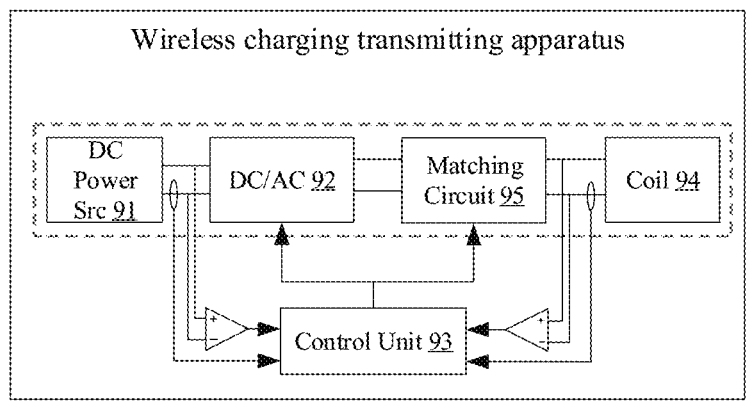
FIG. 9D is a fourth schematic structural diagram of a wireless charging transmitting apparatus according to an embodiment of this application.

Still further, referring to FIG. 9D, a control end of the control unit 93 is connected to a controlled end of the matching circuit 95.

In this case, when the wireless charging transmitting apparatus needs to wirelessly charge the wireless charging receiving apparatus, the control unit 93 may control a switch of the matching circuit 95 to be switched on, so that the matching circuit 95 starts to work, and generates resonance oscillation with the coil module 94.

In this embodiment of this application, the wireless charging transmitting apparatus includes the coil module, and the coil module includes an insulation layer, a first planar coil winding, and a second planar coil winding, where the first planar coil winding is on one side of the insulation layer, the second planar coil winding is on the other side of the insulation layer, and the first planar coil winding and the second planar coil winding each include a plurality of turns of coils. At least one turn of coil of the first planar coil winding includes a plurality of portions and a first connection part, and at least one turn of coil of the second planar coil winding includes a plurality of portions and a second connection part. An outer side part and an inner side part of the plurality of portions included in the first planar coil winding and an outer side part and an inner side part of the plurality of portions included in the second planar coil winding are cross-connected by using the first connection part and the second connection part, so that when a magnetic field passes through cutting openings in the plurality of portions included in the first planar coil winding and the second planar coil winding, induced currents generated in outer side parts and inner side parts of the plurality of portions can cancel each other out, thereby effectively reducing a circulating current loss in the first planar coil winding and a circulating current loss in the second planar coil winding, and improving wireless charging efficiency of the wireless charging transmitting apparatus.

Figure 10A:
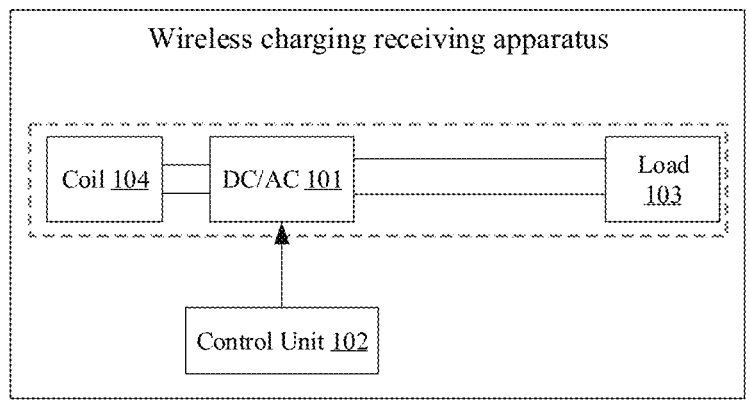
FIG. 10A is a first schematic structural diagram of a wireless charging receiving apparatus according to an embodiment of this application.

FIG. 10A is a schematic structural diagram of a wireless charging receiving apparatus according to an embodiment of this application. Referring to FIG. 10A, the wireless charging receiving apparatus includes an alternating current/direct current conversion circuit 101, a control unit 102, a load 103, and the coil module 104 shown in any one of FIG. 3A to FIG. 8G.

The coil module 104 is connected to an input end of the alternating current/direct current conversion circuit 101. The coil module 104 receives an alternating current signal, and transmits the alternating current signal to the alternating current/direct current conversion circuit 101. Under the control of the control unit 102, the alternating current/direct current conversion circuit 101 converts the alternating current signal into a direct current signal, and outputs the direct current signal to the load 103, to supply power to the load 103.

An out end of the alternating current/direct current conversion circuit 101 is connected to the load 103, and a control end of the control unit 102 is connected to a controlled end of the alternating current/direct current conversion circuit 101.

It should be noted that, the wireless charging receiving apparatus may be wirelessly charged by using a wireless charging transmitting apparatus. For example, the wireless charging receiving apparatus may be an electronic device such as a mobile phone or a tablet computer.

When the wireless charging receiving apparatus needs to be wirelessly charged by using the wireless charging transmitting apparatus, the control unit 102 may control a switch of the alternating current/direct current conversion circuit 101 to be switched on, so that the alternating current/direct current conversion circuit 101 starts to work, converts the alternating current signal input by the coil module 104 into the direct current signal, and outputs the direct current signal to the load 103.

Figure 10B:
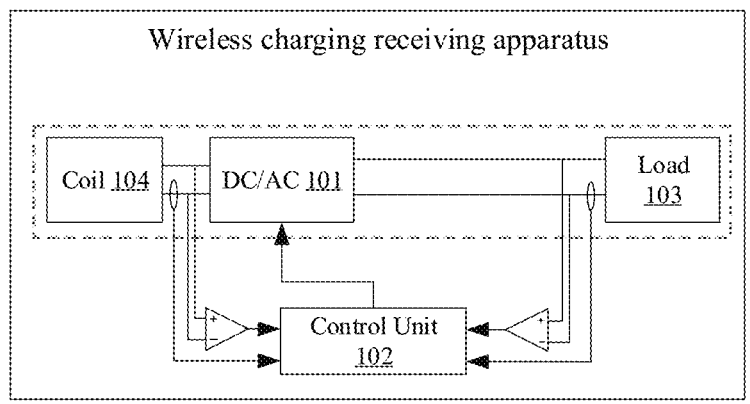
FIG. 10B is a second schematic structural diagram of a wireless charging receiving apparatus according to an embodiment of this application.

Further, referring to FIG. 10B, a first voltage detection end of the control unit 102 is connected to the coil module 104, a second voltage detection end of the control unit 102 is connected to the load 103, a first current detection end of the control unit 102 is connected to the coil module 104, and a second current detection end of the control unit 102 is connected to the load 103.

In this case, the control unit 102 may detect a voltage and a current of the coil module 104, and detect a voltage and a current of the load 103, and then control the alternating current/direct current conversion circuit 101 based on the detected voltages and currents.

Figure 10C:
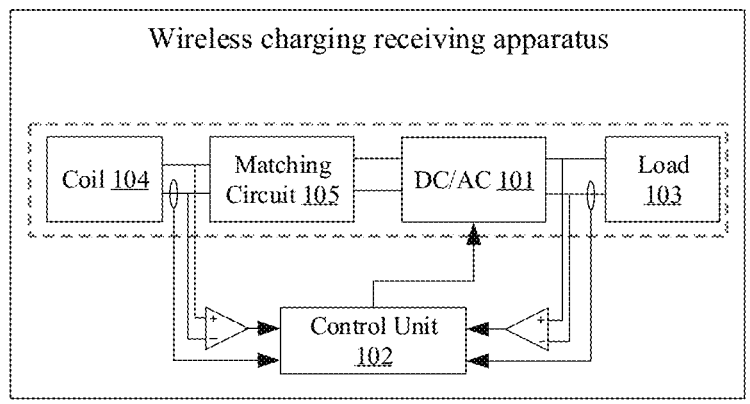
FIG. 10C is a third schematic structural diagram of a wireless charging receiving apparatus according to an embodiment of this application.

Further, referring to FIG. 10C, the wireless charging receiving apparatus further includes a matching circuit 105. The matching circuit 105 is connected between the coil module 104 and the alternating current/direct current conversion circuit 101, and is configured to generate resonance oscillation with the coil module 104, so that the alternating current signal output by the coil module 104 can be efficiently transmitted to the alternating current/direct current conversion circuit 101.

Figure 10D:
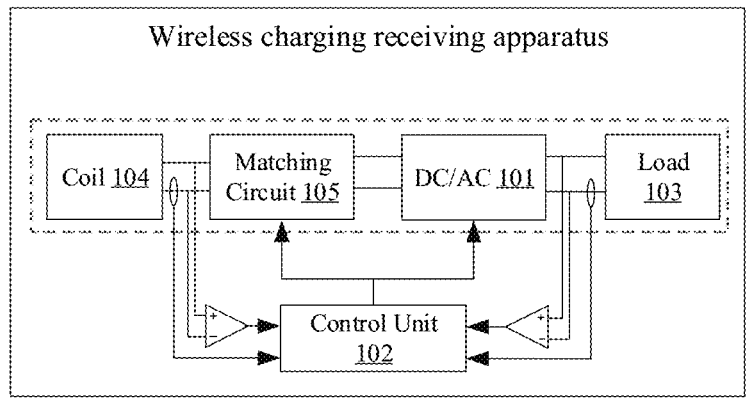
FIG. 10D is a fourth schematic structural diagram of a wireless charging receiving apparatus according to an embodiment of this application.

Still further, referring to FIG. 10D, a control end of the control unit 102 is connected to a controlled end of the matching circuit 105.

In this case, when the wireless charging receiving apparatus needs to be wirelessly charged by using the wireless charging transmitting apparatus, the control unit 102 may control a switch of the matching circuit 105 to be switched on, so that the matching circuit 105 starts to work, and generates resonance oscillation with the coil module 104.

In this embodiment of this application, the wireless charging receiving apparatus includes the coil module, and the coil module includes an insulation layer, a first planar coil winding, and a second planar coil winding, where the first planar coil winding is on one side of the insulation layer, the second planar coil winding is on the other side of the insulation layer, and the first planar coil winding and the second planar coil winding each include a plurality of turns of coils. At least one turn of coil of the first planar coil winding includes a plurality of portions and a first connection part, and at least one turn of coil of the second planar coil winding includes a plurality of portions and a second connection part. An outer side part and an inner side part of the plurality of portions included in the first planar coil winding and an outer side part and an inner side part of the plurality of portions included in the second planar coil winding are cross-connected by using the first connection part and the second connection part, so that when a magnetic field passes through cutting openings in the plurality of portions included in the first planar coil winding and the second planar coil winding, induced currents generated in outer side parts and inner side parts of the plurality of portions can cancel each other out, thereby effectively reducing a circulating current loss in the first planar coil winding and a circulating current loss in the second planar coil winding, and improving wireless charging efficiency of the wireless charging receiving apparatus.

Figure 11:
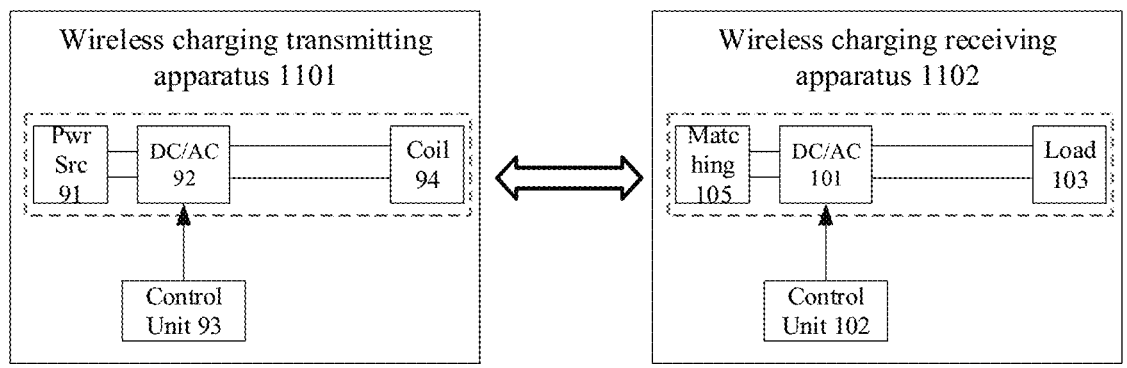
FIG. 11 is a schematic structural diagram of a wireless charging system according to an embodiment of this application.

FIG. 11 is a schematic structural diagram of a wireless charging system according to an embodiment of this application. Referring to FIG. 11, the wireless charging system includes the wireless charging transmitting apparatus 1101 shown in any one of FIG. 9A to FIG. 9D and the wireless charging receiving apparatus 1102 shown in any one of FIG. 10A to FIG. 10D. The wireless charging transmitting apparatus 1101 is configured to wirelessly charge the wireless charging receiving apparatus 1102.

It should be noted that, an alternating current signal transmitted by a coil module in the wireless charging transmitting apparatus 1101 generates a magnetic field, and a coil module in the wireless charging receiving apparatus 1102 can generate a voltage through magnetic coupling, so that the wireless charging transmitting apparatus 1101 can wirelessly charge a load in the wireless charging receiving apparatus 1102.

In this embodiment of this application, the wireless charging system includes the wireless charging transmitting apparatus and the wireless charging receiving apparatus, and the coil module in the wireless charging transmitting apparatus and the coil module in the wireless charging receiving apparatus each include an insulation layer, a first planar coil winding, and a second planar coil winding, where the first planar coil winding is on one side of the insulation layer, the second planar coil winding is on the other side of the insulation layer, and the first planar coil winding and the second planar coil winding each include a plurality of turns of coils. At least one turn of coil of the first planar coil winding includes a plurality of portions and a first connection part, and at least one turn of coil of the second planar coil winding includes a plurality of portions and a second connection part. An outer side part and an inner side part of the plurality of portions included in the first planar coil winding and an outer side part and an inner side part of the plurality of portions included in the second planar coil winding are cross-connected by using the first connection part and the second connection part, so that when a magnetic field passes through cutting openings in the plurality of portions included in the first planar coil winding and the second planar coil winding, induced currents generated in outer side parts and inner side parts of the plurality of portions can cancel each other out, thereby effectively reducing a circulating current loss in the first planar coil winding and a circulating current loss in the second planar coil winding, and improving wireless charging efficiency of the wireless charging system.

Figure 12A:
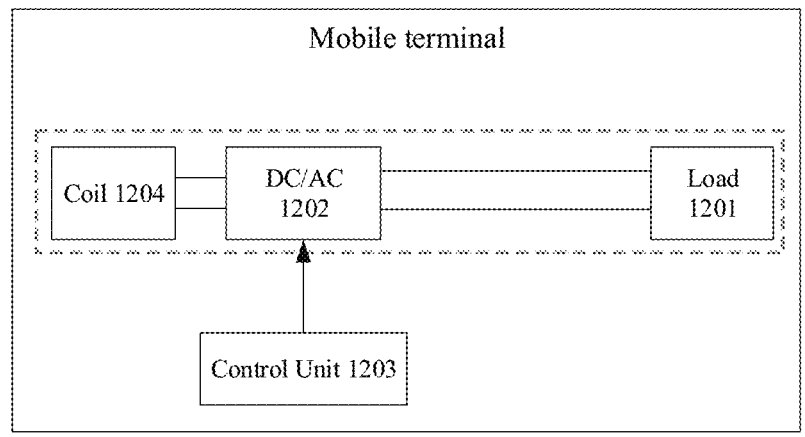
FIG. 12A is a first schematic structural diagram of a mobile terminal according to an embodiment of this application.

FIG. 12A (or FIG. 12B) is a schematic structural diagram of a mobile terminal according to an embodiment of this application. Referring to FIG. 12A (or FIG. 12B), the mobile terminal includes a workload circuit 1201, an alternating current/direct current conversion circuit 1202, a charging control unit 1203, and a coil module 1204 shown in any one of FIG. 3A to FIG. 8G. The coil module 1204 is connected to an input end of the alternating current/direct current conversion circuit 1202. The coil module 1204 receives an alternating current signal, and transmits the alternating current signal to the alternating current/direct current conversion circuit 1202. Under the control of the charging control unit 1203, the alternating current/direct current conversion circuit 1202 converts the alternating current signal into a direct current signal, and outputs the direct current signal to the workload circuit 1201.

An output end of the alternating current/direct current conversion circuit 1202 is connected to the workload circuit 1201, and a control end of the charging control unit 1203 is connected to a controlled end of the alternating current/direct current conversion circuit 1202.

It should be noted that, the mobile terminal may be an electronic device such as a mobile phone or a tablet computer.

When the mobile terminal needs to be wirelessly charged by using a wireless charger, the charging control unit 1203 may control a switch of the alternating current/direct current conversion circuit 1202 to be switched on, so that the alternating current/direct current conversion circuit 1202 starts to work, converts the alternating current signal input by the coil module 1204 into the direct current signal, and outputs the direct current signal to the workload circuit 1201.

Figure 12B:
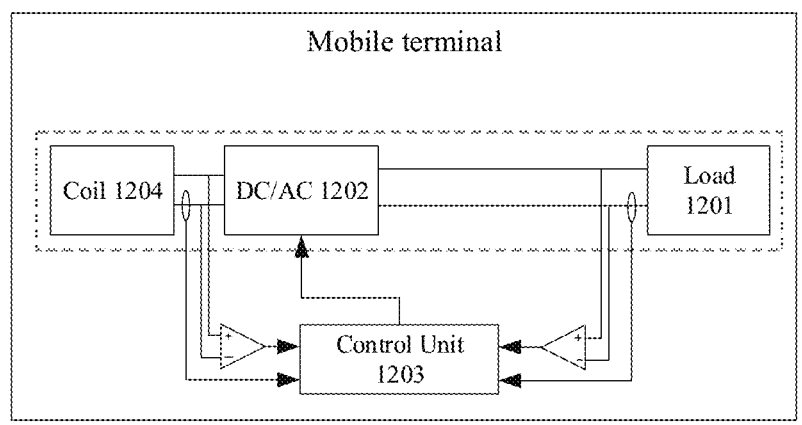
FIG. 12B is a second schematic structural diagram of a mobile terminal according to an embodiment of this application.

Further, referring to FIG. 12B, a first voltage detection end of the charging control unit 1203 is connected to the coil module 1204, a second voltage detection end of the charging control unit 1203 is connected to the workload circuit 1201, a first current detection end of the charging control unit 1203 is connected to the coil module 1204, and a second current detection end of the charging control unit 1203 is connected to the workload circuit 1201.

In this case, the charging control unit 1203 may detect a voltage and a current of the coil module 1204, and detect a voltage and a current of the workload circuit 1201, and then control the alternating current/direct current conversion circuit 1202 based on the detected voltages and currents.

Further, referring to FIGS. 10C and 12B, the mobile terminal further includes a matching circuit 105. The matching circuit 105 is connected between the coil module 1204 and the alternating current/direct current conversion circuit 1202, and is configured to generate resonance oscillation with the coil module 1204, so that the alternating current signal output by the coil module 1204 can be efficiently transmitted to the alternating current/direct current conversion circuit 1202.

Still further, referring to FIGS. 10D and 12B, a control end of the charging control unit 1203 is connected to a controlled end of the matching circuit 105.

In this case, when the mobile terminal needs to be wirelessly charged by using the wireless charger, the charging control unit 1203 may control a switch of the matching circuit 105 to be switched on, so that the matching circuit 105 starts to work, and generates resonance oscillation with the coil module 1204.

In this embodiment of this application, the mobile terminal includes a coil module, and the coil module includes an insulation layer, a first planar coil winding, and a second planar coil winding, where the first planar coil winding is on one side of the insulation layer, the second planar coil winding is on the other side of the insulation layer, and the first planar coil winding and the second planar coil winding each include a plurality of turns of coils. At least one turn of coil of the first planar coil winding includes a plurality of portions and a first connection part, and at least one turn of coil of the second planar coil winding includes a plurality of portions and a second connection part. An outer side part and an inner side part of the plurality of portions included in the first planar coil winding and an outer side part and an inner side part of the plurality of portions included in the second planar coil winding are cross-connected by using the first connection part and the second connection part, so that when a magnetic field passes through cutting openings in the plurality of portions included in the first planar coil winding and the second planar coil winding, induced currents generated in outer side parts and inner side parts of the plurality of portions can cancel each other out, thereby effectively reducing a circulating current loss in the first planar coil winding and a circulating current loss in the second planar coil winding, and improving wireless charging efficiency of the mobile terminal.

The foregoing descriptions are merely embodiments of this application, but are not intended to limit this application. Any modification, equivalent replacement, or improvement made without departing from the spirit and principle of this application shall fall within the protection scope of this application.

What is claimed is:
1. A coil module, comprising:
an insulation layer;
a first planar coil winding; and
a second planar coil winding, wherein
the first planar coil winding is on one side of the insulation layer, the second planar coil winding is on the other side of the insulation layer, and the first planar coil winding and the second planar coil winding each comprise a plurality of turns of coils;
at least one turn of coil of the first planar coil winding comprises a first portion, a second portion, and a first connection part; the first portion is provided with a first cutting opening that extends along a coil extending direction, the first portion comprises a first outer side part and a first inner side part that are separated by the first cutting opening; the second portion is provided with a second cutting opening that extends along the coil extending direction, the second portion comprises a second outer side part and a second inner side part that are separated by the second cutting opening; and the first connection part is disposed between the first outer side part and the second inner side part;
at least one turn of coil of the second planar coil winding comprises a third portion, a fourth portion, and a second connection part; the third portion is provided with a third cutting opening that extends along the coil extending direction, the third portion comprises a third outer side part and a third inner side part that are separated by the third cutting opening; the fourth portion is provided with a fourth cutting opening that extends along the coil extending direction, the fourth portion comprises a fourth outer side part and a fourth inner side part that are separated by the fourth cutting opening; and the second connection part is disposed between the third inner side part and the fourth outer side part; and there is an overlap between a projection of the first connection part on a plane of the insulation layer and a projection of the second connection part on the plane of the insulation layer, the first outer side part and the third outer side part are connected in parallel, the first inner side part and the third inner side part are connected in parallel, the second outer side part and the fourth outer side part are connected in parallel, and the second inner side part and the fourth inner side part are connected in parallel.

2. The module according to claim 1, wherein the projection of the first connection part on the plane of the insulation layer and the projection of the second connection part on the plane of the insulation layer cross or join.

3. The module according to claim 1, wherein one end of the first connection part is in contact with one end of the first outer side part close to the second outer side part, and the other end of the first connection part is in contact with one end of the second inner side part close to the first inner side part; and one end of the second connection part is in contact with one end of the third inner side part close to the fourth inner side part, and the other end of the second connection part is in contact with one end of the fourth outer side part close to the third outer side part.

4. The module according to claim 1, wherein the first outer side part and the third outer side part are connected in parallel by using at least two vias;

the first inner side part and the third inner side part are connected in parallel by using at least two vias;

the second outer side part and the fourth outer side part are connected in parallel by using at least two vias; and the second inner side part and the fourth inner side part are connected in parallel by using at least two vias.

5. The module according to claim 4, wherein a penetrating first via is provided at a first end of the first outer side part and a first end of the third outer side part, another penetrating first via is provided at a second end of the first outer side part away from its first end and a second end of the third outer side part away from its first end, and the first outer side part and the third outer side part are connected in parallel by using the first vias;

a penetrating second via is provided at a first end of the first inner side part and a first end of the third inner side part, another penetrating second via is provided at a second end of the first inner side part away from its first end and a second end of the third inner side part away from its first end, and the first inner side part and the third inner side part are connected in parallel by using the second vias;

a penetrating third via is provided at a first end of the second outer side part and a first end of the fourth outer side part, another penetrating third via is provided at a second end of the second outer side part away from its first end and a second end of the fourth outer side part away from its first end, and the second outer side part and the fourth outer side part are connected in parallel by using the third vias; and a penetrating fourth via is provided at a first end of the second inner side part and a first end of the fourth inner side part, another penetrating fourth via is provided at a second end of the second inner side part away from its first end and a second end of the fourth inner side part away from its first end, and the second inner side part and the fourth inner side part are connected in parallel by using the fourth vias.

6. The module according to claim 5, wherein when the second end of the first outer side part communicates with the second end of the first inner side part, and the second end of the third outer side part communicates with the second end of the third inner side part, the first via that penetrates the second end of the first outer side part and the second end of the third outer side part is also the second via that penetrates the second end of the first inner side part and the second end of the third inner side part.

7. The module according to claim 5, wherein when the second end of the second outer side part communicates with the second end of the second inner side part, and the second end of the fourth outer side part communicates with the second end of the fourth inner side part, the third via that penetrates the second end of the second outer side part and the second end of the fourth outer side part is also the fourth via that penetrates the second end of the second inner side part and the second end of the fourth inner side part.

8. The module according to claim 1, wherein a sum of an opening area of the first cutting opening and an opening area of the third cutting opening is equal to or close to a sum of an opening area of the second cutting opening and an opening area of the fourth cutting opening.

9. The module according to claim 1, wherein the module further comprises a first wire and a second wire, wherein one end of the first wire coincides with an end part of an outermost turn of coil of the first planar coil winding, and the other end of the first wire is a first end of the module; one end of the second wire is an end part of an innermost turn of coil of the second planar coil winding, and the other end of the second wire is a second end of the module; and when the first end of the module is a lead-in end, the second end of the module is a lead-out end, and when the first end of the module is a lead-out end, the second end of the module is a lead-in end.

10. The module according to claim 9, wherein the second wire comprises a fifth portion and a sixth portion, wherein one end of the fifth portion is the end part of the innermost turn of coil of the second planar coil winding, and the other end of the fifth portion is in an $M^{th}$ turn of coil of the second planar coil winding, wherein the $M^{th}$ turn of coil is any turn of coil in the second planar coil winding other than the innermost turn of coil and an outermost turn of coil;

one end of the sixth portion is in an $N^{th}$ turn of coil of the first planar coil winding, and the other end of the sixth portion is the second end of the module, wherein the $N^{th}$ turn of coil is any turn of coil in the first planar coil winding other than an innermost turn of coil and the outermost turn of coil; and along a thickness direction of the insulation layer, there is an overlap between a projection of the $N^{th}$ turn of coil on the plane of the insulation layer and a projection of the $M^{th}$ turn of coil on the plane of the insulation layer, wherein parts corresponding to the overlap are connected by using a via.

11. The module according to claim 9, wherein the second wire comprises a fifth portion and a sixth portion, wherein one end of the fifth portion is an end part of an innermost turn of coil of the first planar coil winding;

one end of the sixth portion is the end part of the innermost turn of coil of the second planar coil winding;

the other end of the fifth portion and the other end of the sixth portion are joined to form the second end of the module; and along a thickness direction of the insulation layer, there is a cross between a projection of the fifth portion on the plane of the insulation layer and a projection of the sixth portion on the plane of the insulation layer, and the cross is in a region of projections of the first planar coil winding and the second planar coil winding on the plane of the insulation layer.

12. A wireless charging transmitting apparatus, wherein the apparatus comprises:

a direct current/alternating current conversion circuit;

a control unit; and a coil module, wherein an input end of the direct current/alternating current conversion circuit is connected to a direct current power source;

under the control of the control unit, the direct current/alternating current conversion circuit converts a direct current signal input by the direct current power source into an alternating current signal, and transmits the alternating current signal to the coil module, so that the coil module transmits the alternating current signal; and the coil module comprises an insulation layer, a first planar coil winding, and a second planar coil winding, wherein the first planar coil winding is on one side of the insulation layer, the second planar coil winding is on the other side of the insulation layer, and the first planar coil winding and the second planar coil winding each comprise a plurality of turns of coils;

at least one turn of coil of the first planar coil winding comprises a first portion, a second portion, and a first connection part; the first portion is provided with a first cutting opening that extends along a coil extending direction, the first portion comprises a first outer side part and a first inner side part that are separated by the first cutting opening; the second portion is provided with a second cutting opening that extends along the coil extending direction, the second portion comprises a second outer side part and a second inner side part that are separated by the second cutting opening; and the first connection part is disposed between the first outer side part and the second inner side part;

at least one turn of coil of the second planar coil winding comprises a third portion, a fourth portion, and a second connection part; the third portion is provided with a third cutting opening that extends along the coil extending direction, the third portion comprises a third outer side part and a third inner side part that are separated by the third cutting opening; the fourth portion is provided with a fourth cutting opening that extends along the coil extending direction, the fourth portion comprises a fourth outer side part and a fourth inner side part that are separated by the fourth cutting opening; and the second connection part is disposed between the third inner side part and the fourth outer side part; and there is an overlap between a projection of the first connection part on a plane of the insulation layer and a projection of the second connection part on the plane of the insulation layer, the first outer side part and the third outer side part are connected in parallel, the first inner side part and the third inner side part are connected in parallel, the second outer side part and the fourth outer side part are connected in parallel, and the second inner side part and the fourth inner side part are connected in parallel.

13. The apparatus according to claim 12, wherein the apparatus further comprises a matching circuit, wherein the matching circuit is connected between the direct current/alternating current conversion circuit and the coil module, and is configured to generate resonance oscillation with the coil module.

14. The apparatus according to claim 12, wherein the projection of the first connection part on the plane of the insulation layer and the projection of the second connection part on the plane of the insulation layer cross or join.

15. The apparatus according to claim 12, wherein one end of the first connection part is in contact with one end of the first outer side part close to the second outer side part, and the other end of the first connection part is in contact with one end of the second inner side part close to the first inner side part; and one end of the second connection part is in contact with one end of the third inner side part close to the fourth inner side part, and the other end of the second connection part is in contact with one end of the fourth outer side part close to the third outer side part.

16. The apparatus according to claim 12, wherein the first outer side part and the third outer side part are connected in parallel by using at least two vias;

the first inner side part and the third inner side part are connected in parallel by using at least two vias;

the second outer side part and the fourth outer side part are connected in parallel by using at least two vias; and the second inner side part and the fourth inner side part are connected in parallel by using at least two vias.

17. A wireless charging receiving apparatus, wherein the apparatus comprises:

an alternating current/direct current conversion circuit;

a control unit;

a load; and a coil module, wherein the coil module is connected to an input end of the alternating current/direct current conversion circuit;

the coil module receives an alternating current signal, and transmits the alternating current signal to the alternating current/direct current conversion circuit; and under the control of the control unit, the alternating current/direct current conversion circuit converts the alternating current signal into a direct current signal, and outputs the direct current signal to the load, to supply power to the load; and the coil module comprises an insulation layer, a first planar coil winding, and a second planar coil winding, wherein the first planar coil winding is on one side of the insulation layer, the second planar coil winding is on the other side of the insulation layer, and the first planar coil winding and the second planar coil winding each comprise a plurality of turns of coils;

at least one turn of coil of the first planar coil winding comprises a first portion, a second portion, and a first connection part; the first portion is provided with a first cutting opening that extends along a coil extending direction, the first portion comprises a first outer side part and a first inner side part that are separated by the first cutting opening; the second portion is provided with a second cutting opening that extends along the coil extending direction, the second portion comprises a second outer side part and a second inner side part that are separated by the second cutting opening; and the first connection part is disposed between the first outer side part and the second inner side part;

at least one turn of coil of the second planar coil winding comprises a third portion, a fourth portion, and a second connection part; the third portion is provided with a third cutting opening that extends along the coil extending direction, the third portion comprises a third outer side part and a third inner side part that are separated by the third cutting opening; the fourth portion is provided with a fourth cutting opening that extends along the coil extending direction, the fourth portion comprises a fourth outer side part and a fourth inner side part that are separated by the fourth cutting opening; and the second connection part is disposed between the third inner side part and the fourth outer side part; and there is an overlap between a projection of the first connection part on a plane of the insulation layer and a projection of the second connection part on the plane of the insulation layer, the first outer side part and the third outer side part are connected in parallel, the first inner side part and the third inner side part are connected in parallel, the second outer side part and the fourth outer side part are connected in parallel, and the second inner side part and the fourth inner side part are connected in parallel.

18. The wireless charging receiving apparatus according to claim 17, wherein the apparatus further comprises a matching circuit, wherein the matching circuit is connected between the coil module and the alternating current/direct current conversion circuit, and is configured to generate resonance oscillation with the coil module.

19. The wireless charging receiving apparatus according to claim 17, wherein the projection of the first connection part on the plane of the insulation layer and the projection of the second connection part on the plane of the insulation layer cross or join.

20. The wireless charging receiving apparatus according to claim 17, wherein one end of the first connection part is in contact with one end of the first outer side part close to the second outer side part, and the other end of the first connection part is in contact with one end of the second inner side part close to the first inner side part; and one end of the second connection part is in contact with one end of the third inner side part close to the fourth inner side part, and the other end of the second connection part is in contact with one end of the fourth outer side part close to the third outer side part.

* * * * *